US008190490B2

(12) United States Patent
Sandholm et al.

(10) Patent No.: US 8,190,490 B2
(45) Date of Patent: *May 29, 2012

(54) OVERCONSTRAINT DETECTION, RULE RELAXATION AND DEMAND REDUCTION IN A COMBINATORIAL EXCHANGE

(75) Inventors: Tuomas Sandholm, Pittsburgh, PA (US); David L. Levine, Chesterfield, MO (US); David C. Parkes, Cambridge, MA (US); Subhash Suri, Santa Barbara, CA (US); Vincent Conitzer, Pittsburgh, PA (US); Robert L. Shields, Pittsburgh, PA (US); Yuri Smirnov, Palo Alto, CA (US)

(73) Assignee: CombineNet, Inc., Pittsburgh, PA (US)

( * ) Notice: Subject to any disclaimer, the term of this patent is extended or adjusted under 35 U.S.C. 154(b) by 373 days.

This patent is subject to a terminal disclaimer.

(21) Appl. No.: 12/508,129

(22) Filed: Jul. 23, 2009

(65) Prior Publication Data
US 2009/0281920 A1 Nov. 12, 2009

Related U.S. Application Data

(60) Division of application No. 10/997,765, filed on Nov. 24, 2004, now Pat. No. 7,577,589, which is a continuation-in-part of application No. 10/254,241, filed on Sep. 25, 2002, now Pat. No. 7,610,236, and a continuation-in-part of application No. 10/803,549, filed on Mar. 18, 2004, now Pat. No. 7,499,880.

(51) Int. Cl.
*G06Q 30/00* (2012.01)
(52) U.S. Cl. .......................................... 705/26.3; 705/37
(58) Field of Classification Search .................. 705/26.3, 705/37
See application file for complete search history.

(56) References Cited

U.S. PATENT DOCUMENTS 5,905,975 A  5/1999  Ausubel
6,021,398 A  2/2000  Ausubel
(Continued)

FOREIGN PATENT DOCUMENTS

JP      2001290968 A   10/2001
(Continued)

OTHER PUBLICATIONS

Andrew J. Davenport and Jayant R. Kalagnanam; "Price Negotiations for Procurement of Direct Inputs"; IBM Technical Report RC 22078; May 31, 2001; 21 pages.

(Continued)

*Primary Examiner* — Yogesh C Garg
(74) *Attorney, Agent, or Firm* — The Webb Law Firm

(57) ABSTRACT

In a combinatorial exchange, a set of rules can be input for processing of bids received in connection with the exchange. At least one bid can be received from each of a plurality of exchange participants and a desired exchange objective can be defined. A determination can be made as a function of a subset of the rules if an allocation of the bids exists that is optimal for the type of exchange being conducted. If the desired exchange objective is not satisfied, the step of determining an allocation is repeated utilizing a different subset of rules each time until the desired exchange objective is satisfied. It can be determined if the exchange is overconstrained and, if so, rules can be relaxed. Also or alternatively, the demand for a quantity of an item can be increased or decreased based on the average cost of the item.

20 Claims, 30 Drawing Sheets

U.S. PATENT DOCUMENTS

| | | | |
|---|---|---|---|
| 6,026,383 | A | 2/2000 | Ausubel |
| 6,035,287 | A | 3/2000 | Stallaert et al. |
| 6,055,519 | A | 4/2000 | Kennedy et al. |
| 6,064,981 | A | 5/2000 | Barni et al. |
| 6,272,473 | B1* | 8/2001 | Sandholm ............... 705/37 |
| 6,415,270 | B1 | 7/2002 | Rackson et al. |
| 6,704,716 | B1 | 3/2004 | Force |
| 6,718,312 | B1 | 4/2004 | McAfee et al. |
| 7,043,446 | B1 | 5/2006 | Dietrich et al. |
| 7,058,602 | B1 | 6/2006 | La Mura et al. |
| 7,133,841 | B1 | 11/2006 | Wurman et al. |
| 7,337,139 | B1 | 2/2008 | Ausubel |
| 2001/0042041 | A1 | 11/2001 | Moshal et al. |
| 2002/0046037 | A1 | 4/2002 | Ausubel et al. |
| 2002/0046157 | A1 | 4/2002 | Solomon |
| 2002/0052828 | A1 | 5/2002 | Ausubel |
| 2003/0004850 | A1 | 1/2003 | Li et al. |
| 2003/0018560 | A1 | 1/2003 | Dietrich |
| 2005/0102215 | A1 | 5/2005 | Ausubel et al. |
| 2007/0055606 | A1* | 3/2007 | Ausubel et al. ............ 705/37 |

FOREIGN PATENT DOCUMENTS

| | | | |
|---|---|---|---|
| JP | 2001344457 | A | 12/2001 |
| JP | 2002099777 | A | 4/2002 |
| WO | 0131537 | A2 | 5/2001 |
| WO | 0133400 | A2 | 5/2001 |
| WO | 0133401 | A2 | 5/2001 |

OTHER PUBLICATIONS

Charles R. Plott; "Laboratory Experimental Testbeds: Application to the PCS Auction"; Massachusetts Institute of Technology; Journal of Economics & Management Strategy, vol. 6, No. 3, Fall 1997, pp. 605-638.

Christine Demartini, Anthony M. Kwasnica, John O. Ledyard and David Porter; "A New and Improved Design for Multi-Object Iterative Auctions"; Mar. 15, 1999; 45 pages.

Christopher George Caplice: "An Optimization Based Bidding Process: A New Framework for Shipper-Carrier Relationships", Doctoral Thesis, MIT Jun. 1996.

David C. Parkes and Lyle H. Ungar; "An Ascending-Price Generalized Vickrey Auction"; Stanford Institute for Theoretical Economics (SITE) 2002 Summer Workshop: The Economics of the Internet, Jun. 25-Jun. 29, 2002; pp. 1-56.

David C. Parkes and Lyle H. Ungar; "Iterative Combinatorial Auctions: Theory and Practice"; In Proc. 7th National Conference on Artificial Intelligence (AAAI-00), 8 pages.

David C. Parkes and Lyle H. Ungar; "Preventing Strategic Manipulation in Iterative Auctions: Proxy Agents and Price-Adjustment"; In Proc. 17th National Conference on Artificial Intelligence (AAAI-0); 2000; 8 pages.

David C. Parkes; "iBundle: An Efficient Ascending Price Bundle Auction"; In Proc. ACM Conference on Electronic Commerce (EC-99), Denver, Nov. 1999; 10 pages.

Frank Gul and Ennio Stacchetti; "The English Auction With Differentiated Commodities"; Jul. 22, 1999; 25 pages.

Frank Kelly and Richard Steinberg; "A Combinatorial Auction With Multiple Winners for Universal Service"; Management Science; vol. 46, No. 4; Apr. 2000, pp. 586-596.

Gabrielle Demange, David Gale and Marilda Sotomayor; "Multi-Item Auctions"; Journal of Political Economy; vol. 94, No. 4; 1986; pp. 863-872.

Holger Hoos and Craig Boutilier, "Solving Combinatorial Auctions Using Stochastic Local Search", Proceedings of the National Conference on Artificial Intelligence (AAAI), 8 pages, Aug. 2000.

Jayant Kalagnanam et al.: "Minimizing Procurement Costs for Strategic Sourcing", IBM White Paper, 2001, IBM T.J. Watson Research Center.

Jayant R. Kalagnanam et al.: "Computational aspects of clearing continuous call double auctions with assignment constraints and indivisible demand", IBM Research Report RC21660 (97613), Feb. 2, 2000, pp. 1-15.

John O. Ledyard, David Porter and Antonio Rangel; Experiments Testing MutliObject Allocation Mechanisms; Massachusetts Institute of Technology; Journal of Economics & Management Strategy; vol. 6, No. 3; Fall 1997; pp. 639-675.

Joni L. Jones et al.: "Incompletely Specified Combinatorial Auctions", Oct. 25, 2000, pp. 1-32.

Joni Lynne Jones: "Incompletely Specified Combinatorial Auction: An Alternative Allocation Mechanism for Business-To-Business Negotiations", Doctoral Thesis Presented to the Graduate School of the University of Florida, 2000, UMI No. 9984436, Bell & Howell Information and Learning Company, Ann Arbor, Michigan.

Katia Sycara, "Utility Theory in Conflict Resolution", Annals of Operations Research 12(1988) 65-84.

Lawrence M. Ausubel and Paul R. Milgrom; "Ascending Auctions With Package Bidding"; Frontiers of Theoretical Economics'; vol. 1; Issue 1; Article 1; 2002; 44 pages.

Lawrence M. Ausubel; "An Efficient Ascending-Bid Auction for Multiple Objects"; University of Maryland, Department of Economics; Aug. 7, 2002; 26 pages.

Marta Eso et al.: "Bid Evaluation in Procurement Auctions with Piece-Wise Linear Supply Curves", IBM Research Report RC22219 (W0110-087), Oct. 31, 2001, pp. 1-35.

Michael Rothkopf, Alexander Pekeč and Ronald Harstad, "Computationally Manageable Combinatorial Auctions", Rutcor Research Report, pp. 1131-1147, Apr. 1995.

Moshe Tennenholtz, "Some Tractable Combinatorial Auctions", Proceedings of the National Conference on Artificial Intelligence (AAAI), 6 pages, Aug. 2000.

Noam Nissan, "Bidding and Allocation in Combinatorial Auctions", Proceedings of the ACM Conference on Electronic Commerce (ACM-EC), 25 pages, (2000).

Peter R. Wurman and Michael P. Wellman; "AkBA: A Progressive, Anonymous-Price Combinatorial Auction"; EC' 00, Oct. 17-20, 2000, 9 pages.

Sushil Bikhchandani and Joseph M. Ostroy; "Ascending Price Vickrey Auctions"; University of California, Los Angeles; Anderson School of Management and Dept. of Economics; Aug. 29, 2002; 34 pages.

Tuomas Sandholm and Subhash Suri, "Improved Algorithms for Optimal Winner Determination in Combinatorial Auctions and Generalizations", Proceedings of the National Conference on Artificial Intelligence (AAAI), 8 pages, (2000).

Tuomas Sandholm, "Agents in Electronic Commerce: Component Technologies for Automated Negotiation and Coalition Formation", 26 pages, Mar. 31, 1999, revised Aug. 12, 1999.

Tuomas Sandholm, "An Algorithm for Optimal Winner Determination in Combinatorial Auctions", Proceedings of the Sixteenth International Joint Conference on Artificial Intelligence (IJCAI), 6 pages, (1999).

Tuomas Sandholm, "eMediator: A Next Generation Electronic Commerce Server", Washington University, St. Louis, Department of Computer Science Technical Report, WU-CS-99-02, pp. 341-348, Jan. 1999.

Tuomas Sandholm, Subhash Suri, Andrew Gilpin and David Levine; "Winner Determination in Combinatorial Auction Generalizations"; AAMAS'02, Jul. 15-19, 2002; 8 pages.

Tuomas Sandholm, "An Algorithm for Optimal Winner Determination in Combinatorial Auctions," Jan. 28, 1999, Washington University, WU-CS-99-01.

Yuzo Fujishima, Kevin Leyton-Brown and Yoav Shoham, "Taming the Computational Complexity of Combinatorial Auctions: Optimal and Approximate Approaches", Proceedings of the Sixteenth International Joint Conference on Artificial Intelligence (IJCAI), 6 pages, (1999).

Commerce Quest Announces the EnableNet Private Exchange Server PR Newswire New York; Apr. 10, 2002, p. 1.

* cited by examiner

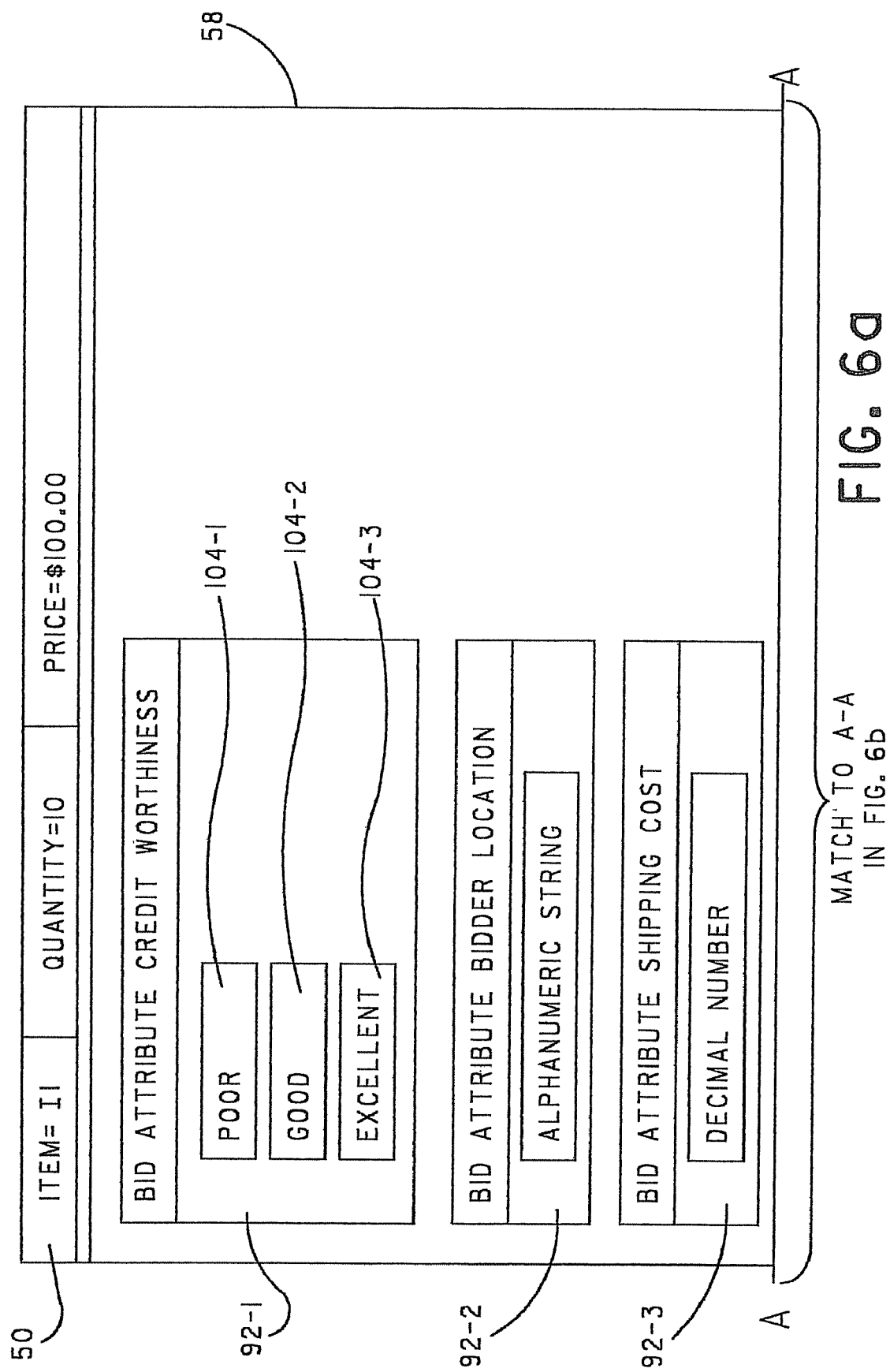

| ALLOCATION CONSTRAINED | |
|---|---|
| BID 5 | |
| BID 10 | VALUE = $1000.00 |
| BID 15 | |

— 240

| ALLOCATION RELAXATION: COST = 1000 | |
|---|---|
| BID 5 | |
| BID 10 | |
| BID 15 | VALUE = $4000.00 |
| BID 20 | |
| BID 25 | |

— 242

| ALLOCATION UNCONSTRAINED | |
|---|---|
| BID 5 | |
| BID 15 | |
| BID 30 | |
| BID 35 | VALUE = $5000.00 |
| BID 45 | |
| BID 55 | |

DEMAND

| ITEM GROUP | ITEM(S) | CRITERION | QTY |
|---|---|---|---|
| 1 | I1 (1st TRUCK LANE) | DECEMBER | 600 (TRIPS) |
| 2 | I1 (1st TRUCK LANE) | JANUARY | 120 (TRIPS) |

ALLOCATION

| BID GROUP | ITEM(S) | CRITERION | QTY |
|---|---|---|---|
| 1 | I1 | DECEMBER | 300 |
| 2 | I1 | DECEMBER | 200 |
| 3 | I1 | DECEMBER | 100 |
| 1 | I1 | JANUARY | 60 |
| 2 | I1 | JANUARY | 40 |
| 3 | I1 | JANUARY | 20 |

500 — SMOOTHING RULE(S) OR CONSTRAINT(S)

FIG. 28

OVERCONSTRAINT DETECTION, RULE RELAXATION AND DEMAND REDUCTION IN A COMBINATORIAL EXCHANGE

CROSS REFERENCE TO RELATED APPLICATIONS

This application is a divisional of U.S. patent application Ser. No. 10/997,765, filed Nov. 24, 2004, which is a continuation-in-part of U.S. patent application Ser. No. 10/254,241, filed Sep. 25, 2002, and a continuation-in-part of U.S. patent application Ser. No. 10/803,549, filed Mar. 18, 2004, now U.S. Pat. No. 7,499,880, all of which are incorporated herein by reference in their entirety.

BACKGROUND OF THE INVENTION

1. Field of the Invention

The present invention relates to combinatorial exchanges and, more particularly, to a method of conducting a dynamic combinatorial exchange, and computer instructions which, when executed by a processor, cause the processor to perform one or more steps of the method.

2. Description of Related Art

Various systems have been proposed and constructed to support online exchanges. The most general type of exchange is a pure exchange which permits one or more bidders to offer to sell and/or purchase one or more items to/from one or more bid takers. An item may be any entity of value, such as a good, service or money. A forward auction is a special case of an exchange with a single seller. A reverse auction is a special case of an exchange with a single buyer.

Combinatorial exchanges support advanced exchange designs and expressive bidding. These features permit the exchange to be designed to achieve best economic efficiency.

One example of expressive bidding is combinatorial bids. Combinatorial bids allow bidders to bid on multiple items with a single bid. The combination, or bundle of items, is determined by the bidder. This is advantageous when the items exhibit complementarity, i.e., when the value of the bundle of items is worth more to the bidder than the sum of the separate item values, or substitutability, i.e., where different items are interchangeable to the bidder. Combinatorial bids allow bidders to express their true preference, resulting in the best economic allocation.

Heretofore, multiple round exchanges were sometimes conducted in an attempt to find a desirable allocation of the bids input into the exchange at any time before or during the course of the exchange event. When determining the allocation in each round of the exchange event, all the available rules were applied. One problem with utilizing all the available rules to determine the allocation in each round of the exchange event is that all of the rules may result in an infeasible allocation or an allocation that does not satisfy a desired exchange objective.

What is, therefore, needed and not disclosed in the prior art is a method for conducting a dynamic combinatorial exchange that overcomes the above problem and others.

SUMMARY OF THE INVENTION

The invention is a method of conducting a combinatorial exchange. The method includes (a) receiving a set of rules for processing of bids received in connection with the exchange; (b) receiving from each of a plurality of exchange participants at least one bid of (1) a first bid type comprised of at least one item, a quantity for each item and a price for all the quantities of all of the items or (2) a second bid type comprised of a first item, a quantity or a range of quantities for said first item and a unit price for said first item; (c) defining a desired exchange objective; (d) determining as a function of a subset of the rules if an allocation of the bids exists that is optimal for the type of exchange being conducted, wherein, if said allocation exists, it includes a subset of the bids, with each first bid type of said subset including all of the items of the bid and at least part of the quantity of each item and with each second bid type of said subset including the quantity or a quantity within the range of quantities for the first item; and (e) if either said allocation does not exist or the desired exchange objective is not satisfied by said allocation, repeating step (d) utilizing a different subset of the rules for each repetition thereof until the desired exchange objective is satisfied.

The method can also include providing at least a portion of each bid of an allocation to each exchange participant of a first subset of the exchange participants and receiving from each exchange participant of a second subset of the exchange participants at least one of a new bid, a new rule, an amendment to an existing rule or an amendment to an existing bid of said exchange participant.

At least one subset of the rules can include at least one rule that was input or amended by an exchange participant of the second subset of exchange participants. Each exchange participant can submit a request to be provided with the at least portion of each bid.

Each subset of exchange participants can include one or more exchange participants that has at least one bid that is not included in the allocation. Each subset of exchange participants can include all or a portion of the plurality of exchange participants and each subset of exchange participants is desirably distinct or unique.

The desired exchange objective can include one or more of elapse of a predetermined period of time from commencement of the exchange; reaching a predetermined time for terminating the exchange; a predetermined maximum or minimum number of winners overall; a predetermined maximum or minimum number of winners in a geographic region; and a predetermined maximum or minimum allocation value.

For each bid of said subset of input bids that consists of at least one item and an expressed or implied quantity of one for each said item, said bid is formed from data entered in one of the following formats: price; price and a non-price attribute; cost-plus; list price minus a discount off of the list price; cost and a non-price attribute; and list price minus a discount off of the list price and a non-price attribute. For each bid of said subset of input bids that consists of at least one item and an quantity of more than one for each said item, said bid is formed from data entered in one of the following formats: price and quantity; and price, quantity and a non-price attribute.

Each subset of the rules can be determined by at least one exchange participant.

The subset of rules utilized in each iteration of step (d) can maintain, enlarge, or reduce a feasible allocation space over the feasible allocation space in the immediately preceding iteration of step (d). Each feasible allocation space includes the set of all possible allocations where each rule of the subset of rules utilized for determining each allocation of said set of allocations is satisfied. Each subset of rules can be distinct or unique.

The number of rules comprising the subset of rules can either increase or decrease with each iteration of step (d), with said increase or decrease based on a predetermined condition, such as, without limitation, a predetermined time during the exchange event.

Each amendment to an existing bid can include an unconditional amendment; an amendment conditioned upon the bid not being included in the immediately preceding allocation; an amendment condition upon said amendment not worsening the bid taker's allocation value or the feasibility of the allocation; an amendment improving the allocation value or volume of items traded; unconditional deletion of the bid; deletion of the bid conditioned upon said bid not being included in the allocation, or deletion of the bid conditioned upon said deletion not worsening the bid taker's value or volume of items traded.

Each amendment to an existing bid can include an amendment to at least one of: a bid price or value; a quantity of at least one item; of at least one item attribute; at least one bid attribute; a discount; and a constraint.

Each exchange participant can be a bidder or a bid taker. A price of a bid received from a bid taker can act as a reserved price for the entire quantity of each item of the bid.

The method can further include notifying at least one exchange participant when an allocation moves away from the desired exchange objective. The at least one exchange participant can be a bidder or a bid taker.

Step (e) can include amending the subset of rules utilized to determine the allocation in the immediately preceding iteration of step (d) to obtain the different subset of rules that is utilized for determining the allocation in the next iteration of step (d). Amending the subset of rules can include (1) adding at least one rule to the subset of rules, (2) deleting at least one rule from the subset of rules and/or (3) amending at least one rule of the subset of rules.

The method can further include designating at least one of the bids as a quote request and reporting to the bidder of said at least one bid a proposed amendment to said bid which, if adopted, will cause said bid to be included in an allocation. The method can further include receiving from the bidder of said at least one bid the amendment proposed thereto and determining an allocation in step (d) subject to the amendment to the at least one bid whereupon said allocation includes the at least one bid.

The method can further include inputting into the exchange each item desired to be sourced during the exchange and a quantity thereof; and inputting M ideal bids, wherein M is a function of at least one of (1) a minimum winners rule having the largest value and (2) a maximum volume percentage rule having the smallest value and each ideal bid is for any quantity of any item input into the exchange. If no allocation of the M ideal bids exists subject to the currently available set of rules, the exchange event is designated as being overconstrained. In one exemplary embodiment, $$M = \frac{\# \text{ items}}{\min\left\{\frac{1}{A}, \frac{B}{2}\right\}} + 1$$

where #items=the sum of the entire quantity of each item input into the exchange; A=the minimum winners rule having the largest value; and B=the maximum volume percentage rule having the smallest value.

When the value of M includes a fraction, the value of M can be rounded up to the next whole number. Desirably, the value of the maximum volume percentage rule having the largest value is less than or equal to the #items. The currently available set of rules includes the set of rules input in step (a) and any amendments, additions or deletions to said set of rules.

The method can further include excluding from the determination of at least one allocation, the bid(s) of at least one bidder not having a bid included in an immediately preceding allocation.

The method can further include, storing at least one volume threshold–average cost threshold pair for at least one item and allocating a subset of the quantities of said item. A sum of the bid prices attributable to the allocated quantities of said item can be divided by a sum of all the allocated quantities of said item to obtain an average cost for each unit of said item. In a reverse auction, if the average cost of said item is greater than the average cost threshold of one of said volume threshold–average cost threshold pairs for said item, a desired quantity of said item to be sourced can be decreased to be less than or equal to the volume threshold of said one volume threshold–average cost threshold pair for said item. In a forward auction, if the average cost of said item is less than the average cost threshold of one of said volume threshold–average cost threshold pairs for said item, a desired quantity of said item to be sold can be increased to be greater than or equal to the volume threshold of said one volume threshold–average cost threshold pair for said item.

In a reverse auction, the desired exchange objective can be satisfied when the average cost for each item allocated is equal to or less than a minimum average cost threshold for said item. In a forward auction, the desired exchange objective outcome can be satisfied when the average cost for each item allocated is equal to or greater than a maximum average cost threshold for said item.

Each set of volume threshold–average cost threshold pair(s) can be stored in the form of one of (1) a curve of volume threshold versus average cost threshold, (2) an algorithm wherein the volume threshold is expressed a function of the average cost threshold, or vice versa, and (3) a set of discrete volume threshold–average cost threshold pairs.

At least one of the bids received in step (b) can have associated therewith: a reference ratio; a discount; a price associated with a quantity Q1 of a first item; a price associated with a quantity Q2 of a second item; and a rule that causes said discount to be applied to an average price of Q1 and an average price of Q2 for the allocated quantity Q1 over the allocated quantity Q2 that equals the reference ratio. The discount can be a percent discount.

For the allocated quantity Q1 and/or the allocated quantity Q2 not necessary to form an instance of the allocated quantity Q1 over the allocated quantity Q2 that equals the reference ratio, said discount is not applied to the average price of Q1 and/or Q2 of said unnecessary quantity.

At least one bid can have associated therewith a rule that requires one of an integer or real number quantity of at least one item of said bid to be included in the allocation. The method can further include relaxing said rule whereupon the other of a real or integer number quantity of said at least one item can be included in the allocation.

The price of each first bid type included in each allocation can be the price included in said bid for all of the quantities of all of the item(s) and the price of the second bid type included in each allocation can include the quantity of the first item times the unit price for the first item.

The second bid type can further include a second item, a first ratio defining the quantity of the second item to be included in each allocation as a function of the quantity of the first item included in the allocation, and a unit price for the second item. The price of the second bid type included in each allocation can include (1) the quantity of the first item included in the allocation multiplied by the unit price for the first item added to (2) the quantity of the second item included in the allocation multiplied by the unit price for the second item. The quantity of the second item included in the allocation can be the quantity of the first item included in the allocation multiplied by the first ratio. The first ratio can be selected from a range of first ratios between a minimum first ratio value and a maximum first ratio value, inclusive.

The second bid type can further include a third item, a second ratio defining the quantity of the third item to be included in each allocation as a function of the quantity of either the first item or the second item included in the allocation, and a unit price for the third item. The price of the second bid type included in each allocation can include (1) the quantity of the first item included in the allocation multiplied by the unit price for the first item added to (2) the quantity of the second item included in the allocation multiplied by the unit price for the second item added to (3) the quantity of the third item included in the allocation multiplied by the unit price for the third item.

The quantity of the third item included in each allocation can be the quantity of either the first item or the second item included in the allocation multiplied by the second ratio. The second ratio can be selected from a range of second ratios between a minimum second ratio value and a maximum second ratio value, inclusive.

The method can further include defining a first trigger bid group, a second trigger bid group, a logical operator connecting the first and second bid groups and a modification. When a total associated with allocated bid(s) of the first trigger bid group is greater than or equal to a first predetermined value, the truth value "true" is associated with the first trigger bid group, otherwise the truth value "false" is associated with the first trigger bid group. When a total associated with allocated bid(s) of the second trigger bid group is greater than or equal to a second predetermined value, the truth value "true" is associated with the second trigger bid group, otherwise the truth value "false" is associated with the second trigger bid group. A logical combination of the truth values associated with the first and second trigger bid groups can be determined subject to the logical operator. When the logical combination of the truth values associated with the first trigger bid group and the second trigger bid group is "true", the modification is applied to the bids of at least one of the first trigger bid group and the second trigger bid group.

The first predetermined value can be is a cost trigger value, the second predetermined value can be a unit volume trigger value and the modification can be a discount value. The logical combination can be one of AND, OR or XOR.

The method can further include defining at least one of (i) a first rule that has associated therewith at least one bid and at least one trigger value–first discount value pair and (ii) a second rule that has associated therewith a first pair of trigger bid groups, a first logical operator connecting the pair of trigger bid groups and a second discount value. When the bid associated with the first rule is allocated and said bid includes a value that equals or exceeds the trigger value, the first discount value is applied to the price of each bid associated with the first rule. When a total associated with allocated bid(s) of each trigger bid group is greater than or equal to a predetermined value for said bid group, the truth value "true" is associated with the trigger bid group, otherwise the truth value "false" is associated with the trigger bid group. When a logical combination of the truth values associated with the first pair of trigger bid groups subject to the first logical operator is determined to have truth value of "true", the second discount value is applied to the price of each bid associated with the second rule.

For each bid associated with the both the first and second rules, the price of said bid can equal an initial price of said bid adjusted by at least one of the first and second discount values.

The method can further include defining at least one of (i) a third rule that has associated therewith at least one bid and at least one trigger value–third discount value pair and (ii) a fourth rule that has associated therewith a second pair of trigger bid groups, a logical operator connecting the pair of trigger bid groups and a fourth discount value. When the bid associated with the third rule is allocated and said bid includes a value that equals or exceeds the trigger value, the third discount value is applied to the price of each bid associated with the third rule. When a total associated with allocated bid(s) of each trigger bid group of the second pair of trigger bid groups is greater than or equal to a predetermined value for said bid group, the truth value "true" is associated with the trigger bid group, otherwise the truth value "false" is associated with the trigger bid group. When a logical combination of the truth values associated with the second pair of trigger bid groups subject to the second logical operator is determined to have truth value of "true", the second discount value is applied to the price of each bid associated with the fourth rule.

For each bid associated with the both the third and fourth rules, the price of said bid can equal the initial price of said bid adjusted by the at least one of the first and second discount values and further adjusted by at least one of the third and fourth discount values. The trigger value can be a cost trigger value or a volume trigger value. Each logical operation can be AND, OR or XOR.

The method can further include dividing a subset of the items into a plurality of item groups based on a unique first criterion associated with the items of each item group and dividing a subset of the bids into a plurality of bid groups based on a unique second criterion associated with the bids of each bid group. The at least one allocation that satisfies the desired exchange objective can include a subset of the total quantity of the items of a first item group divided between the plurality of bid groups, with said subset including all or less than all of the total quantity of the items of the first item group. The at least one allocation that satisfies the desired exchange objective can further include a subset of the total quantity of the items of a second item group divided between the plurality of bid groups, with said subset including all or less than all of the total quantity of the items of the second item group.

The first criterion can be a period of time, a geographical area, an item function, a non-price item attribute, or a legal entity. The second criterion can be an exchange participant identity, a non-price bid attribute, or an exchange participant attribute.

The quantity of the items of the first item group allocated to a first bid group of the plurality of bid groups versus the total available quantity of the items of the first item group can define a first ratio. The quantity of the items of the second item group allocated to the first bid group versus the total available quantity of the items of the second item group can define a second ratio. The first and second ratios can be (i) the same or (ii) different from each other by no more than a predetermined amount.

The quantity or percent quantity of the items of each item group allocated to each bid group can either be equal to or is within range of a predetermined quantity or percent quantity of said items available for allocation that have a unique period of time associated therewith.

For each subset of item groups that has progressive time periods associated with the items thereof, the quantity of at least one item allocated from time period to time period can either increase or decrease by at most a first predetermined amount. After either increasing or decreasing to a limit, the quantity of the at least one item allocated from time period to time period can either decreases or increases, respectively, by at most a second predetermined amount.

For each subset of item groups that has progressive time periods associated with the items thereof, a maximum quantity of at least one item can allocated in one of the time periods and the quantity of the at least one item allocated in each other time period can be within a predetermined quantity of the maximum quantity.

Any one or combination of the foregoing steps can be embodied on computer readable medium as instructions which, when executed by a processor, cause the processor to perform one or more of said steps.

BRIEF DESCRIPTION OF THE DRAWINGS

FIGS. 6a and 6b are a block diagram of a bid and an associated bidder EDD that has rules associated therewith related to bid attributes and bid adjustments;

FIG. 16 illustrates the various allocations resulting from the selection of corresponding desired solutions of the constraint relaxer rule of FIG. 15;

FIG. 21b is a flowchart of the method associated with the connector A of FIG. 21a;

FIG. 28 illustrates a demand and an allocation of the items included in the demand subject to one or more smoothing rule(s) or constraint(s).

DETAILED DESCRIPTION OF THE INVENTION

Figure 1:
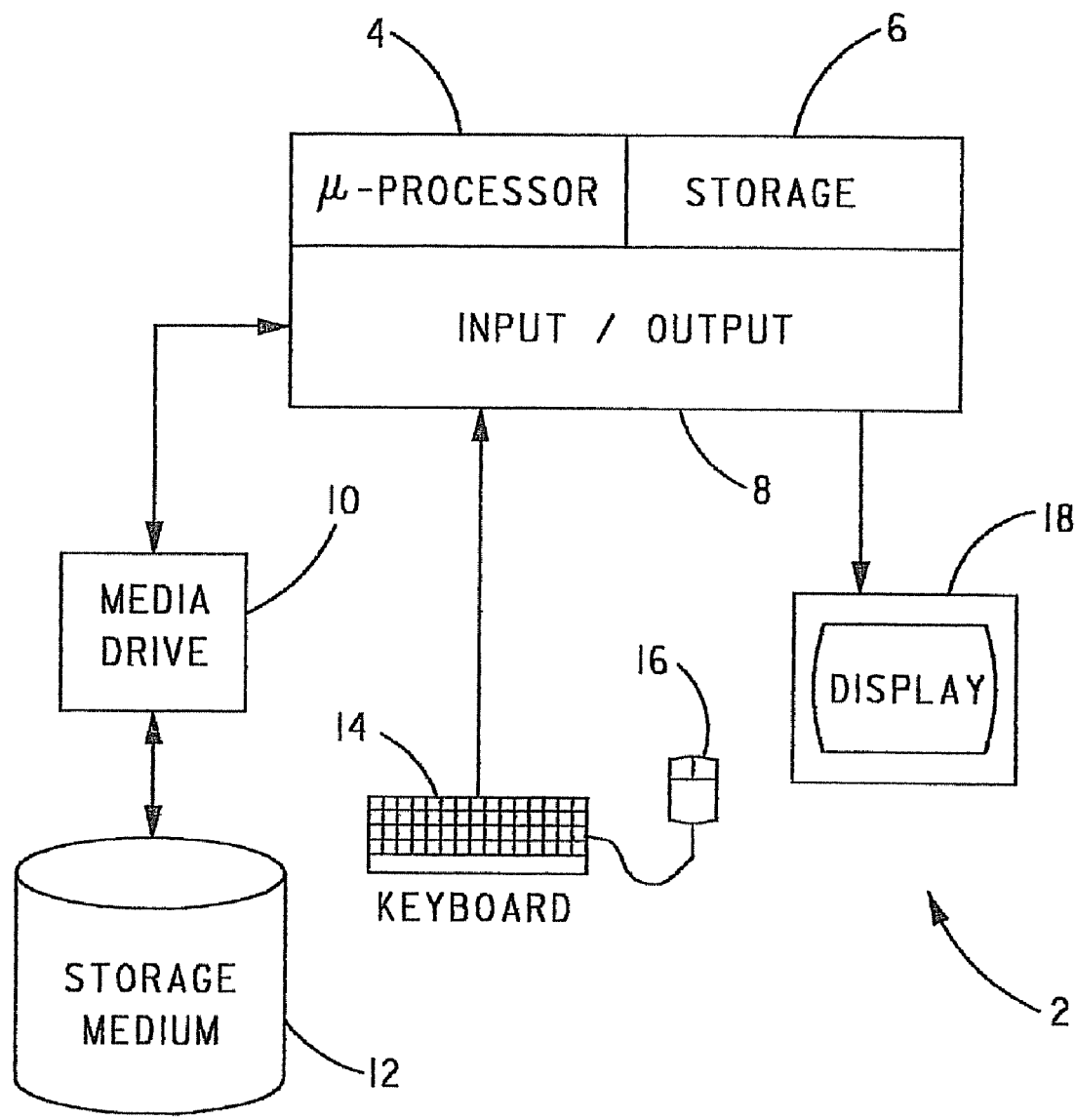
FIG. 1 is a block diagram of an exemplary computer that can be utilized by each participant in a live, expressive combinatorial exchange.

With reference to FIG. 1, the present invention is embodied in computer software which executes on one or more networked computers 2. Each computer 2 includes a microprocessor 4, a computer storage 6 and an input/output system 8. Each computer 2 can also include a media drive 10, such as a disk drive, CD-ROM drive, and the like. Media drive 10 can operate with a computer storage medium 12 capable of storing the computer software that embodies the present invention, which computer software is able to configure and operate computer 2 in a manner to implement the present invention. Input/output system 8 can include a keyboard 14, a mouse 16 and/or a display 18. Computer 2 is exemplary of a computer capable of executing the computer software of the present invention and is not to be construed as limiting the invention.

Figure 2:
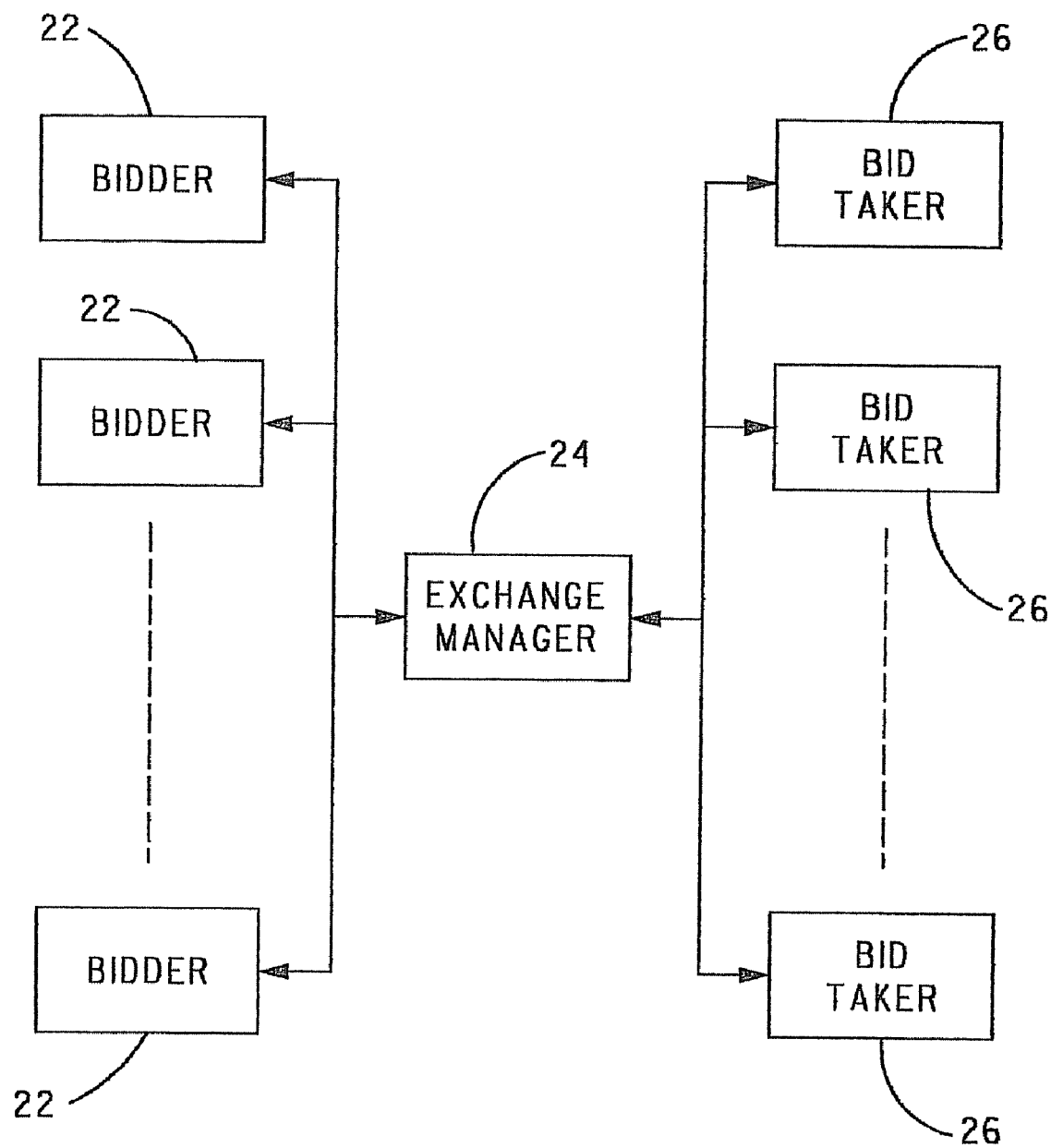
FIG. 2 is a generalized block diagram of networked participants in the live, expressive combinatorial exchange, wherein each participant utilizes a computer of the type shown in FIG. 1 to participate in the exchange.

With reference to FIG. 2, and with continuing reference to FIG. 1, a typical exchange includes a plurality of bidders 22, an exchange manager 24 and a plurality of bid takers 26. Each bidder 22, the exchange manager 24 and each bid taker 26 utilizes a computer 2 of the type described above to conduct the auction. The computer 2 of exchange manager 24 is networked to the computers 2 of bidders 22 and the computers 2 of bid takers 26. The computer 2 of exchange manager 24 includes optimizing software that is utilized to process bids received from bidders 22, and/or rules associated with "exchange description data" (EDD) accompanying one or more bids received from bidders 22 and/or received from one or more bid takers 26. The EDD received from bidders 22 and/or bid takers 26 modifies the manner in which the optimizing software determines a feasible solution or allocation that is optimal for the type of exchange being conducted. Examples of the types of exchanges that can be conducted include a pure exchange having plural bidders and plural bid takers that exchange items such as tangible goods, services and/or money; an exchange having plural buyers and a single seller (forward auction); and an exchange that includes a single buyer and plural sellers (reverse auction). However, this is not to be construed as limiting the invention.

One example of optimizing software includes a linear or mixed integer program solver that includes one or more decision variables each having one or more associated bounds or constraints. Another example of optimizing software suitable for use with the present invention is described in U.S. Pat. No. 6,272,473 which is incorporated herein by reference. In operation, the optimizing software determines an optimal solution or allocation for the type of exchange being conducted subject to bids received from bidders 22, EDD associated with the one or more bids received from bidders 22, and/or EDD received from one or more bid takers 26.

Figures 3, 4:
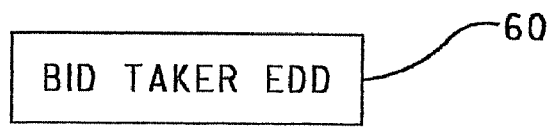
FIG. 3 is block diagram of exemplary bid having bidder exchange description data (EDD) associated therewith.
FIG. 4 is a block diagram of bid taker EDD.

With reference to FIG. 3, and with continuing reference to FIGS. 1 and 2, during an exchange event, each bidder 22 can provide to exchange manager 24 one or more bids 50 that can include one or more items I1 52-1, I2 52-2, I3 52-3, ..., IN 52-N having associated quantities 54-1, 54-2, 54-3, ..., 54-N, respectively, and an associated bid price 56. Each bid 50 can also have associated therewith bidder EDD 58.

Each bidder EDD 58 can include data that a preprocessor of computer 2 of exchange manager 24 converts into one or more rules for processing by the optimization software to determine the optimal allocation of bids. Also or alternatively, each bidder EDD 58 can have associated therewith one or more rules for processing by the optimization software to determine the optimal allocation of bids. Each rule associated with a bidder EDD 58 is typically derived from data entered into fields displayed on a display of the computer 2 of the bidder 22 submitting the bid. However, this is not to be construed as limiting the invention since the rules associated with a bidder EDD 58 may also be derived from data entered into the computer 2 of exchange manager 24 and/or data entered into the computer 2 of one or more bid takers 26.

With reference to FIG. 4, and with continuing reference to FIGS. 1-3, each bid taker 26 can provide to computer 2 of exchange manager 24 one or more bid taker EDD 60, each of which has one or more rules associated therewith, that the optimizing software utilizes to determine the optimal allocation of bids received from bidders 22. Like the rules associated with each bidder EDD 58, the rules associated with each bid taker EDD 60 can be instantiated at the computer 2 of the corresponding bid taker 26 in response to the entry of corresponding data by bid taker 26, or by the preprocessor of the computer 2 of exchange manager 24 from data extracted from the bid taker EDD 60 received from the corresponding bid taker 26. Each rule associated with a bid taker EDD 60 is typically derived from data entered into fields displayed on a display of the computer 2 of the bid taker 26 submitting the bid taker EDD 60. However, this is not to be construed as limiting the invention since the rules associated with a bid taker EDD 60 may also be derived from data entered into the computer 2 of exchange manager 24 and/or data entered into the computer 2 of one or more bidders 22.

As can be seen, each bidder EDD 58 and/or each bid taker EDD 60 includes one or more rules that the optimizing software utilizes to determine the optimal allocation, and/or includes data that a preprocessor of the computer 2 of the exchange manager converts into one or more rules that the optimizing software utilizes to determine the optimal allocation. For the purpose of simplifying the description of the invention, hereinafter, each bidder EDD 58 and each bid taker EDD 60 will be described as having one or more rules associated therewith out regard to where said one or more rules were instantiated.

Each bidder EDD 58 has associated therewith at least one rule related to bid attribute(s), bid adjustment(s), item attribute(s), item adjustment(s), free disposal, action, cost constraint/requirement, unit constraint/requirement, counting constraint/requirement, homogeneity constraint, mixture constraint, cost/unit condition pricing, quote request and reserve price(s). Each bid taker EDD 60 has associated therewith at least one rule related to objective(s), constraint relaxer(s), feasibility obtainer(s) bid adjustment(s), item attribute(s), item adjustment(s), free disposal, action, cost constraint/requirement, unit constraint/requirement, counting constraint/requirement, homogeneity constraint, mixture constraint, cost/unit condition pricing, quote request and reserve price(s). These rules will now be described in greater detail.

Figure 5:
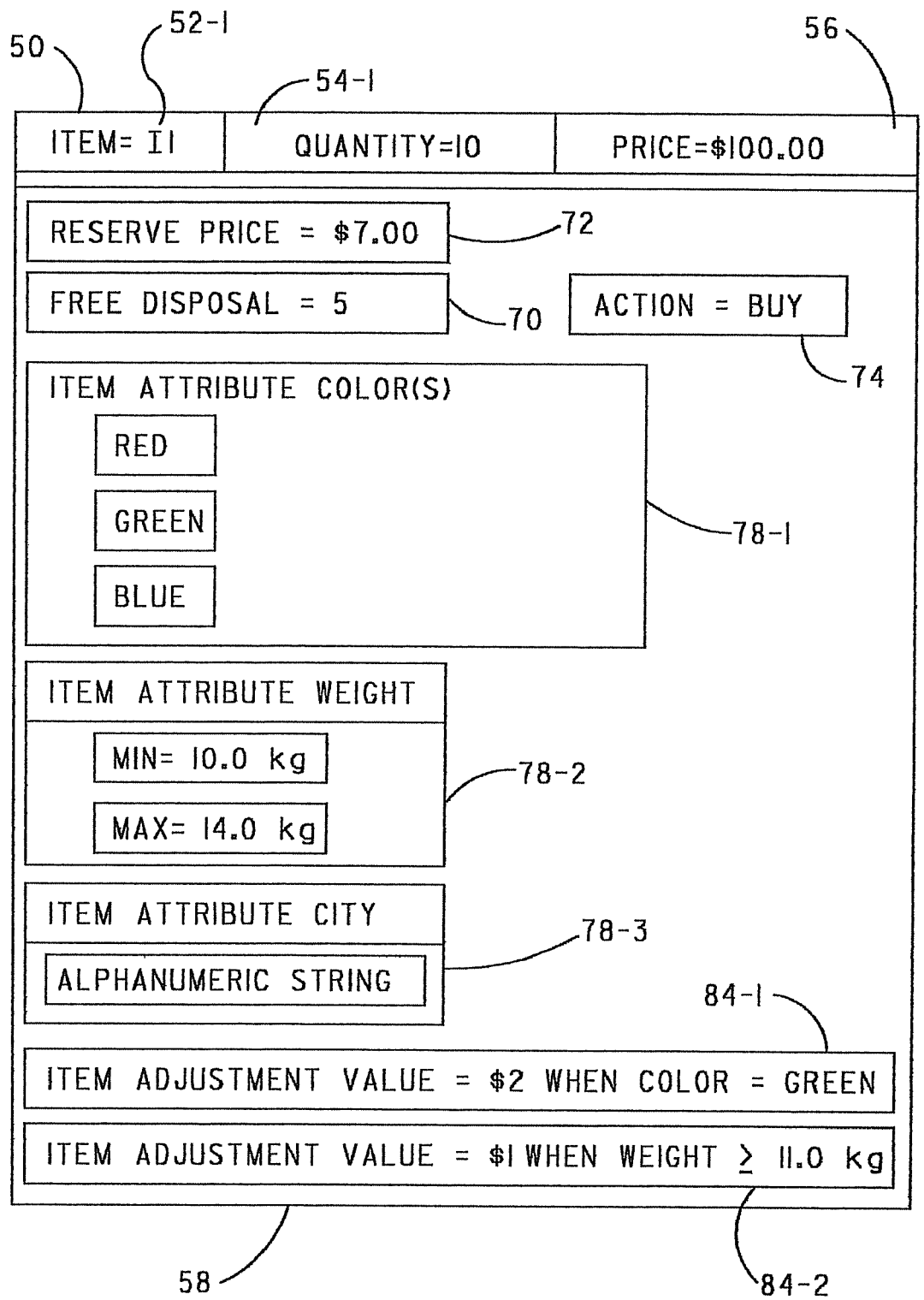
FIG. 5 is a block diagram of a bid having associated therewith bidder EDD that has rules associated therewith related to free disposal, reserve price, action, item attribute and item adjustment.

With reference to FIG. 5, and with continuing reference to FIGS. 1-4, suppose that bid 50 only includes item I1 52-1 for a quantity 54-1 of 10 at a price 56 of $10.00. If bid 50 is created by a bidder 22 acting as a buyer, price 56 indicates the amount bidder 22 is willing to pay (or "bid") for the quantity 54-1 of item 52-1. In contrast, if bid 50 is created by a bidder 22 acting as a seller, price 56 is an amount bidder 22 would like to receive (or "ask") for the quantity 54-1 of the item 52-1. If desired, bid 50 can be for a plurality of items 52, each of which has its own associated quantity, and price 56 can be for all of the quantities of all of the items. In FIG. 5, bid 50 has associated therewith a bidder EDD 58 that has associated therewith one or more rules related to free disposal 70, reserve price 72 and/or action 74.

Free Disposal Rule:

When a bidder 22 acts as a seller, a bidder EDD 58 associated with a bid 50 of bidder 22 can have associated therewith a free disposal rule 70 that enables the optimizing software to sell less than the specified quantity 54-1 of item 52-1 without affecting bid price 56. When bidder 22 is acting as a buyer, the free disposal rule 70 enables the optimizing software to accept more than the specified quantity 54-1 of item 52-1 without affecting the bid price 56. The free disposal rule 70 may be used on both the supply side and demand side of all exchange formats, including forward auctions and reverse auctions. In the example of bid 50 shown in FIG. 5, bidder 22 acting as a seller offering a quantity 54-1 of 10 units of item 52-1 for sale causes the free disposal rule 70 to be associated with bidder EDD 58 of bid 50, and causes a quantity of 5 to be associated with the free disposal rule 70. The association of this quantity with the free disposal rule 70 informs the optimizing software that bidder 22 acting as a seller is willing to sell between 5 and 10 units of item I1 52-1 for bid price 56.

Also or alternatively, free disposal rule 70 can be associated with a bid taker EDD 60 of a bid taker 26. The association of the quantity of 5 with the free disposal rule 70 associated with a bid taker EDD 60 informs the optimizing software that the bid taker acting as a seller or buyer is willing to sell or buy between 5 and 10 units of item I1 52-1 for bid price 56.

Reserve Price Rule:

Bidder EDD 58 can also or alternatively have associated therewith a reserve price rule 72 that has a corresponding reserve price associated therewith. The reserve price associated with reserve price rule 72 informs the optimizing software the maximum price above which bidder 22 acting as a buyer will not buy item 5-1, or a minimum price below which bidder 22 acting as a seller will not sell item 52-1. In bidder EDD 58, a reserve price of $7 is associated with reserve price rule 72. This indicates that bidder 22 acting as a seller or a buyer does not wish to sell or buy any quantity of item 52-1 at a price below or above, respectively, $7.

Also or alternatively, a bid taker EDD 60 can have associated therewith a reserve price rule that causes the optimizing software to set the maximum or minimum price the corresponding bid taker 26 is willing to receive or pay, respectively, for a quantity of an item of a bid.

Action Rule:

Bidder EDD 58 can also or alternatively have associated therewith an action rule 74 that the bidder 22 of the corresponding bid 50 can set either to buy or sell. In a forward auction or exchange, setting action rule 74 to "sell" informs the optimizing software that bidder 22 is acting as a seller and item I1 52-1 is being sold. In a reverse auction or exchange, setting action rule 74 to "buy" informs the optimizing software that bidder 22 is acting as a buyer and item I1 52-1 is being bought. In FIG. 5, action rule 74 is set to buy, indicating that bidder 22 wishes to purchase the quantity 54-1 of ten of item I1 52-1. However, if action rule 74 is set to sell, the quantity 54-1 of ten associated with bid 50 specifies the total number of units of item I1 52-1 that bidder 22 wishes to sell.

Similarly, a bid taker EDD 60 can also or alternatively have associated therewith an action rule, like action rule 74, that informs the optimizing software that the bid taker 26 is acting as a buyer or a seller.

Item Attribute Rule:

Bidder EDD 58 can also or alternatively have associated therewith one or more item attribute rules 78 that the optimizing software utilizes to complete or refine the specification for each item 52 of bid 50. For example, bidder EDD 58 can have associated therewith an item attribute field color rule 78-1, a weight rule 78-2 and/or city rule 78-3 for item 52-1. Bid 50 includes a plurality of items 52, each of which can share one or more item attribute rules 78 and/or can have one or more item attribute rules 78 associated uniquely therewith.

In FIG. 5, item attribute rule 78-1 informs the optimizing software that the only acceptable colors for each unit of item I1 52-1 are red, green and blue. Item attribute weight rule 78-2 informs the optimizing software that the minimum and maximum acceptable weights for each unit of item I1 52-1 are 10 kg and 14 kg, respectively. Item attribute city rule 78-3 informs the optimizing software the name of the city where item I1 52-1 is to be shipped from. Other item attribute rules associated with bidder EDD 58 can include, without limitation, width, height, purity, concentration, pH, brand, hue, intensity, saturation, shade, reflectance, origin, destination, volume, earliest pickup time, latest pickup time, earliest drop-off time, latest drop-off time, production facility, packaging and flexibility.

In response to receiving bid 50 having associated therewith bidder EDD 58 with action rule 74 is set to "buy", if a sell bid is received that specifies a color not listed in item attribute color rule 78-1, a weight outside the range listed in item attribute weight rule 78-2 or a city not listed in item attribute city rule 78-3, the optimizing software will not include the sell bid in the allocation. Otherwise, the sell bid will be processed by the optimizing software when determining the allocation.

Similarly, a bid taker EDD 60 can also or alternatively have associated therewith one or more item attribute rules, like item attribute rules 78, that inform the optimizing software that the corresponding bid taker 26 acting as a seller or a buyer is willing to sell or buy only items having the item attributes listed in a corresponding item attribute rule.

Item Adjustment Value Rule(s):

Bidder EDD 58 can also or alternatively have associated therewith one or more item adjustment value rules 84 that the optimizing software utilizes to process bid 50. Each item adjustment value rule 84 includes a condition and value whereupon, if the condition is valid, then the value is applied to the bid. For example, bidder EDD 58 can have associated therewith item adjustment value rules 84-1 and 84-2. Item adjustment value rule 84-1 informs the optimizing software that a value of $2 should be applied, e.g., added, to the price of a bid e.g., a sell bid responsive to buy bid 50 in FIG. 5, for each unit of a green colored item I1 52-1 included in the bid. Item adjustment value field 84-2 informs the optimizing software that a value of $1 should be applied to a bid for each unit of item 54-1 that has a weight greater than or equal to 11.0 kg.

Bid taker EDD 60 can also or alternatively have associated therewith one or more item adjustment value rules, like item adjustment value rule 84, that inform the optimizing software that the corresponding bid taker is willing to adjust a value paid for or received by the bid taker if a condition associated with each item adjustment value rule is satisfied.

As can be seen, the free disposal, reserve price, action, item attribute(s) and item adjustment(s) rules of bidder EDD 58 and/or bid taker EDD 60 operate on one or more items of a bid 50. However, it may also or alternatively be desirable for bidder EDD 58 and/or bid taker EDD 60 to have associated therewith rules that operate on a bid 50 as a whole versus one or more items of bid 50. Two types of rules that operate on a bid as a whole are bid attribute rule(s), which are used with bidder EDD 50, and bid adjustment rule(s), which can be used with bidder EDD 58 and/or bid taker EDD 60. These rules will now be described.

Figure 6B:
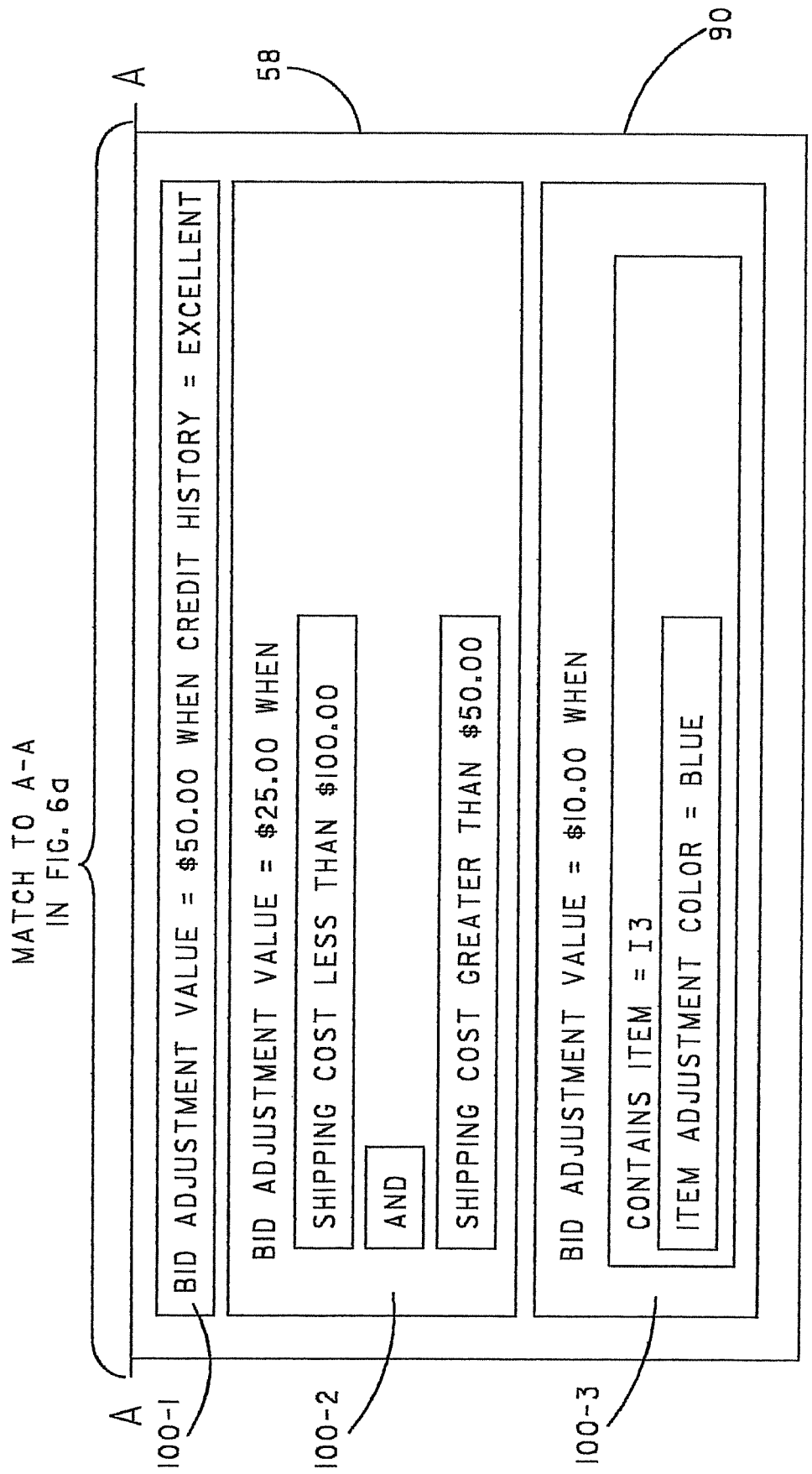

With reference to FIGS. 6a-6b, and with continuing reference to FIGS. 1-5, bidder EDD 58 can also or alternatively have associated therewith one or more bid attribute rules 92 and/or one or more bid adjustment rules 100 that quantify the effects of non-price attribute(s), e.g., item attribute(s), discussed above, and bid attribute(s), discussed hereinafter, on the determination of whether bid 50 is satisfied. These attribute(s) can be properties that allow incomplete item specification and, therefore, more economically efficient and participant-friendly market places. Any measurable, quantifiable or qualitative attribute can be defined to determine the parameters and character of the exchange.

Bid Attribute Rule:

Exemplary bid attribute rules 92 include a credit worthiness rule 92-1, a bidder location rule 92-2 and a shipping cost rule 92-3. In FIG. 6a, credit worthiness rule 92-1 includes three selections 104-1-104-3 by which a bid 50 can be set to a level of credit worthiness of the bidder. The selection of the credit worthiness "Poor" 104-1 informs the optimizing software that the bidder 22 of bid 50 has bad credit. Likewise, the selection of the credit worthiness "Good" or "Excellent" 104-2 or 104-3 informs the optimizing software that the bidder 22 of bid 50 has good or excellent credit. To avoid falsification of credit worthiness, the selection of a credit worthiness 104 associated with credit worthiness rule 92-1 is typically made by exchange manager 24. However, this is not to be construed as limiting the invention.

Location rule 92-2 can have associated therewith data, in the form of an alphanumeric string, that informs the optimizing software where the bidder of bid 50 resides. Shipping cost rule 92-3 can have associated therewith data, in the form of a decimal number, that informs the optimizing software the shipping cost of the items of bid 50. If a bid taker 26 or exchange manager 24 desires to award a certain percentage of the allocated bids to bidders living in a particular location, e.g., city, county, state, region, etc., the optimizing software can be configured to determine the allocation of the bids based on the data associated with the bid attribute bidder location rule 92-2. Similarly, the optimizing software can be configured to determine the allocation based upon the data associated with shipping cost rule 92-3. Other bid attributes that can be associated with a bid attribute rule 92 include bidder reliability, bidder reputation, bidder timeliness, freight terms and conditions, insurance terms and conditions, bidder distance and bidder flexibility.

Bid Adjustment Rule:

Bidder EDD 58 can also or alternatively have associated therewith one or more bid adjustment rules 100 that are similar syntactically to the item adjustment rules previously described. Data associated with a bid adjustment value rule 100-1 in FIG. 6b causes the optimizing software to increase the price of bid 50 by $50 when "Excellent" 104-3 associated with credit worthiness rule 92-1 is selected. If "Poor" 104-1 or "Good" 104-2 associated with credit worthiness rule 92-1 is selected, however, the optimizing software will not change the price of bid 50.

Bid adjustment value rule 100-2 can have associated therewith expressions and data that informs the optimizing software to increase the price of a bid 50 by $25 when the data associated with shipping cost rule 92-3 has a value between $50 and $100. Bid adjustment value rule 100-2 can also have associated therewith a logical operator AND as a connector between expressions. In addition to AND, the logical operators OR and NOT can also be utilized as connectors. Moreover, logical operators may be nested within other logical operators.

Bid adjustment value rule 100-2, causes the optimizing software to determine whether the actual shipping cost falls within the specified range using tests. The first test determines if the actual shipping cost is less than a first value, in this example $100. The second test determines if the actual shipping cost is greater than a second value, in this case $50. Each of these tests, i.e., "less than" and "greater than", are from a group of operators over non-price attributes. Other operators include "equal to", "less than", "less than or equal to", "greater than", "greater than or equal to", and "contains item".

The expressions and data associated with each bid adjustment value rule 100-1-100-3 are formatted as a conditional test. Namely, IF the condition holds THEN the specified adjustment is applied. It is envisioned that more complex expressions can be created that allow for dependence of whether the adjustment is applied based on multiple expressions.

Bid adjustment value rule 100-3 has a "contains item" expression associated therewith that can be utilized for two purposes. First, it tests whether or not a bid contains an item, e.g., item I3. It should be appreciated that the "contains item" expression can only be used in connection with a bid adjustment rule. In the example shown in FIG. 6b, bid adjustment value rule 100-3 informs the optimizing software to increase the price of bid 50 by $10 when bid 50 contains item I3. Second, the "contains item" expression can be utilized for specifying item attributes inside of a bid adjustment. In the example shown in FIG. 6b, bid adjustment value rule 100-3 informs the optimizing software to increase the price of bid 50 by $10 when bid 50 contains item I3 and the color of item I3 is blue. If bid 50 does not include item I3, or if item I3 is not blue, the optimizing software will not adjust the price of bid 50 based on the expressions and data associated with bid adjustment value rule 100-3.

Each bid adjustment value rule 100 is typically one of two exemplary types: additive or multiplicative. An additive bid adjustment value rule applies a positive (or negative) value to a bid if the corresponding condition holds for the bid. An additive bid adjustment value rule can either be absolute or per unit. An absolute additive adjustment is applied to a bid if the corresponding condition holds. A per unit additive bid adjustment rule is multiplied by the number of units of the item in the bid before application to the bid. A multiplicative adjustment is only used with bid adjustments, not with item adjustments. A multiplicative adjustment applies a specified percentage correction to a value of a bid if the corresponding condition holds. If the percentage is positive, the correction increases the value of the bid. If the percentage is negative, the correction decreases the value of the bid. These particular adjustments are not to be construed as limiting the invention since the use of other suitable adjustments is envisioned.

Bid taker EDD 60 can also or alternatively have associated therewith one or more bid adjustment rules 100 that inform the optimizing software that the bid taker 26 is willing to adjust, for example, a value the bid taker 26 pays or receives for one or more items if one or more conditions included in the bid taker EDD 60 are valid.

Figure 7A:
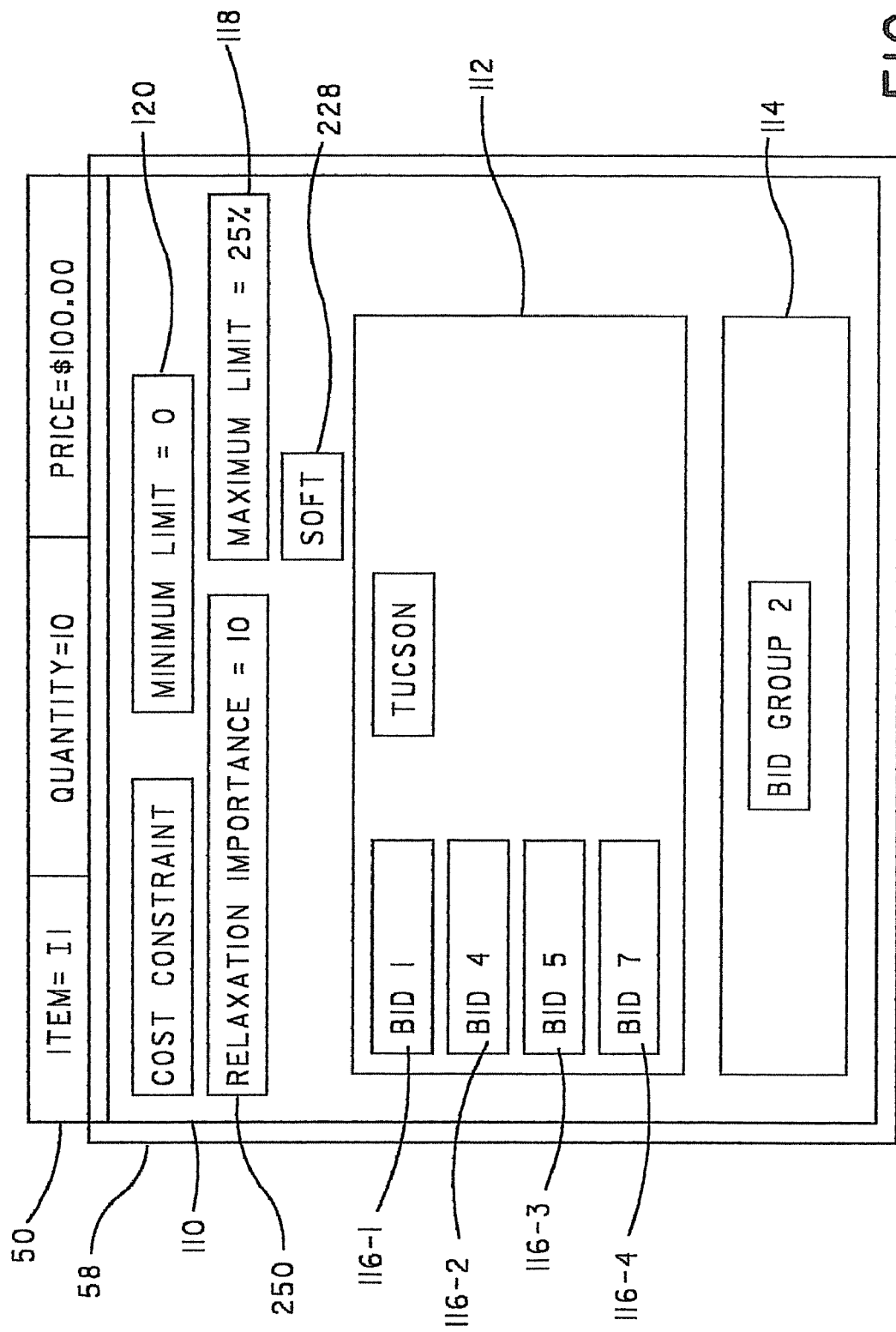
FIG. 7a is a block diagram of a bid and an associated bidder EDD that has a cost constraint rule associated therewith.
Figure 7B:
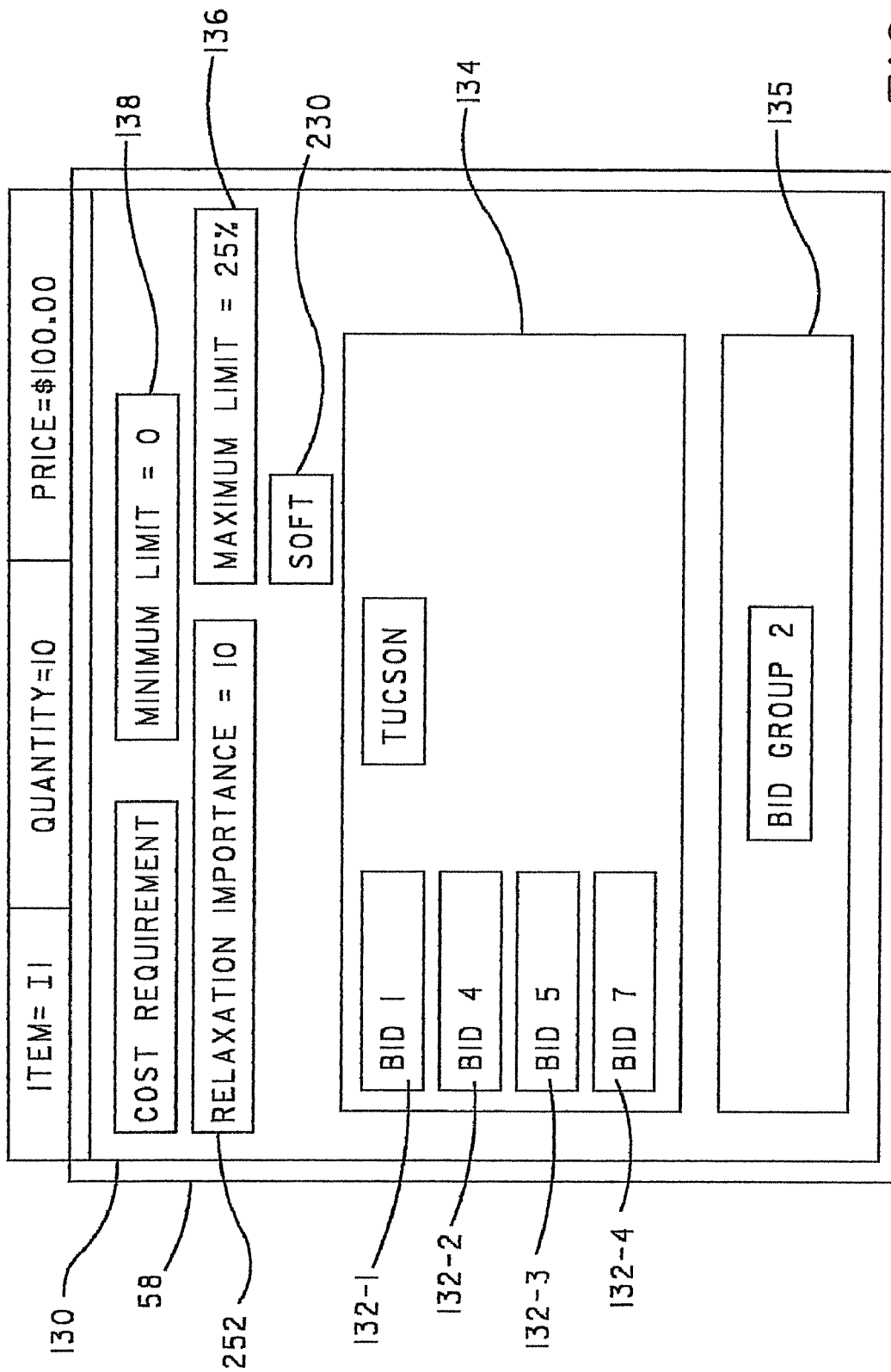
FIG. 7b is a block diagram of a bid and an associated bidder EDD that has a cost requirement rule associated therewith.

Constraint Rule:

With reference to FIGS. 7a-7b, and with continuing reference to all previous figures, bidder EDD 58 and/or bid taker EDD 60 can also or alternatively have associated therewith one or more rules that impose one or more limits on some aspect of the outcome of an allocation. For example, a rule can have data associated therewith for limiting the maximum number of winning buyers in a forward auction or the maximum number of winning sellers in a reverse auction. Another rule can have data associated therewith for limiting the currency volume sold to any one bidder. Still further, another rule can have data associated therewith for limiting the quantity of an item that a single supplier can supply. The purpose of these rules is to enable the optimizing software to determine one or more feasible allocations that meet the objectives of the market. To this end, such rules are typically associated with a bid or bid group by exchange manager 24. However, this is not to be construed as limiting the invention. These rules cause the optimizing software to determine the allocation in a manner that conforms to desired minimum and/or maximum limits. Examples of such rules include a cost constraint rule, a unit constraint rule, a counting constraint rule, a homogeneity constraint rule and a mixture constraint rule, each of which will now be described.

Cost Constraint Rule:

As shown in FIG. 7a, bidder EDD 58 can also or alternatively have associated therewith a cost constraint rule 110 that causes the optimizing software to restrict the winning allocation by establishing a limit that is based on winning bid prices and quantities. For example, cost constraint rule 110 can have associated therewith two bid groups 112 and 114. Bid group 112 is a constrained group while bid group 114 is a control group. Bid group 114 is shown in FIG. 7a for illustration purposes, but it is assumed to be an empty group. There can be many reasons to constrain a group of bids. For example, an exchange may have a need to limit the sum of the prices all of the bids from bidders in a first city. Accordingly, a bid group is established with all of the bidders from the first city. It may also be desirable to limit the number of bidders from the first city as compared to a second city.

Cost constraint rule 110 of bidder EDD 58 causes the optimizing software to compare the bid groups 112 and 114 with respect to the sum of the prices of their winning bids. If the comparison is based on percentage, then the sum of the prices of the winning bids associated with bid group 112 divided by that of the bid group 114 must be less than a value of a maximum limit 118 associated with cost constraint rule 110 and greater than a value of a minimum limit 120 associated with cost constraint rule 110. For a comparison based on percentage, to avoid division by zero (0) when no bids are associated with bid group 114 or if bid group 114 does not exist, an imaginary second bid group (not shown) can be created that contains all of the winning bids. The comparison based on percentage is then determined by dividing the sum of the quantity of items of the bids allocated to bid group 112 by that of the imaginary second bid group and comparing the solution to the maximum limit value and/or the minimum limit value.

If the comparison is absolute, then the sum of the prices of the bids associated with bid group 112 must be at least the minimum limit value more than that of the bids associated with bid group 114, and at most the maximum limit value less than that of the bids associated with bid group 112.

For example, suppose that a forward auction includes a plurality of bids where four bids 116-1-116-4 are made by bidders who fall into a group of interest, e.g., bidders from Tucson, where it is desirable to limit, based on cost, the value of the bids of this group. Suppose that cost constraint rule 110 has associated therewith a percent maximum limit 118 value of 25%. In this example, because it is desired to limit the allocation as to the value of the bids of the Tucson bidders, bids 116-1-116-4 are associated with bid group 112. This association causes the optimizing software to limit the percentage of the total allocation awarded to the bidders of these bids to the percent maximum limit 118 of cost constraint rule 110. In the example, if the sum of the values of bids 116-1-116-4 exceed 25% of the total allocation value, the solution is infeasible. If desired, cost constraint rule 110 can also or alternatively have associated therewith a minimum limit 120 which causes the optimizing software to establish a lower limit on the total allocation value.

Each cost constraint rule is strict a constraint in the sense that it must be satisfied or the allocation is infeasible. For example, a cost constraint rule can limit a bidder to receive a minimum of at least 50% of the total allocation value. Thus, if a bidder places a bid having a value of $11 in an exchange where the total allocation value of the exchange is $21, then the value of the cost constraint rule is $11/$21 or 52.38%. Since 52.38% is greater than the cost minimum limit of 50%, the allocation is feasible. However, if the cost constraint minimum is raised to 60%, the allocation is infeasible because 52.38% is less than 60%. In some situations, it may be desirable for the bidder to be required to be awarded at least 50% of the allocation, or else be awarded no allocation.

Bid taker EDD 60 can also or alternatively have associated therewith a cost constraint rule, like cost constraint rule 110, that informs the optimizing software that the corresponding bid taker 26 is only willing to buy or sell items subject one or more constraints associated with the cost constraint rule.

Cost Requirement Rule:

With reference to FIG. 7b, bidder EDD 58 can also or alternatively have associated therewith a cost requirement rule 130 that causes the optimizing software to withhold a bid or bid group from an allocation if a condition is not satisfied. Cost requirement rule 130 is syntactically similar to cost constraint rule 110. However, where cost constraint rule 110 can make a solution infeasible, cost requirement rule 130 enables the optimizing software to construct an allocation where a bid or bid group that otherwise would be allocated is withheld from the allocation because a constraint on the bid or bid group is not satisfied. Stated differently, if a cost constraint rule is not satisfied, the whole allocation is infeasible. In contrast, if a cost requirement rule is not satisfied, the bidder receives nothing, but the allocation is not necessarily infeasible.

For example, assume that a forward auction includes a plurality of bids where four bids 132-1-132-4 are made by bidders who fall into a group of interest, e.g., bidders from Tucson, where it is desired to limit, based on cost, the value of the bids of the particular bidders. Suppose that cost requirement rule 130 has associated therewith a percent maximum limit 136 value of 25%. In this example, because it is desired to limit the allocation as to the value of the bids of the Tucson bidders, bids 132-1-132-4 are associated with bid group 134. If the sum of the values of bids 132-1-132-4 exceeds 25% of the total allocation value, the Tucson bidders receive nothing in the allocation. In order for the bids included in bid group 134 to be allocated, the percent values of these bids must be less than the value of the percent associated with maximum limit 136 of cost requirement rule 130. If desired, cost requirement rule 130 can also or alternatively have associated therewith a minimum limit field 138 which causes the optimizing software to set a lower limit on the percent of the total allocation value.

Bid taker EDD 60 can also or alternatively include a cost requirement rule, like cost requirement rule 130, that informs the optimizing software that the corresponding bid taker 26 is only willing to buy or sell one or more items if one or more constraints of bidder EDD 60 are satisfied. If the one or more constraints of bidder EDD are not satisfied, the bid taker 26 receives nothing, but the allocation is not necessarily infeasible.

Figure 8D:
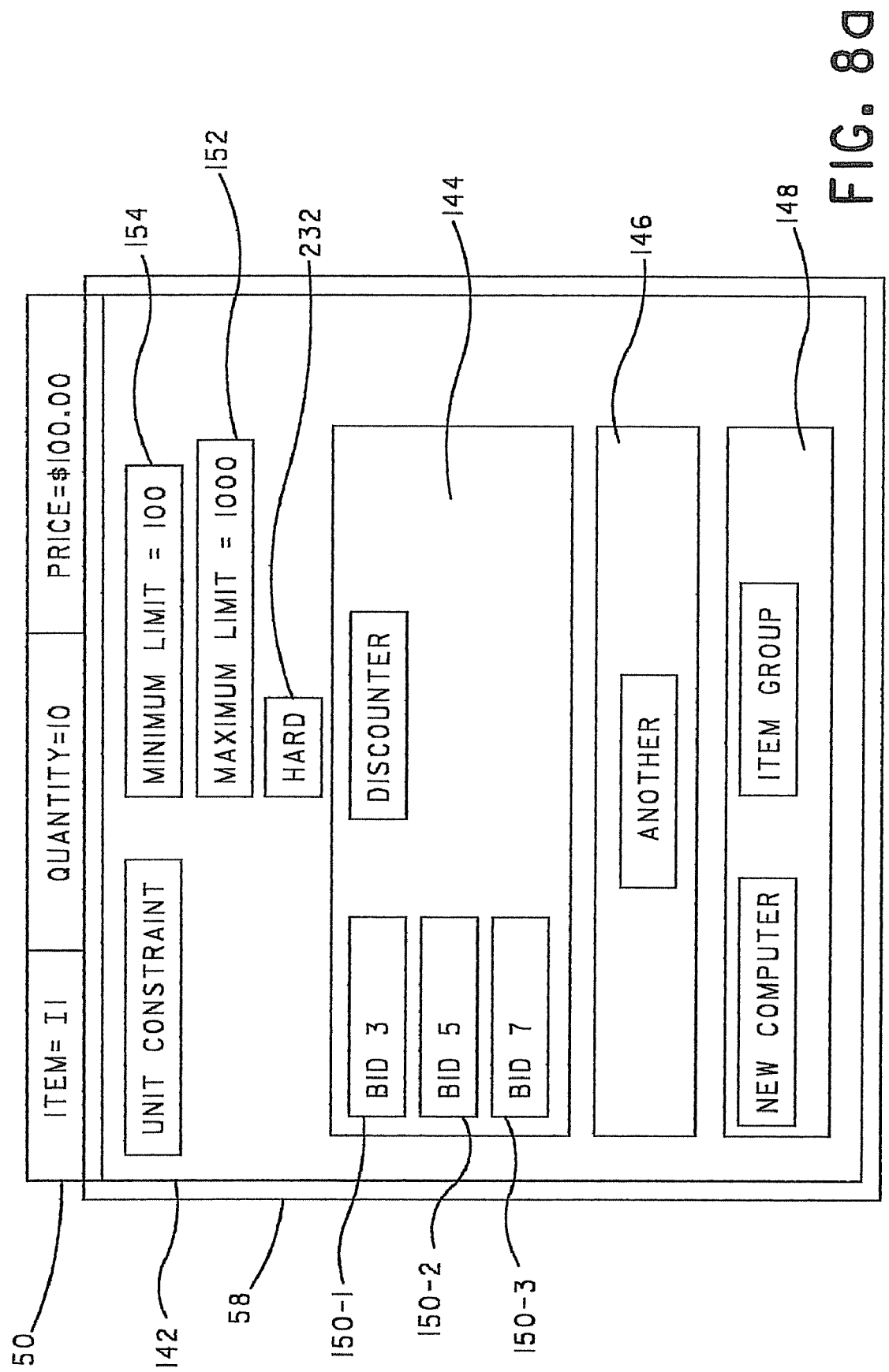
FIG. 8a is a block diagram of a bid and an associated bidder EDD that has a unit constraint rule associated therewith.
FIG. 8b is a block diagram of a bid and an associated bidder EDD that has a unit requirement rule associated therewith.

Unit Constraint Rule:

With reference to FIG. 8a, bidder EDD 58 can also or alternatively have associated therewith a unit constraint rule 142 that causes the optimizing software to restrict the winning allocation by setting a limit which is based on a quantity of items that are bought and/or sold in winning bids. For example, unit constraint rule 142 can have bid groups 144 and 146 and an item group 148 associated therewith. Suppose that a forward auction includes a plurality of bids where three bids 150-1-150-3 are made by one bidder where it is desired to limit the quantity of items awarded to that bidder. Moreover, suppose that the bidder is a buyer for a large computer discounter and that each of the three bids is for as many units as are available of a new computer. Furthermore, suppose that 2000 of these computers are available and that there is a need to distribute some of the computers to other buyers in order to facilitate the development of a wide customer base. Lastly, suppose that it is desired to limit the quantity of computers awarded to the bidder of bids 150-1-150-3 to one-half of the available computers, or 1000 computers. Since it is desired to limit the bidder, bids 150-1-150-3 are included in bid group 144 and the item associated with bids 150-1-150-3, i.e., a new computer, is included in item group 148. A suitable value, in this example 1000, is associated with a maximum limit 152 of unit constraint rule 142 to limit the maximum quantity of computers the bids included in bid group 144 are awarded. In this example, bids 150-1-150-3 of bid group 144 can be awarded no more than 1000 units. When the allocation is returned, the computer discounter is allocated no more than 1000 units by the optimizing software. Also or alternatively, a suitable value, in the example shown in FIG. 8a, 100, is associated with a minimum limit 154 of unit constraint rule 142 for limiting the minimum quantity of units that are allocated to the bids included in bid group 144. In this example, item group 148 includes only computers. However, any part or item that would be useful to limit the allocation can also or alternatively be included in item group 148 or a corresponding item group.

As with cost constraint rules, there are two types of comparisons that can be made, namely, an absolute comparison, as in the foregoing example of limiting the number of computers allocated to a computer discounter, and a comparison based on percentage. In a comparison based on percentage, the sum of the quantity of items of the allocated bids in bid group 144 divided by the sum of the items of the allocated bids in a bid group 146 must be less than a maximum percentage (not shown) and/or greater than a minimum percentage (not shown). The maximum percentage and the minimum percentage can also be the same if the allocation of an exact percentage of items is desired. To avoid division by zero (0) when bid group 146 does not exist or bid group 146 does not include any bids, a virtual second bid group (not shown) can be created that contains all of the winning bids. The comparison based on percentage is then determined by dividing the sum of the quantity of items of the winning bids of bid group 144 by that of the virtual second bid group and comparing the solution to the value associated with the maximum percentage and/or the minimum percentage.

For example, assume it is desired to limit the percentage of items awarded the bids included in bid group 144. Accordingly, a desired percentage (not shown) is associated with maximum limit 152 of unit constraint rule 142. This percentage causes the optimizing software to limit the percentage of available computers allocated to bids 150-1-150-3 to the desired percentage.

Unit constraint rules, like cost constraint rules, are strict in the sense that they must be satisfied or the allocation will be infeasible. For example, a unit constraint rule can require a bidder to receive at least 1000 units of an item in an auction. Thus, if a bidder places two bids that are allocated 500 units and 1000 units of the item, since this bidder satisfied the 1000 unit requirement, the allocation is feasible. However, if the bidder places two or more bids, but the total number of units of the item of all the bidder's bids does not add up to 1000 units, then the solution is infeasible, and there is no allocation to the bidder.

Bid taker EDD 60 can also or alternatively include a unit constraint rule, like unit constraint 142, that informs the optimizing software that the corresponding bid taker 26 wishes to buy or sell no more and/or no less than a certain number of units of one or more items.

Figure 8B:
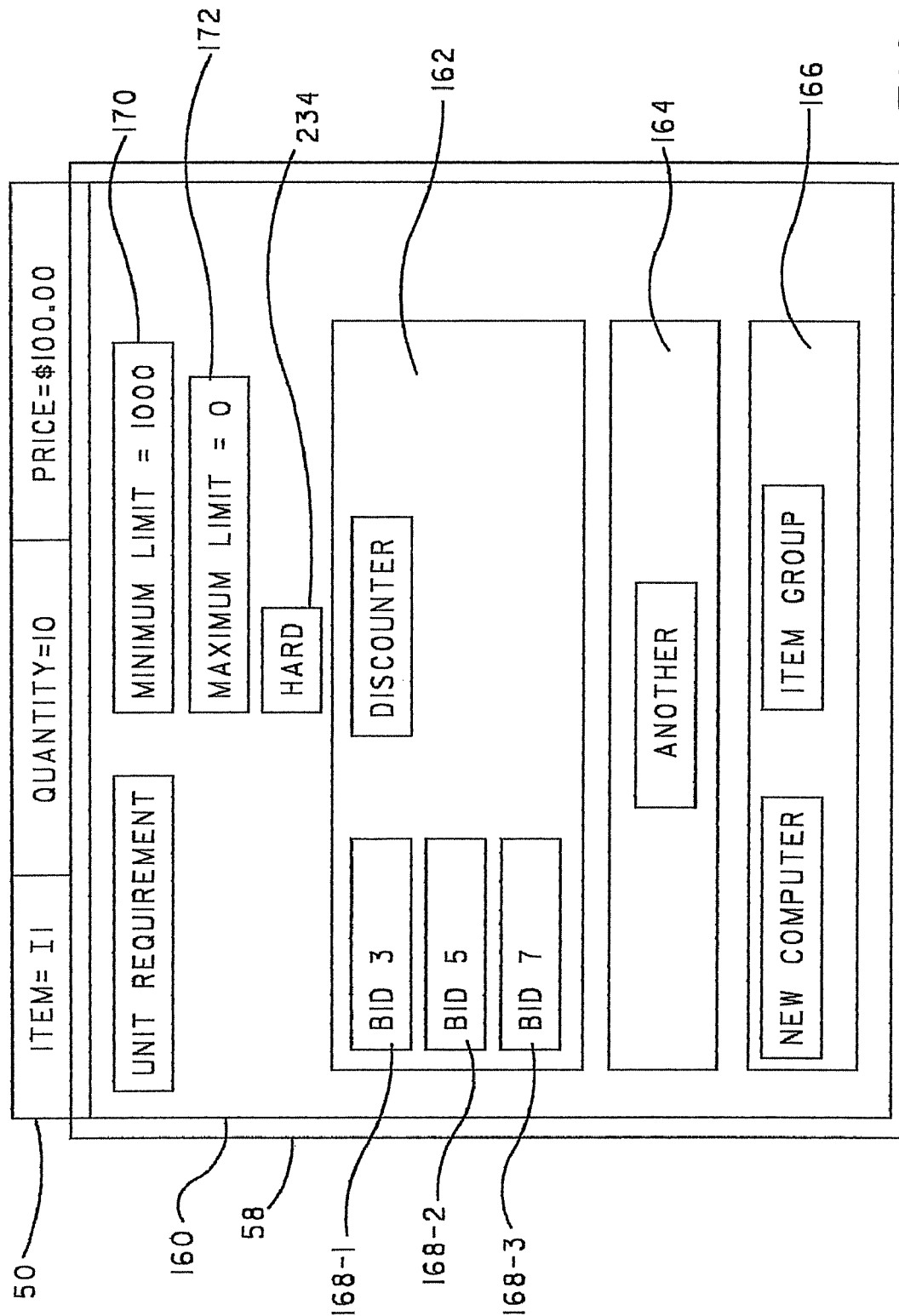

Unit Requirement Rule:

With reference to FIG. 8*b*, bidder EDD 58 can also or alternatively have associated therewith a unit requirement rule 160 that enables the optimizing software to allocate a quantity of zero to a bidder to provide a winning allocation. Unit requirement rule 160 is syntactically similar to a unit constraint rule 142. However, where unit constraint rule 142 makes the solution infeasible, unit requirement rule 160 enables a quantity of zero to be allocated.

For example, suppose a forward auction includes a plurality of bids where three bids 168-1-168-3 are made by a bidder to whom it is desired to limit the quantity of awarded items. Suppose that the bidder is the buyer from the large computer discounter and the three bids are for new computers. For this exchange, there is a need to sell all the computers as quickly as possible. Accordingly, it is desired to sell a large quantity of the available computers to the computer discounter. Unit requirement rule 160 causes the optimizing software to allocate at least 1000 computers to the bidder. Since it is desired to limit the bidder, unit requirement field 160 can have associated therewith a bid group 162 that includes bids 168-1-168-3 placed by the bidder. The items for this example, i.e., new computers, are associated with an item group 166. The number of units of the item associated with item group 166 that are allocated to the bids included in bid group 162 is limited to the value, e.g., 1000, of minimum limit 170 of unit requirement rule 160 and by the value, e.g., 0, associated with a maximum limit 172 of unit requirement rule 160. In this example, the bidder will be allocated 1000 or more computers, or no computers. If the bidder is allocated no computers, however, the allocation is still feasible.

Bid taker EDD 60 can also or alternatively include a unit requirement rule, like unit requirement rule 160, that informs the optimizing software that the corresponding bid taker 26 is willing to buy or sell a maximum and/or minimum quantity of units of one or more items.

Figure 9A:
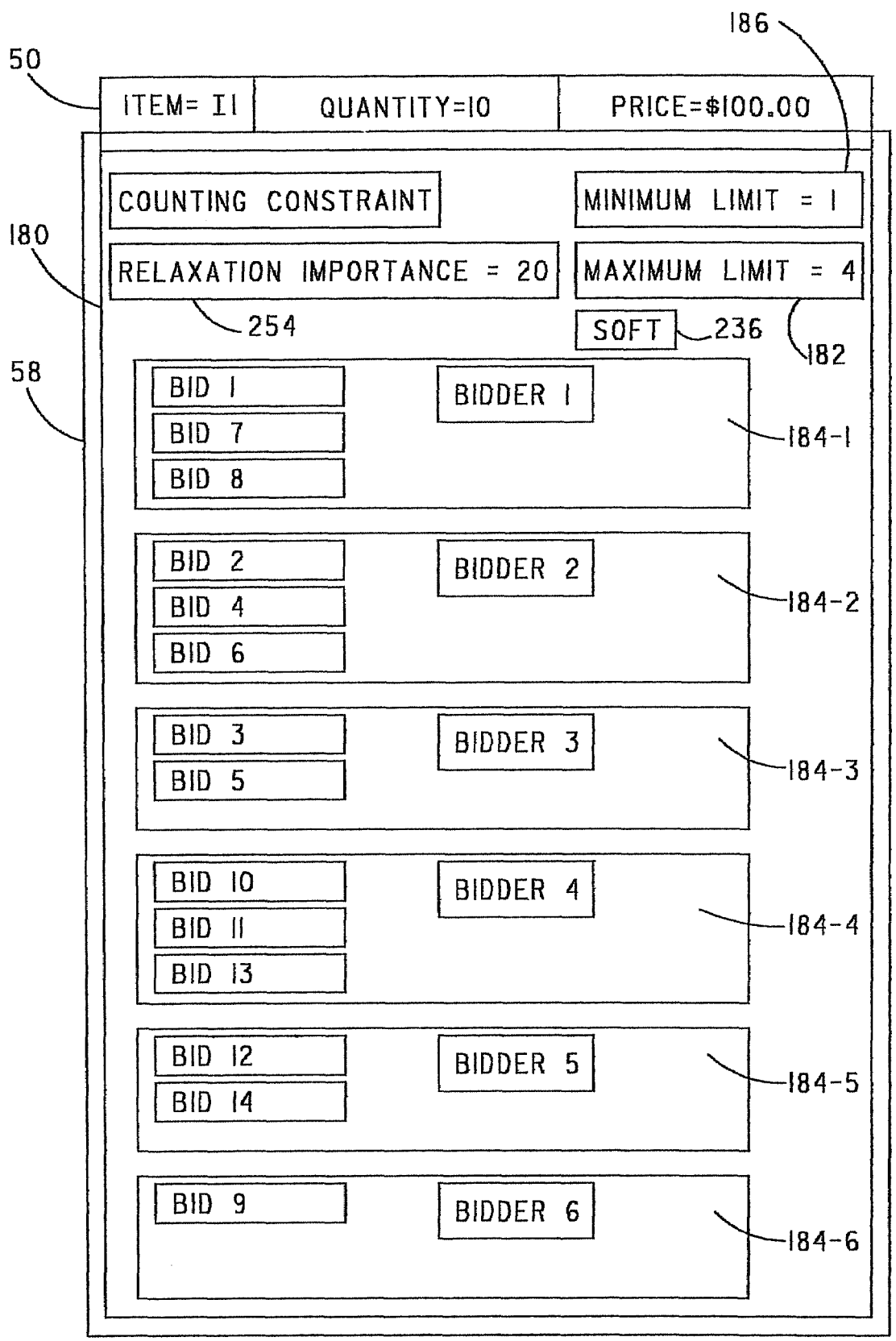
FIG. 9a is a block diagram of a bid and an associated bidder EDD that has a counting constraint rule associated therewith.

Counting Constraint Rule:

With reference to FIG. 9*a*, bidder EDD 58 can also or alternatively have associated therewith a counting constraint rule 180 that enables the optimizing software to control outcome parameters. Outcome parameters are those besides bid and item allocations and net exchange revenue. An example of an outcome parameter includes an imposed constraint, such as an award of a minimum percentage of an allocation to minority firms. There may also be a market domination concern that compels an award of a maximum percentage of an allocation to one or a group of bidders that may be specified. Another common example is to ensure that a certain percentage of the business goes to a specific bidder, because of a long-standing business relationship. Still another example is to condition an award to a bidder of at least a certain percentage of the allocation to avoid giving the bidder such a small amount of business that it does not cover the bidder's operating expenses.

For example, counting constraint rule 180 can have a value of four associated with a maximum limit 182 for controlling the maximum number of winning bidders. In FIG. 9*a*, each of six bidders has placed a number of bids in the auction. The bids of each bidder are inserted into bid group 184-1-184-6, with bid group 184-1 including all the bids placed by bidder 1, with bid group 184-2 including all the bids placed by bidder 2, and so forth. The value of four associated with the maximum limit 182 constrains the allocation made by the optimizing software to the bids included in four of the six bid group 184-1-184-6. Since each bid group 184 in this example represents one bidder, counting constraint rule 180 limits the number of winning bidders.

With continuing reference to FIG. 9*a*, suppose that value of zero is associated with the maximum limit 182 of counting constraint rule 180 and a value of four is associated with a minimum limit 186 of counting constraint rule 180. This will cause the winning allocation to include the bids included in at most four of bid groups 184-1-184-6. Moreover, both the maximum limit 182 and the minimum limit 186 may include values wherein the desired number of winning bidders falls within the range of values.

Bid taker EDD 60 can also or alternatively include a counting constraint rule, like counting constraint rule 180, that informs the optimizing software that the corresponding bid taker 26 is willing to buy or sell bids subject to one or more constraints included in the counting constraint rule.

Figure 9B:
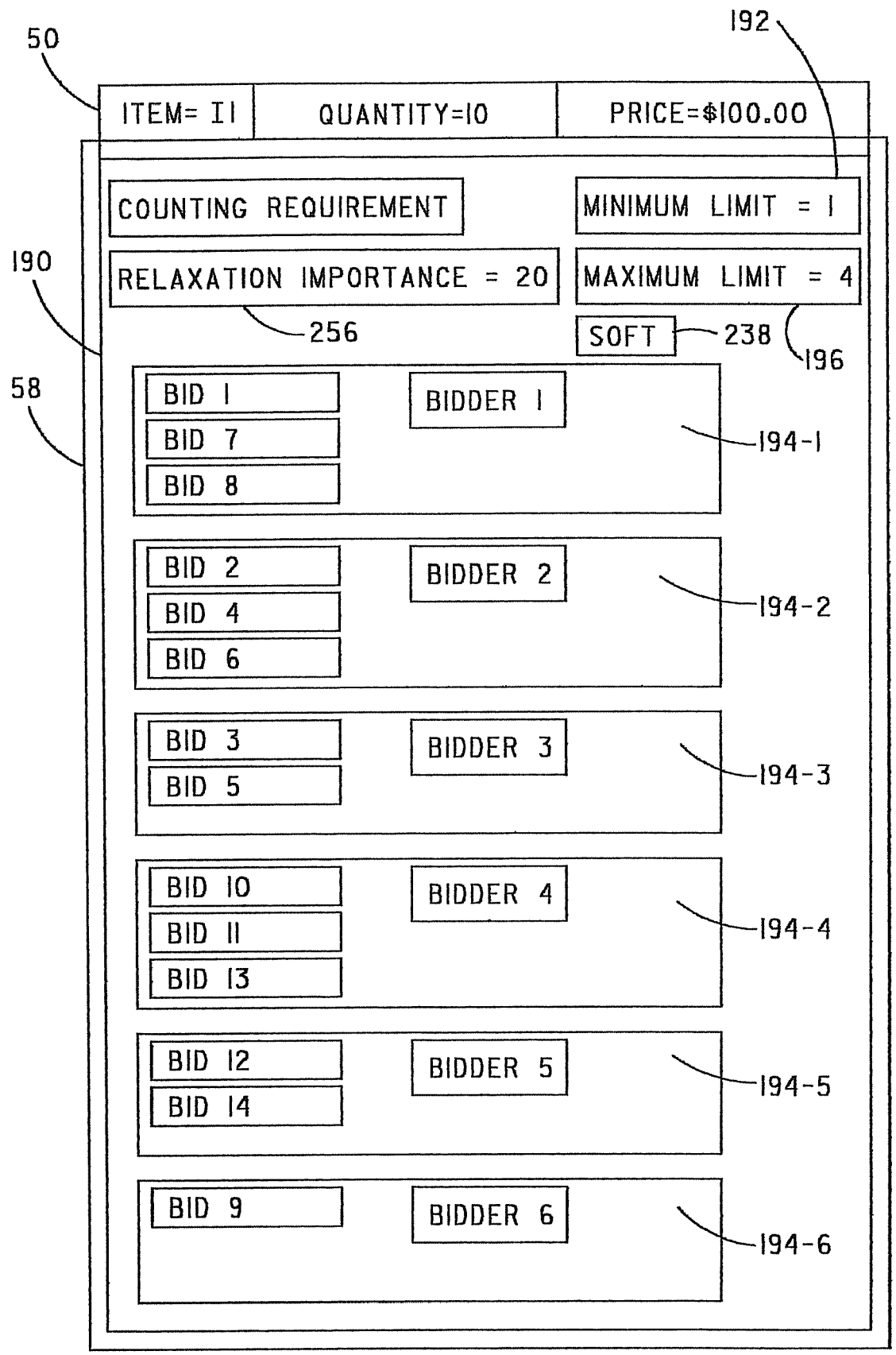
FIG. 9b is a block diagram of a bid and an associated bidder EDD that has a counting requirement rule associated therewith.

Counting Requirement Rule:

With reference to FIG. 9*b*, bidder EDD 58 can also or alternatively have associated therewith a counting requirement rule 190. The difference between a counting constraint rule and a counting requirement rule is that the counting requirement rule can have a minimum limit value greater than zero, but also allow a value of zero. For example, suppose that counting constraint rule 180 in FIG. 9*a* has a value of four associated with its minimum limit 186. Then, four or more of bid groups 184-1-184-6 must be allocated or the solution is infeasible. In contrast, suppose counting requirement rule 190 shown in FIG. 9*b* has a value of four associated with its minimum limit 192. Then, at least four of bid groups 194-1-194-6 must be allocated or none of bid groups 194-1-194-6 will be included in the allocation. In either event, however, the allocation is still feasible.

Bid taker EDD 60 can also or alternatively include a counting requirement rule, like counting requirement rule 190, that informs the optimizing software that the corresponding bid taker 26 is willing to buy or sell bids subject to one or more constraints included in the counting requirement rule.

Figure 10:
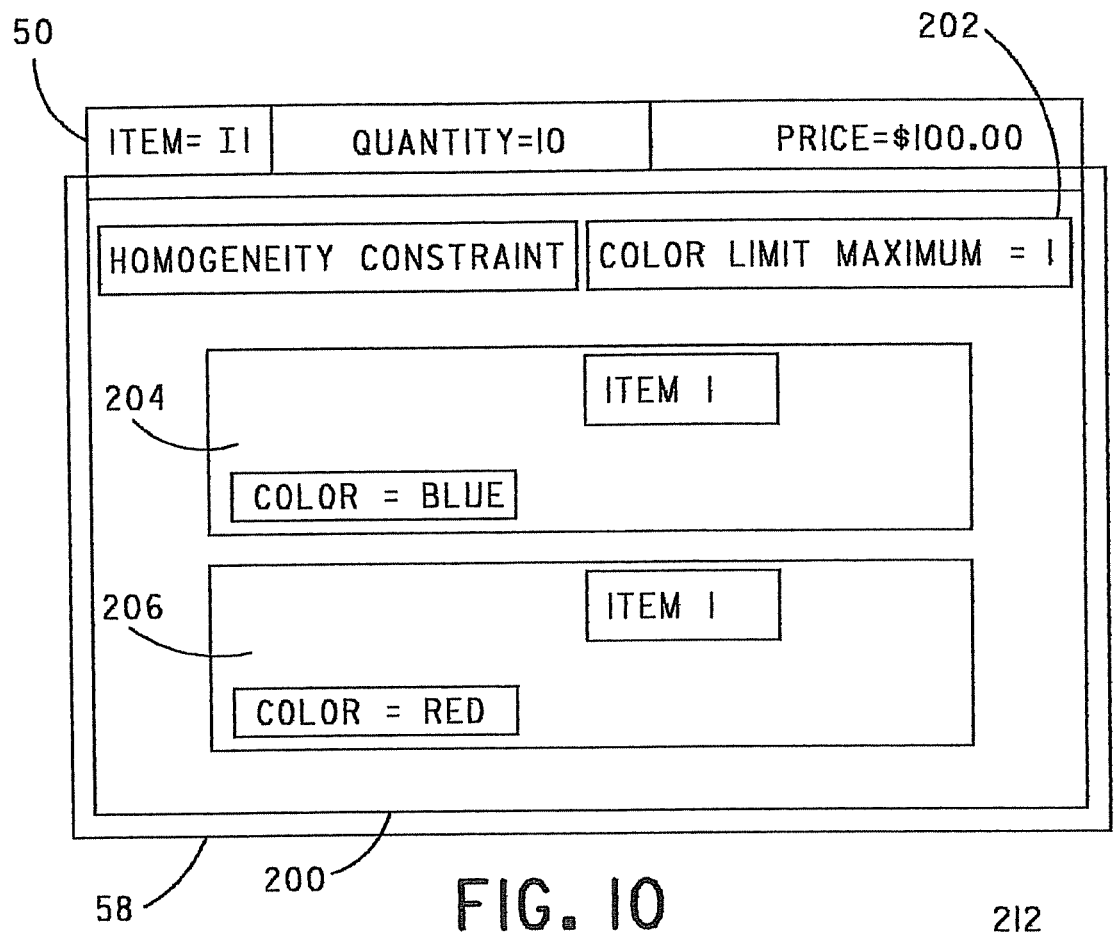
FIG. 10 is a block diagram of a bid and an associated bidder EDD that has a homogeneity rule associated therewith.

Homogeneity Constraint Rule:

With reference to FIG. 10, bidder EDD 58 can also or alternatively have associated therewith a homogeneity constraint rule 200 that enables the optimizing software to place one or more limits on the allocation. With a homogeneity constraint rule, a limit based on an item attribute or a bid attribute can be placed on one or more bids. For example, in FIG. 5, item I1 52-1 has an item attribute color(s) rule 78-1 associated therewith. Suppose, however, homogeneity constraint rule 200 is needed to limit the number of represented colors in all of the specified items of awarded bids, where the award of an item of green color is irrelevant, even though it is one of the colors for that item attribute. Accordingly, homogeneity constraint rule 200 can be created having a value of one associated with a color limit maximum 202 of homogeneity constraint rule 200. This value causes the optimizing software to limit the colors included in the allocation to one color.

In response to receiving homogeneity constraint rule 200, the optimizing software would cause the allocation to include items having only one of the colors of blue and red, but any number of green items since green was not included in item attribute groups 204, 206 of homogeneity constraint rule 200. Thus, blue items or red items, and/or green items may be allocated. As can be seen, homogeneity constraint rule 200 ensures that no more than one of the specified colors will appear in the allocation. Since only the colors specified in homogeneity constraint rule 200 are considered for purposes of homogeneity, any other color, in this example green, associated with color(s) item attribute rule 78 in FIG. 5 can also appear in the allocation. A color limit minimum (not shown) can also or alternatively be associated with homogeneity constraint rule 200 for limiting the minimum number of colors of items awarded in the allocation or to establish a range of an item colors awarded in an allocation.

The foregoing example shows one item per item attribute group 204, 206. However, multiple items may appear in each item attribute groups 204, 206. These items form an equivalence class for the purpose of homogeneity. For example, the color cyan can be considered to be the same as the color blue when assessing homogeneity by adding cyan to item attribute group 204.

Bid taker EDD 60 can also or alternatively include a homogeneity constraint rule, like homogeneity constraint rule 200, that causes the optimizing software to place one or more limits on the allocation.

Figure 11:
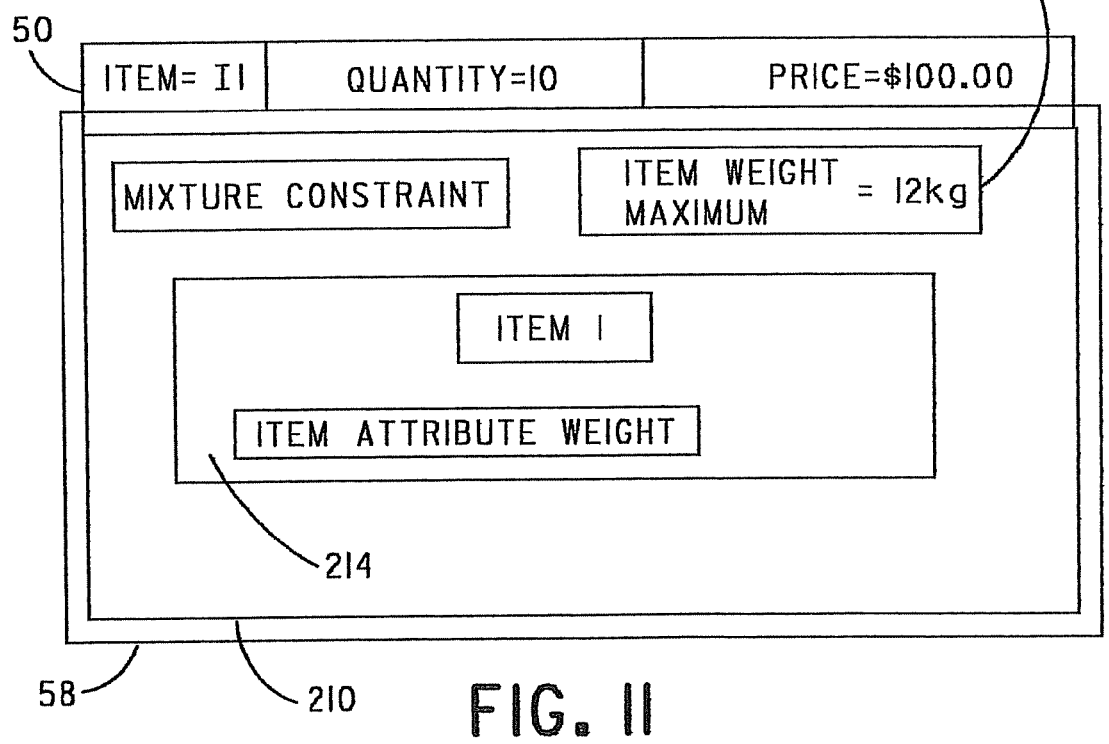
FIG. 11 is a block diagram of a bid and an associated bidder EDD that has a mixture constraint rule associated therewith.

Mixture Constraint Rule:

With reference to FIG. 11, bidder EDD 58 can also or alternatively have associated therewith a mixture constraint rule 210 that enables the optimizing software to mix attributes of interest. In the previous example, homogeneity constraint rule 200 limited by maximum or minimum the different colors represented in all of the specified items of all of the bids of the allocation. Mixture constraint rule 210 limits by attribute, similar to homogeneity constraint rule 200, but also enables the optimizing software to select any combination of bids or items in fulfilling that limit. For example, mixture constraint rule 210 can have a value of twelve kg associated with an item weight maximum 212 for an Item 1 associated with an item attribute weight 214 of mixture constraint rule 210. The value associated with item weight maximum 212 causes the optimizing software to limit the weight of all units of Item 1 associated with item attribute weight 214 to an average of no more than twelve kg. Mixture constraint rule 210 allows heterogeneity in an allocation providing the average is within specified limits. Therefore, in this example, suppose it is desired to have a mixture of weights, providing the average weight is no more than twelve kg. With mixture constraint rule 210, it does not matter how the various weights are mixed. The average value, which is constrained by the optimizing software in response to mixture constraint rule 210, may be determined from any one or a combination of items. Mixture constraint rule 210 may also be price weighted, i.e., the prices of each bid will weight the average. For example, an attribute, e.g., item weight, on a $2 bid will have twice the effect the same attribute has on a $1 bid.

In the foregoing example, mixture constraint rule 210 is described as enabling the optimizing software to operate on an item attribute, i.e., weight. Mixture constraint rule 210, however, can also or alternatively be operative on a bid attribute of a bid group. Examples of exemplary bid attributes that mixture constraint rule 210 can cause the optimizing software to operate on are described above in connection with FIG. 6a.

Bid taker EDD 60 can also or alternatively have associated therewith a mixture constraint rule, like mixture constraint rule 210, that enables the optimizing software to mix attributes of interest to the bid taker.

Figure 12:
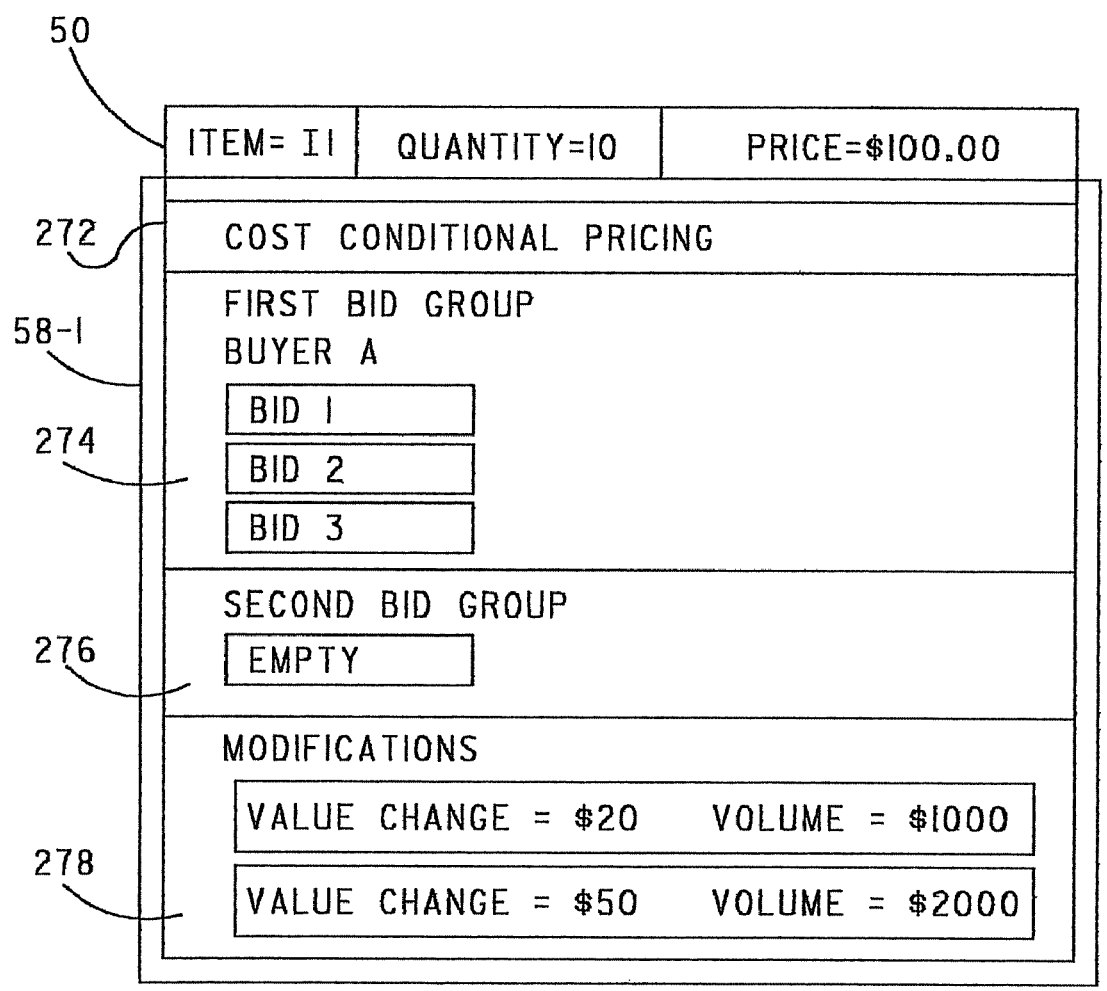
FIG. 12 is a block diagram of a bid and an associated bidder EDD that has a cost conditional pricing rule associated therewith.

Cost Conditional Pricing Rule:

With reference to FIG. 12, bidder EDD 58 can also or alternatively have associated therewith a cost conditional pricing rule 272 that causes the optimizing software to modify an outcome of a forward auction, a reverse auction or an exchange based on value limit(s). For example, two bid groups 274 and 276 can be associated with cost conditional pricing rule 272. Bid group 274 is a constrained bid group while bid group 276 is a control bid group. Bid group 276 is created for illustration purposes, but it is assumed that it is empty. Cost conditional pricing rule 272 is similar to cost constraint rule 110, except that cost conditional pricing rule 272 causes the optimizing software to utilize one or more cost constraints associated with a modifications group 278 of cost conditional pricing rule 272 to adjust the solution rather than forcing the solution to obey other established constraints. Advantages of changing a price outcome of an exchange include, for example, the optimizing software giving a discount of $20 to a buyer in a forward auction if the buyer spends more than $1000 or a discount of $50 if the buyer spends more than $2000.

Bid taker EDD 60 can also or alternatively have associated therewith a cost conditional pricing rule, like cost conditional pricing rule 272, that includes one or more cost constraints that the optimizing software utilizes to modify the allocation in a forward auction, a reverse auction or an exchange based on value limit(s).

Figure 13:
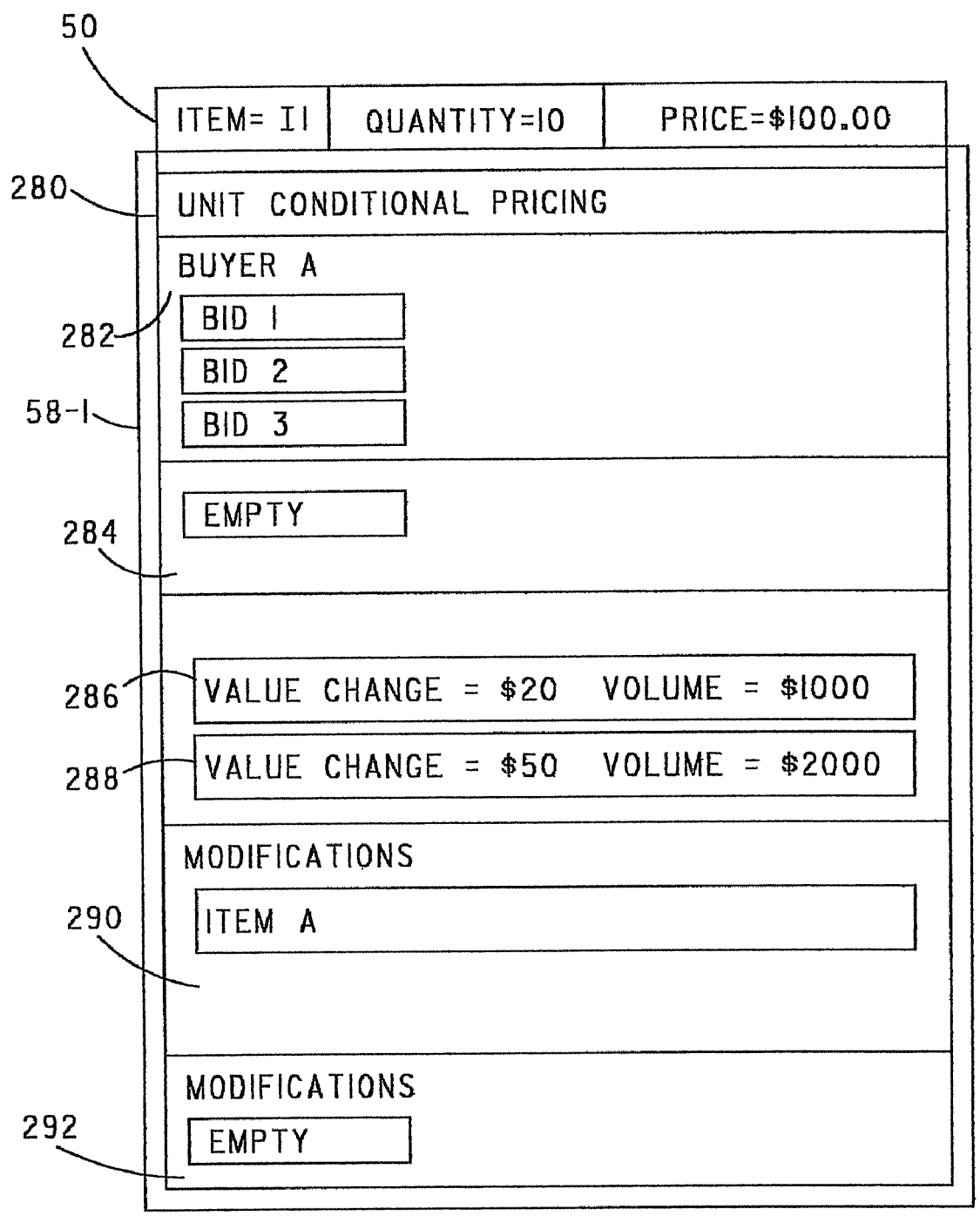
FIG. 13 is a block diagram of a bid and an associated bidder EDD that has a unit conditional pricing rule associated therewith.

Unit Conditional Pricing Rule:

With reference to FIG. 13, bidder EDD 58 can also or alternatively have associated therewith a unit conditional pricing rule 280 that causes the optimizing software to modify the value outcome of a forward auction, a reverse auction or an exchange based on a difference in unit volume of two or more bids or bid groups of two or more bidders. For example, two bid groups 282 and 284 can be associated with unit conditional pricing rule 280. Bid group 282 is a constrained group while bid group 284 is a control group. In this example, bid group 284 is an empty group. Unit conditional pricing rule 280 causes the optimizing software to operate in a manner similar to unit constraint rule 142 in FIG. 8a, except that unit conditional pricing rule 280 adjusts the solution rather than forcing the solution to obey other constraint(s). For example, suppose bid group 282 includes all of the bids associated with buyer A and constraints or condition modifiers 286 and 288 are associated with unit conditional price rule 280. The optimizing software determines a difference in unit volume between the item(s) associated with an item A associated with a modifications group 290, traded by buyer A, associated with bid group 282, and the item(s) included in a modifications group 292 traded by the bidder(s), if any, associated with bid group 284. If the difference in unit volume awarded to the bidder(s) of bid group 282 and the unit volume awarded to the bidder(s) of bid group 284 is greater than the unit volume included in condition modifier 286, a discount of $20 is given to the bidder(s) associated with the bid group 282 or 284 having the greater volume. If the difference is greater than the unit volume included in condition modifier 288, a discount of $50 is given to bidder(s) associated with the bid group 282 or 284 having the greater volume.

In the example shown in FIG. 13, since modifications group 292 and bid group 284 are empty, the unit volume is the number of units of item A listed in modifications group 290 traded by the bidder associated with bid group 282. Unit conditional pricing rule 280 uses the difference in the unit volumes included in bid groups 282 and 284. In this example, since bid group 284 includes no bids, its unit volume defaults to empty and the difference is simply the unit volume of the bids of bid group 282 for buyer A. If the unit volume of the bids of bid group 282 is 1000 units or more than the unit volume of the bids of bid group 284, the optimizing software determines that condition modifier 286 is satisfied and a discount of $20.00 is given. If the unit volume included in bid group 282 is 2000 units or more than the unit volume included in bid group 284, the optimizing software determines that condition modifier 288 is satisfied and a discount of $50.00 is given.

Bid taker EDD 60 can also or alternatively have associated therewith a unit conditional pricing rule, like unit conditional pricing rule 280, that includes one or more conditions that the optimizing software utilizes to modify the value outcome of a forward, a reverse auction or an exchange based on a difference in unit volume of two or bids or bid groups of two or more bidders.

Quote Request Rule:

Bidder EDD 58 can also or alternatively have associated therewith a quote request rule (not shown) that causes the optimizing software to treat the corresponding bid 50 as a "quote request", whereupon the optimizing software returns to the bidder of the bid a price where the bid would just be included in an allocation, i.e., the least competitive price. Thereafter, if the bidder wishes to place one or more bids or associate one or more bids with a bid group that the optimizing software considers for inclusion in an allocation, such bid can be made or such bid group can be formed separately from the quote request rule. Thus, the optimizing software treats a quote request rule like a bid.

Bid taker EDD 60 can also or alternatively have associated therewith a quote request rule that causes the optimizing software to return to the corresponding bid taker 26 a price of a bid that would just be included in an allocation.

As can be seen, bidder EDD 58 and/or bid taker EDD 60 can include one or more of the foregoing rules that the optimizing software can utilize to determine an allocation. Next, the rules that are typically associated uniquely with bid taker EDD 60 will be described. These rules include an objective rule, a constraint relaxer rule and a feasibility obtainer rule.

Figure 14:
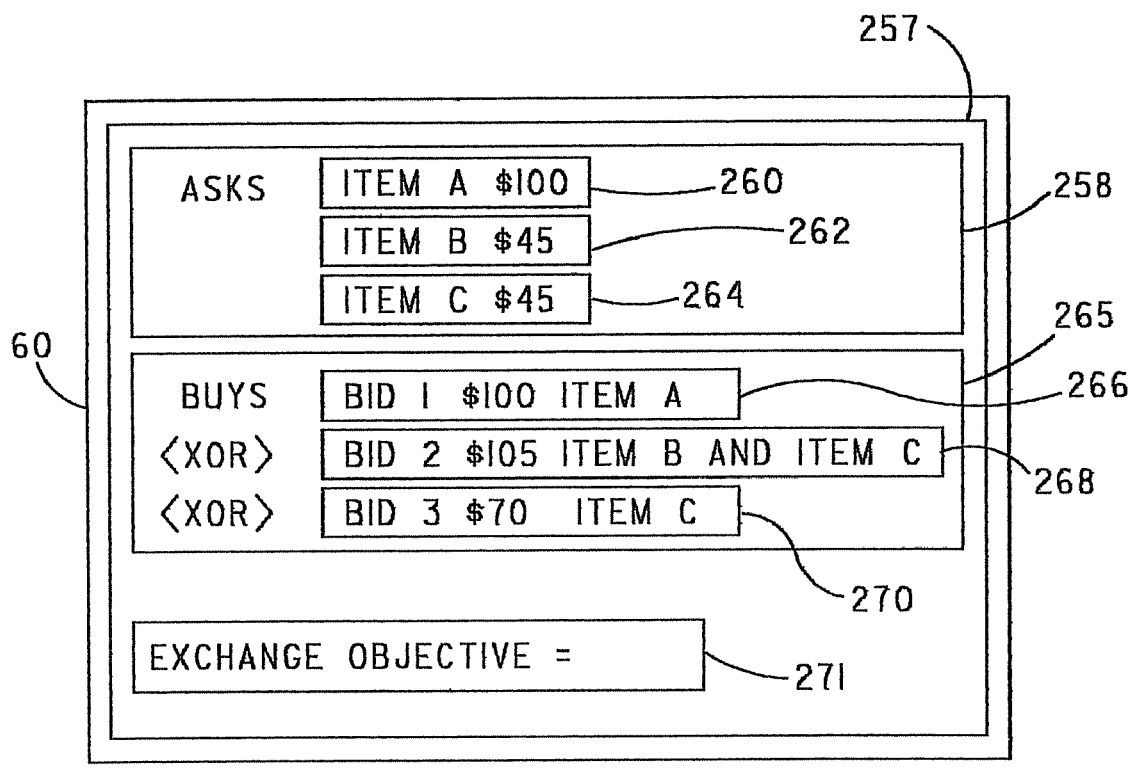
FIG. 14 is a block diagram of a bid taker EDD that has an objective rule associated therewith.

Objective Rule:

With reference to FIG. 14, bid taker EDD 60 can have associated therewith an objective rule 257 that establishes a maximization or minimization goal that the optimizing software utilizes to determine an allocation value for an exchange. Each maximization goal has one specific meaning for forward auctions, reverse auctions, and exchanges. Each minimization goal has one specific meaning for a reverse auction.

Objective rule 257 can comprise one or more rules related to one or more objectives of an exchange. These exchange objectives include surplus, traded bid volume, traded ask volume or traded average volume. Each of these rules expresses a maximization goal for a forward auction or exchange, or a minimization goal for a reverse auction. The following table shows the rule(s) associated with objective rule 257 for the foregoing objectives of the exchange.

| Objective | Forward Auction | Reverse Auction | Exchange |
| --- | --- | --- | --- |
| Surplus | sum of accepted bids less the sum of their item reserve prices | N/A | sum of accepted bids less sum of accepted asks |
| Traded bid | sum of accepted bids | N/A | sum of accepted bids |
| Traded ask | sum of item reserve prices of accepted bids | sum of accepted asks | sum of accepted asks |
| Traded average | average of the sum of accepted bids and sum of their item reserve prices | N/A | average of the sum of accepted bids and sum of accepted asks |

The rules associated with each of the foregoing objectives enables the optimizing software to perform a specific optimization. Each objective is useful because it enables specification of exactly what is wanted in a forward auction, reverse auction or exchange. For example, suppose one unit of three items, namely, item A 260, item B 262 and item C 264, for sale at prices of $100, $45 and $45, respectively, are included in an ask group 258 associated with objective rule 257 of bid taker EDD 60. These are ask bids since the three items are being sold. Moreover, suppose that a buy group 265 associated with objective rule 257 includes three buy bids: Bid 1 266 for Item A for $100; Bid 2 268 for Items B and C for $105; and Bid 3 270 for Item C for $70. Furthermore, suppose that these three buy bids are logically connected by XOR (exclusive OR) logical operators whereupon only one of Bids 266, 268 and 270 will be allocated by the optimizing software.

If an exchange objective 271 of objective rule 257 is set to "maximize traded ask", Bid 1 266 is allocated by the optimizing software since Item 1 has the maximum ask value, i.e., $100. If exchange objective 271 is set to "maximize traded bid", Bid 2 268 is allocated by the optimizing software since it has the maximum bid value, i.e., $105. If exchange objective 271 is set to "maximize surplus", Bid 3 270 is allocated by the optimizing software since it has the largest surplus value, i.e., $70-$45=$25. Lastly, if exchange objective 271 is set to "maximize traded average", either Bid 1 for Item A 260 at $100, or Bid 2 for Items B and C 262 and 264 at $105 is allocated by the optimizing software. Exchange objective 271 can also be set to "maximize the number of winning bidders" or "maximize the number of losing bidders" in an allocation. In each of the foregoing settings, the word "maximize" can be replaced with "minimize" whereupon the optimizing software will be provided with the corresponding rule.

Figure 15:
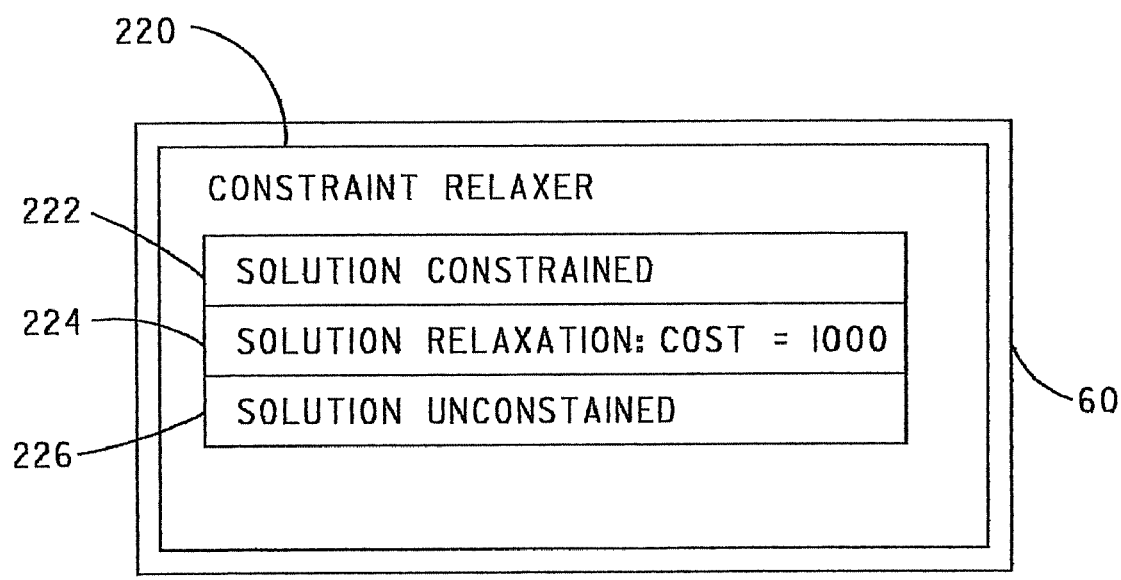
FIG. 15 is a block diagram of a bid taker EDD that has a constraint relaxer rule associated therewith.

Constraint Relaxer Rule:

With reference to FIGS. 15 and 16, many of the rules described thus far have the capacity to be relaxed by a bid taker 26. Accordingly, bid taker EDD 60 can also or alternatively have associated therewith a constraint relaxer rule 220.

The ability to relax a rule has two purposes, namely, to obtain candidate allocations when the original problem does not have a feasible allocation, and to search for alternative allocations when there is a feasible allocation. Such alternative allocations can illustrate the impact on the allocation solution as more important rules are relaxed. The importance of each rule can depend on the relative relaxation importance weight assigned thereto. These weights are dependent on the weights and types of each rule in an exchange.

FIG. 15 illustrates a constraint relaxer rule 220 that includes one or more possible desired solutions 222, 224 and 226 that can be applied by the optimizing software to determine an exchange allocation. For example, selecting constrained solution 222 causes the optimizing software to search for an allocation with all the constraints in place. Selecting unconstrained solution 226 causes the optimizing software to search for an allocation with no constraints in place. Between constrained and unconstrained solutions 222 and 226, there is relaxation solution 224. Selecting relaxation solution 224 causes the optimizing software to search for one or more allocations as a function of "soft" and/or "hard" properties. For example, in FIGS. 7a and 9a, "soft" properties 228 and 236 are associated with cost constraint rule 110 and counting constraint rule 180, respectively, while in FIG. 8a, a "hard" property 232 is associated with unit constraint rule 142. When relaxation solution 224 is selected in constraint relaxation rule 220, the optimizing software obtains a feasible solution by relaxing cost constraint rule 110 and counting constraint rule 180 while maintaining unit constraint rule 142. In this example, the use of "hard" property 232 in FIG. 8a assumes that unit constraint rule 142 is so important that to relax it will create a useless allocation.

Selecting constrained solution 222 causes the optimizing software to create the exemplary constrained allocation 240 shown in FIG. 16. Namely, a fully constrained allocation for which either a feasible, market desirable solution or an infeasible solution exists. In other words, constrained allocation 240 shows the bids that should be awarded given all of the bids and all of the rules associated with bidder EDDs 58 and/or bid taker EDDs 60. In the example shown in FIG. 16, constrained allocation 240 shows three winning bids with an allocation value of $1,000.

In contrast, selecting relaxation solution 224 causes the optimizing software to relax each rule that has a "soft" property associated therewith to obtain the exemplary relaxation allocation 242 shown in FIG. 16. Selecting unconstrained solution 226 causes the optimizing software to relax all of the rules associated with bidder EDDs 58 and/or bid taker EDDs 60 to obtain the exemplary unconstrained allocation 244 shown in FIG. 16. Relaxed allocation 242 and unconstrained allocation 244 illustrate other useful allocations that do not necessarily meet all of the constraints. For example, relaxed allocation 242 shows a total of five winning bids with an allocation value of $4,000 while unconstrained allocation 242 shows a total of six bids with an allocation value of $5,000. Unconstrained allocation 244 illustrates the effect of imposing no rules on the allocation of bids by the optimizing software.

With reference back to FIGS. 7a, 7b, 9a and 9b, relaxation importances 250, 252, 254 and 256 can be associated with rules 110, 130, 180 and 190, respectively. The use of these relaxation importances will now be described.

In FIG. 7a, cost constraint rule 110 has a value often included in relaxation importance 250. In FIG. 9a, counting constraint rule 180 includes a value of twenty in relaxation importance 254. Cost constraint rule 110 has a "soft" property 228 associated therewith and counting constraint rule 180 has a "soft" property 236 associated therewith. If the optimizing software determines that cost constraint rule 110 or counting constraint rule 180 can be relaxed to obtain a feasible allocation, but it is not necessary to relax both, then cost constraint rule 110 having a value of ten in its relaxation importance 250 would be relaxed instead of relaxing counting constraint rule 180 having a value of twenty in its relaxation importance 254.

In response to selecting relaxation solution 224 in FIG. 15, the optimizing software finds a feasible allocation while relaxing constraints according to the value included in the corresponding relaxation importance, if any. The greater the value included in the relaxation importance, the less likely the associated rule(s) will be relaxed. Relaxation solution 222 can also have an associated cost, e.g., 1000, which specifies the weight of the relaxation to be applied by the optimizing software. The relaxation cost is calculated by aggregating, over all relaxed rules, the amount by which the rule(s) are violated multiplied by the value included in the corresponding relaxation importance. The value associated with a relaxation importance causes the optimizing software to maximize or minimize one or more rules minus the relaxation cost associated with relaxation solution 224. For example, if relaxation solution 242 has a cost of 1000 associated therewith and another relaxation solution (not shown) has a cost of 2,000 associated therewith, and if both relaxation solutions are selected, the optimizing software will relax the rule(s) associated with the latter relaxation solution before relaxing the rules of the former relaxation solution. Thus, in this example, the optimizing software would determine an optimal allocation based on the relaxation solution having the greater cost.

Feasibility Obtainer Rule:

Bid taker EDD 60 can also or alternatively have associated therewith a feasibility obtainer rule (not shown) which causes the optimizing software to minimize the relaxation cost, instead of minimizing or maximizing objective rule(s), discussed above in connection with FIG. 14, minus a relaxation cost. More specifically, a feasibility obtainer rule causes the optimizing software to generate feasible allocations when a winning allocation with all of the rules active is unavailable. For example, suppose that constrained solution 222 of constraint relaxation rule 220 is selected. In response to this selection, the optimizing software will only attempt to generate a winning allocation. However, if bid taker EDD 60 includes a feasibility obtainer rule and the optimizing software determines that a feasible, constrained allocation cannot be found, it relaxes one or more rules in an attempt to find a feasible allocation.

As can be seen, bidder EDDs 58 and bid taker EDDs 60 enable bidders 22, bid takers 26 and/or exchange manager 24 to modify how the optimizing software determines an optimal allocation. This may be performed iteratively in order to see the effects of these modifications on the winning allocations.

The optimizing software can include suitable controls for terminating the determination of an allocation. One control is a maximum processing time whereupon, when the maximum processing time is reached, the optimizing software terminates processing of the bids and reports the best allocation found. Another control compares the best allocation found at any point in time with an optimal allocation, i.e., an allocation with all rules relaxed. If the difference between these two allocations reaches a predetermined value, the optimizing software terminates processing and reports the best allocation found. Another control is a manual abort that can be issued by, for example, the exchange manager. In response to receiving this manual abort, the optimizing software terminates processing and reports the best allocation found.

Live, Expressive Combinatorial Exchanges:

In a live, expressive combinatorial exchange, e.g., a pure exchange, a forward auction or a reverse auction, it is desirable to provide feedback regarding the exchange to bidders, especially each bidder having a bid not included in an allocation, and/or bid takers in order to enhance competition and, potentially, make subsequent bidding and/or bid taking easier. A method of conducting a live, expressive combinatorial exchange will now be described with reference to FIG. 17, and with reference back to FIG. 3.

The method commences at start step 300 with exchange manager 24 initiating the exchange event. The method then advances to step 302 where the exchange manager 24 receives from each of a plurality of bidders 22 at least one bid 50 comprised of at least one item 52, an initial quantity 54 of each item 52, and a price 56 for all of the item(s) and their quantities 54.

At a suitable time, the method advances to step 304 where the optimizing software determines from the received bids an allocation that is optimal for the type of exchange being conducted. In a live combinatorial exchange, each bid 50 that is part of the allocation will include all of the items 52 of the bid 50 and at least part of the initial quantity 54 of each item 52. For example, if an allocation includes a bid 50 that includes item I1 52-1 and item I2 52-2, all or part of the quantity Q1 54-1 of item I1 52-1 will be included in the allocation and all or part of the quantity Q2 54-2 of item I2 52-2 will be included in the allocation.

Once the allocation has been determined, the method advances to step 306 where at least a portion of each bid of the allocation is returned to each bidder of a first subset of the bidders 22 that has at least one bid that is not included in the allocation for display on the display 18 of the computer system 2 of said bidder.

The method then advances to step 308 where each bidder of a subset of the first subset of bidders submits to exchange manager 24 a new bid and/or an amendment to an existing bid for processing by the optimizing software.

The method then advances to step 310 where a determination is made whether a predetermined condition is satisfied. If so, the method advances to stop step 312 and the exchange event terminates. However, if the predetermined condition is not satisfied, the method returns to step 304 where, at a suitable time, the optimizing software determines another allocation that is optimal for the type of exchange being conducted. The bids processed by the optimizing software in this latter iteration of step 304 include all the bids from the immediately preceding iteration of step 304, including any amendments thereto in the immediately preceding iteration of step 308, along with any new bids received in the prior iteration of step 308. Once the other allocation has been determined in step 304, steps 306-310 are repeated. Thereafter, providing the predetermined condition in step 310 is not satisfied, steps 304-308 are repeated at suitable times during the course of the exchange event, e.g., periodically, after a predetermined number of bid(s) have been received, after each new or amended bid is received, etc., until the predetermined condition is satisfied whereupon the method advances to stop step 312 and the exchange event terminates.

Figure 17:
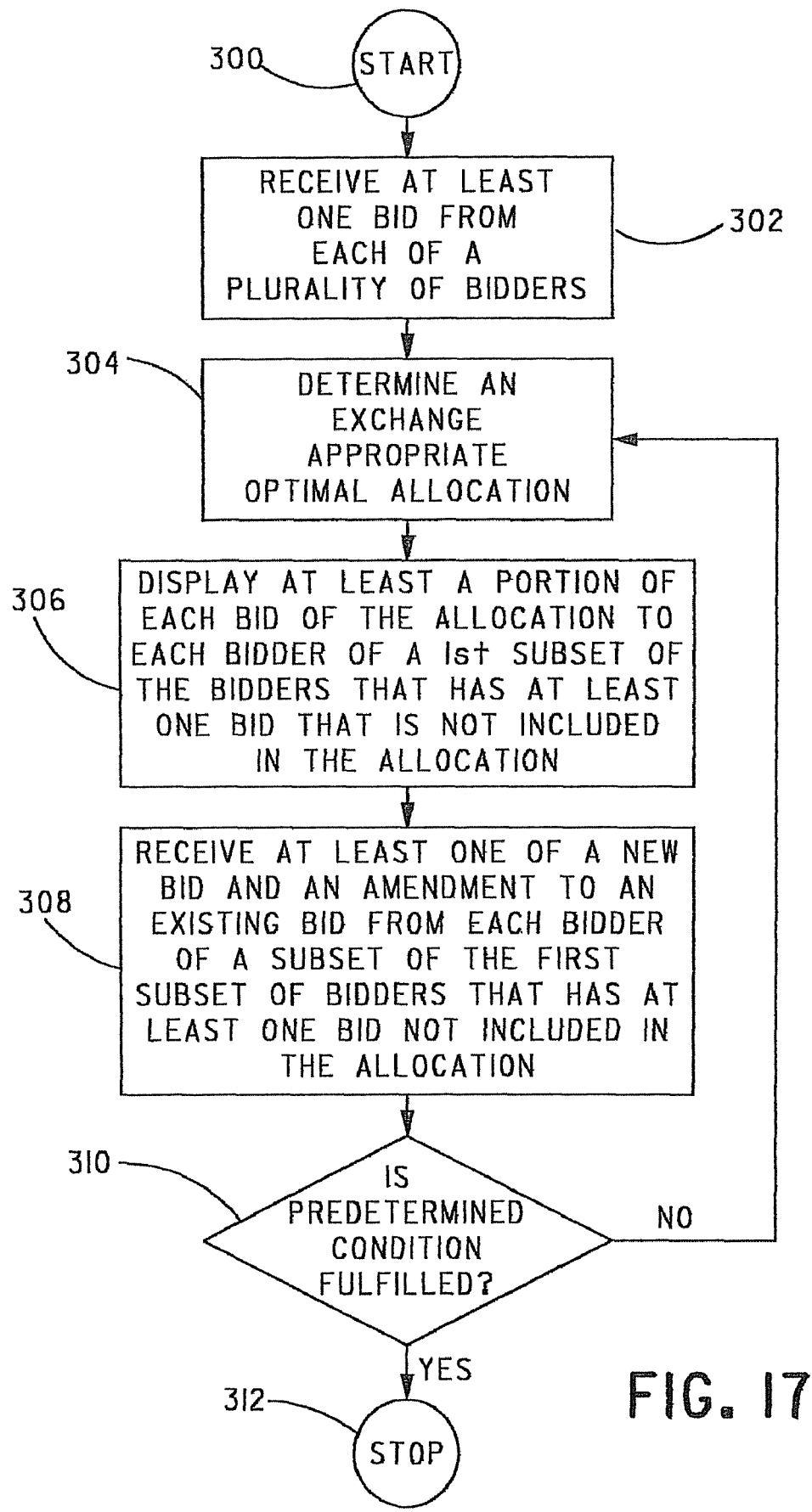
FIG. 17 is a flowchart of a method of conducting a live, expressive combinatorial exchange.

As can be seen from the flowchart of FIG. 17, in step 306, each bidder not having a bid included in an allocation is provided with data regarding the bids that were included in the allocation. Based on this data, the bidder can do nothing, or, as shown in step 308, the bidder can amend an existing bid to make it more competitive whereupon it may be included in the allocation the next time step 304 is executed, or place a new bid that may be included in the next allocation the next time step 304 is executed. The process of determining an allocation based on received bids, providing feedback regarding the bids included in the allocation to bidders whose bids are not included in the allocation, receiving new or amended bids from at least some of the bidders provided with said feedback, and determining another allocation based on the new or amended bids and any other previously received bids continues until the predetermined condition is satisfied.

The predetermined condition can include, among other things, (i) a lapse of a predetermined time interval from commencement of the exchange, (ii) a manual abort, or (iii) a sum of prices of the bids of the allocation reaching a predetermined value.

The purpose of causing at least a portion of each bid included in the allocation to be displayed to each bidder that has at least one bid that is not included in the allocation is to enable the bidder to more effectively compete by facilitating the bidder's formulation of a new bid or an amendment to an existing bid that may result in the new bid or amended bid being included in the next allocation the next time step 304 is executed.

Supplying information regarding only one of the bids included in the allocation to bidders having at least one bid not included in the allocation is of little or no value in a combinatorial exchange since doing so does not provide sufficient information from which the bidders of bids not included in the allocation can formulate new bids or amendments to existing bids that will improve their chance of having a bid included in the next allocation.

Each bid of a subset of the bids can have bidder EDD 58 associated therewith. As discussed above, bidder EDD 58 comprises one or more rules for processing the associated bid, at least one item of the associated bid, and/or a subset of bids that includes all or less than all of the bids when determining the allocation.

When determining the allocation in step 304, the optimizing software desirably determines the allocation based on the bids received up to that time, i.e., new bids, amended bids and/or any other received bids, along with any bidder EDD associated with said bids. Thus, if each bid of a subset of the bids has bidder EDD associated therewith, the optimizing software determines the allocation based on all of the received bidder EDDs along with all of the received bids. The portion of each bid of the allocation that is displayed to each bidder of a first subset of bidders that has at least one bid that is not included in the allocation can include at least one item of the bid included in the allocation, the quantity of the at least one item of the bid, the price for all the item(s) and their quantities and/or at least a portion of the received bidder EDD 58 associated with the bid. The exchange manager 24 desirably sets the at least portion of each bid of the allocation that is displayed. However, this is not to be construed as limiting the invention.

Amending an existing bid in step 308 can include adding at least one new rule to bidder EDD 58 associated with the bid, deleting at least one rule from the bidder EDD 58 associated with the bid, amending a value associated with at least one rule of the bidder EDD 58 associated with the bid, amending a value of the quantity of at least one item of the bid, and/or amending the price for all of the items and their quantities.

Also or alternatively, the allocation can be determined in step 304 based on bid taker EDD 60. As discussed above, each bid taker EDD 60 comprises at least one rule (or constraint) for processing at least one of a bid, at least one item of a bid, and a subset of the plurality of the bids.

If desired, step 306 can include providing all or part of each bid taker EDD 60 to each bidder and/or bid taker participating in the exchange. Providing all or part of each bid taker EDD to each bidder participating in the exchange facilitates the bidder's formulation of one or more new or amended bids of the bidder to improve the bidder's chance of having one or more bids included in the next allocation the next time step 304 is executed. Providing each bid taker participating in the exchange with all or a portion of each bid taker EDD 60 facilitates the bid taker's formulation of one or more new or amended bid taker EDDs 60 to maintain or improve the bid taker's competitiveness in subsequent iterations of step 304. Amendments to an existing bid taker EDD can include adding at least one new rule to the existing bid taker EDD, deleting at least one rule from the existing bid taker EDD, and/or amending a value associated with at least one rule of the existing bid taker EDD.

If desired, step 308 can include receiving from each bid taker of a subset of the bid takers at least one of a new bid taker EDD and an amendment to an existing bid taker EDD of the bid taker. The amendment to the existing bid taker EDD of the bid taker can include adding at least one new rule to the existing bid taker EDD, deleting at least one rule from the existing bid taker EDD, and amending a value associated with at least one value of the existing bid taker EDD.

Bidder EDDs 58 and bid taker EDDs 60 can be utilized by the optimizing software either alone or in combination to determine the allocation.

A portion of at least one bid included in the allocation can also be provided to each bidder of a second subset of bidders that has at least one bid that is part of the allocation, i.e., winning bidders, for display on the display 18 of the computer system 2 of said bidder. The purpose of displaying the at least portion of each bid included in the winning allocation to bidders having bids included in the winning allocation is to facilitate the formulation by each said bidder of a new bid or an amended bid that may result in said new bid or amendment bid being included in the allocation the next time step 304 is executed.

The portion of the at least one bid included in the allocation that is displayed on the display 18 of the computer system 2 of a winning bidder can include at least one item of the bid, the initial or allocated quantity of the at least one item of the bid, the price for all of the item(s) and/or quantities, and/or at least a portion of the bidder EDD associated with the bid.

In the foregoing description, each subset of bidders includes all or less than all of the plurality of bidders. Moreover, each subset of bids includes all or less than all of the received bids.

Rule Selection:

Each rule of each bidder EDD 58 established by a bidder 22 is desirably selected from a predetermined set of bidder rules established and maintained by the exchange manager 24 for the exchange event. Similarly, each rule of each bid taker EDD 60 established by a bid taker 26 is desirably selected from a predetermined set of bid taker rules established and maintained by the exchange manager 24 for the exchange event. Limiting the rules each bidder and bid taker can utilize in an exchange event enables the exchange manager 24 to better control the conduct of the exchange event.

Supervisory Constraint:

To further enable exchange manager 24 to control the conduct of the exchange event, each rule of a subset of the rules, i.e., all or less than all of rules, can also or alternatively have an exchange manager controllable supervisory constraint imposed thereon. Under the control of exchange manager 24, each supervisory constraint can impose one or more limits on at least one of (1) the addition of the corresponding rule to an EDD, (2) the deletion of the corresponding rule from an EDD, (3) the relaxation of the corresponding rule of an EDD, and/or (4) the tightening of the corresponding rule of an EDD.

Examples of the use of a supervisory constraint include: allowing or forbidding bidders and/or bid takers from adding or deleting the corresponding rule to or from an EDD; forcibly adding or deleting the corresponding rule to or from an EDD; allowing or forbidding bidders and/or bid takers to relax or tighten the corresponding rule, e.g., relaxing or tightening the maximum (or minimum) number of winners permitted in an allocation; and forcibly relaxing or tightening the corresponding rule. The listing of the foregoing examples is not be construed as limiting the invention since other uses of a supervisory constraint are envisioned.

Desirably, exchange manager 24 can selected when each supervisory constraint is active or inactive during an exchange event. If a supervisory constraint is inactive there are no limits on the use of the corresponding rule. However, if a supervisory constraint is active, the one or more limits associated with the supervisory constraint are imposed on the corresponding rule. For example, a supervisory constraint can be activated on or before an exchange event commences and can remain active throughout the exchange event whereupon the limit(s) associated with the supervisory constraint are imposed on the corresponding rule. In another example, a supervisory constraint can be inactive when the exchange event commences, but can be activated during the course of an exchange event and remain active throughout the remainder of the exchange whereupon the bidders and/or bid takers use of the rules and, hence, the conduct of the exchange event is altered. In yet another example, a supervisory constraint can be active when the exchange event commences, but can be inactivated during the course of an exchange event and remain inactive throughout the remainder of the exchange event to alter the conduct of the exchange event. The foregoing examples of when a supervisory constraint is or becomes active or inactive are not to be construed as limiting the invention.

Exchange Prolongation:

As discussed above, one predetermined condition for terminating a live, combinatorial exchange is the lapse of a predetermined time interval from commencement of the exchange event. Under certain conditions, however, it may be desirable to extend the predetermined time interval. One such condition includes the receipt of a bid within a predetermined duration of the end of the predetermined time interval that improves the allocation. For example, if a new or amended bid that improves the allocation is received within, for example, one minute of the end of the exchange, the predetermined time interval can be extended for a predetermined extension interval, e.g., five minutes. This process of extending the predetermined time interval can be repeated as desired.

In an exchange that includes plural bidders and plural bid takers, the allocation improves if (i) the number of items exchanged increases or (ii) if a difference between a sum of the prices of the buy bids and a sum of the prices of the sell bids of the allocation increases. In an exchange that includes plural buyers and a single seller (forward auction), the allocation improves if a sum of the prices of the bids of the allocation decreases. Lastly, in an exchange that includes a single buyer and plural sellers (reverse auction), the allocation improves if a sum of the prices of the bids of the allocation increases.

Logical Bid Combinations:

To facilitate processing of the bids by the optimizing software, all of the bids 50 received from bidders 22 can be logically OR'ed together and two or more bids 50 received from the same bidder that have at least one item in common can be logically XOR'ed together. This combination of logical operators enables each bidder to place two or more bids for the same item without concern that the optimizing software will include said two or more of bids in the allocation whereupon the bidder is awarded more than a desired quantity of the item.

Bidder Identification:

In step 306 of the flowchart shown in FIG. 17, when at least a portion of each bid of the allocation is caused to be displayed to a first subset of bidders that has at least one bid that is not included in the allocation, an identification of the bidder of the bid can also be caused to be displayed. If desired, the displayed bidder identification can be obscured in the sense that the identity of the actual bidder is not clear from the displayed bidder identification.

Precondition and Decisional Construct:

At least one rule can be introduced into at least one bidder EDD in response to a bidder specifying (i) a precondition of said rule and (ii) an effect to apply if said precondition is satisfied. The precondition can include a scope, e.g., a specific geographical region, a specific group of items or item category, or a time window, such as second quarter, that the rule applies to, and a comparison for the scope, e.g., a total dollar volume greater than a predetermined dollar volume. Examples of effects that can be applied include giving a three percent discount on some subset of bids, determine the allocation to be infeasible, give a three percent handicap to the bids of a specific subset of bidders. For example, if the total dollar volume exceeds the predetermined dollar volume in a specific geographical region (the precondition), the rule is associated with the appropriate bidder EDD whereupon the effect of the rule is considered when determining the allocation. In contrast, if the total dollar volume does not exceed the predetermined dollar volume, the rule is not associated with the bidder EDD. Similarly, at least one rule associated with at least one bid taker EDD can be associated therewith in response to a bid taker specifying (i) a precondition of said rule and (ii) an effect to apply if said precondition is satisfied. The bidder and/or the bid taker desirably utilizes a graphical user interface on a display 18 of a computer 2 to specify the precondition and the effect.

Adaptive Allocation Refinement:

In a live, combinatorial exchange, also known as a dynamic combinatorial exchange, it may be desirable to permit a subset of rules, i.e., all or a portion of all the rules or constraints applicable to the exchange, that the optimizing software utilizes in each round of the exchange to determine an allocation that is appropriate for the type of exchange being conducted, i.e., a pure exchange, a forward auction or a reverse auction, to change in an effort to change, e.g., shrink or enlarge, the space of feasible allocations in an attempt to find an allocation that satisfies a desired allocation outcome.

For example, for a given set of bids that are processed by the optimizing software subject to a subset of rules, the optimizing software will find a single allocation with an optimal allocation value provided at least one feasible allocation exists. If this single optimal allocation does not maximize or minimize the exchange objective(s) while satisfying all of rules, it would be desirable to determine another optimal allocation. Hence, what is needed is a method of determining one or more additional, distinct allocations of the bids based on a distinct subset of the rules currently available each time an allocation is determined in an attempt to find an allocation that satisfies the desired exchange objective. Two such methods will now be described in connection with FIGS. 18 and 19.

Figure 18:
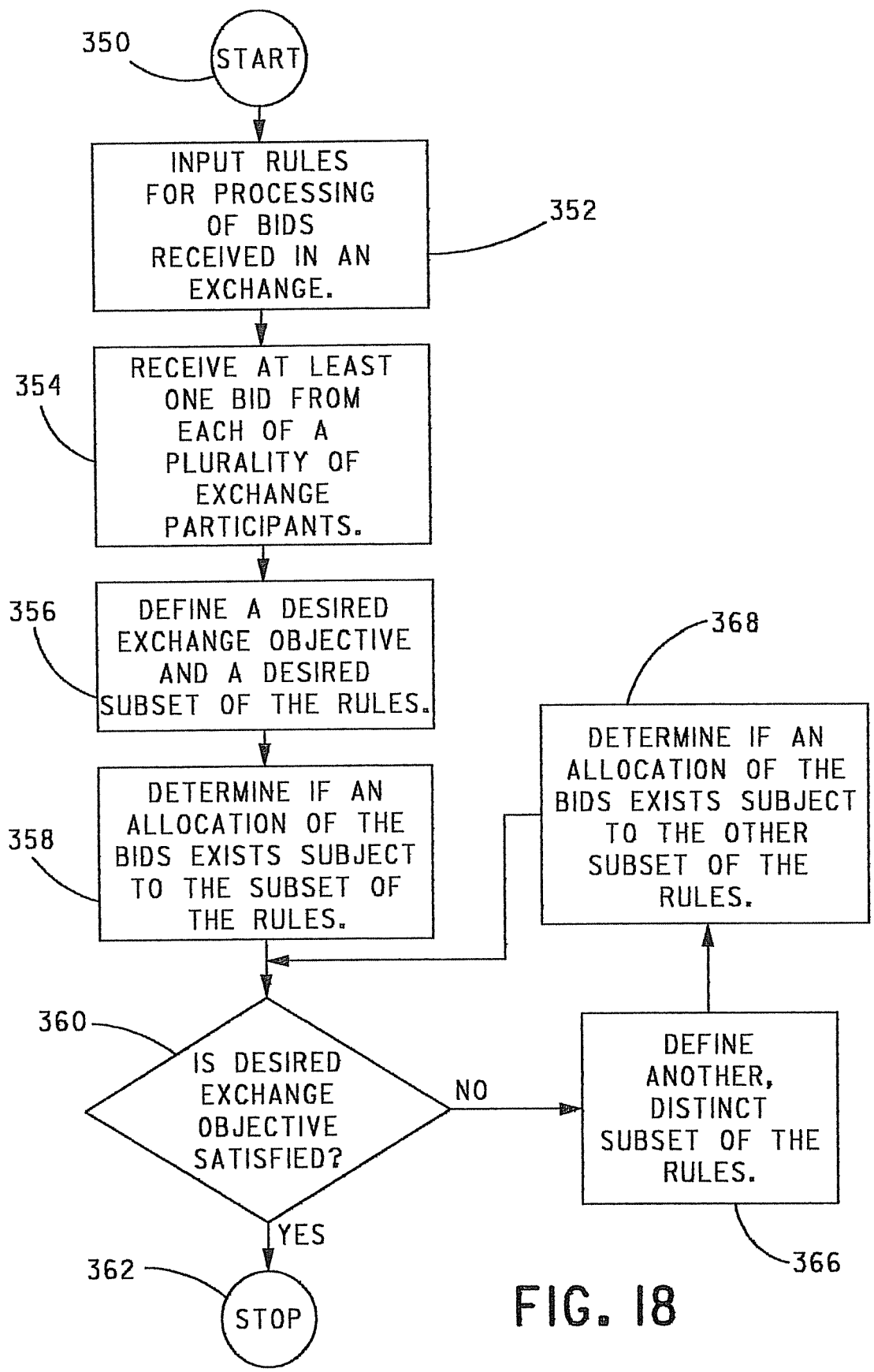
FIG. 18 is a flowchart of another method of conducting a live combinatorial exchange.

With reference to FIG. 18, a first method of finding an allocation that satisfies a desired exchange objective commences at start step 350 with exchange manager 24 initiating the exchange event. The method then advances to step 352 where the rules for use by the optimizing software for processing of bids to be received in the exchange are input. These rules can be input by one or more exchange participants, e.g., bidders 22, bid takers 26 and/or exchange manager 24. In step 354 at least one bid 50 is received from each of a plurality of exchange participants acting as bidders 22. Each bid 50 can be one of a first type bid that includes at least one item 52, an initial quantity 54 of each item 52, and the price for all of the item(s) and their quantities 54 or a second type bid that includes at least one item, a quantity or range of quantities for each item, and a unit price for each item.

In step 356, a desired exchange objective is defined and a desirable subset of the rules is defined. Examples of desired exchange objectives include one or more of (1) elapse of a predetermined period of time from commencement of the exchange; (2) reaching a predetermined time for terminating the exchange; (3) a predetermined maximum or minimum number of winners overall; (4) a predetermined maximum or minimum number of winners in a geographic region; and (5) a predetermined maximum or minimum allocation value. This listing of exemplary desired exchange objectives, however, is not to be construed as limiting the invention since the use of other exchange objectives is envisioned. The desired subset of rules defined in step 356 can include all or a portion of the rules input in step 352.

The method then advances to step 358 where the optimizing software determines if an allocation of bids exists that is optimal for the type of exchange being conducted, i.e., a pure exchange, a forward auction or a reverse auction, subject to the subset of the rules defined in step 356. Examples of such allocations include: maximizing the value of the allocation of bids in a forward auction; minimizing the value of the allocation of bids in a reverse auction; and maximizing an exchange of goods and/or services in a pure exchange. This listing of exemplary allocations, however, is not to be construed as limiting the invention.

In a combinatorial exchange, each bid that is included in the allocation will include all of the items of the bid and at least part of the initial quantity of each item. For example, if an allocation includes a first type bid having a quantity Q1 of an item I1 and a quantity Q2 of an item I2, all or part of the quantity Q1 of item I1 will be included in the allocation and all or part of the quantity Q2 of item I2 will be included in the allocation. If an allocation includes a second type bid having a quantity Q1 or a range of quantities Q1$a$-Q1$b$ of an item I1 and a quantity Q2 or a range of quantities Q2$a$-Q2$b$ of an item I2, the quantity of item I1 included in the allocation with either be quantity Q1 or a quantity within the range of quantities Q1$a$-Q1$b$ and the quantity of item I2 included in the allocation with either be quantity Q2 or a quantity within the range of quantities Q2$a$-Q2$b$.

The method then advances to step 360 where a determination is made whether the desired exchange objective is satisfied. If so, the method advances to stop step 362 and the exchange event terminates. However, if the desired exchange objective is not satisfied, the method advances to step 366 where another, desirably distinct or unique, subset of rules is defined.

From step 366 the method advances to step 368 where the optimizing software determines if another allocation of the bids exists subject to the other subset of the rules defined in step 366. The method then returns to step 360 where another determination is made whether the desired exchange objective is satisfied. If so, the method advances to stop step 362 and the exchange event terminates. If not, steps 366, 368 and 360 are repeated as necessary, during the course of the exchange event until the desired exchange objective is satisfied whereupon the method advances to stop step 362 and the exchange event terminates.

Utilizing a distinct or unique subset of rules in each iteration of step 368 changes the conditions that the optimizing software utilizes to determine if an allocation of the bids exist subject to the subset of rules defined in the immediately preceding iteration of step 366. Where such allocation exists, it will typically be distinct or unique over any other allocation determined in step 358 or in another, e.g., earlier, iteration of step 368. However, this is not to be construed as limiting the invention since two or more distinct subset of rules may result in the optimizing software determining the same allocation.

Changing the subset of rules utilized by the optimizing software to determine if another allocation of the bids exists in each iteration of step 368 changes the space of feasible allocations, i.e., the set of all allocations of bids that will satisfy all the currently available rules, whereupon the optimal allocation within this space of feasible allocations will typically be distinct or unique over the optimal allocation of another space of feasible allocations. Hence, simply changing the subset of rules that the optimizing software utilizes to determine if an allocation of the bids exists in each repetition of step 368 causes the optimizing software to determine an allocation of the bids that will typically be distinct or unique over any other allocation of the bids determined in another iteration of step 368 or in step 358.

Each distinct subset of rules in step 366 can be defined in any suitable and/or desirable manner. For example, each distinct subset of rules can be defined by the optimizing software and/or one or more exchange participants, e.g., one or more bid takers 26. However, this is not to be construed as limiting the invention.

The rules of step 352 can be associated with bidder EDD 58 and/or bid taker EDD 60 in the manner described above. However, this is not to be construed as limiting the invention since any manner for inputting the rules in step 352 is envisioned.

Figure 19:
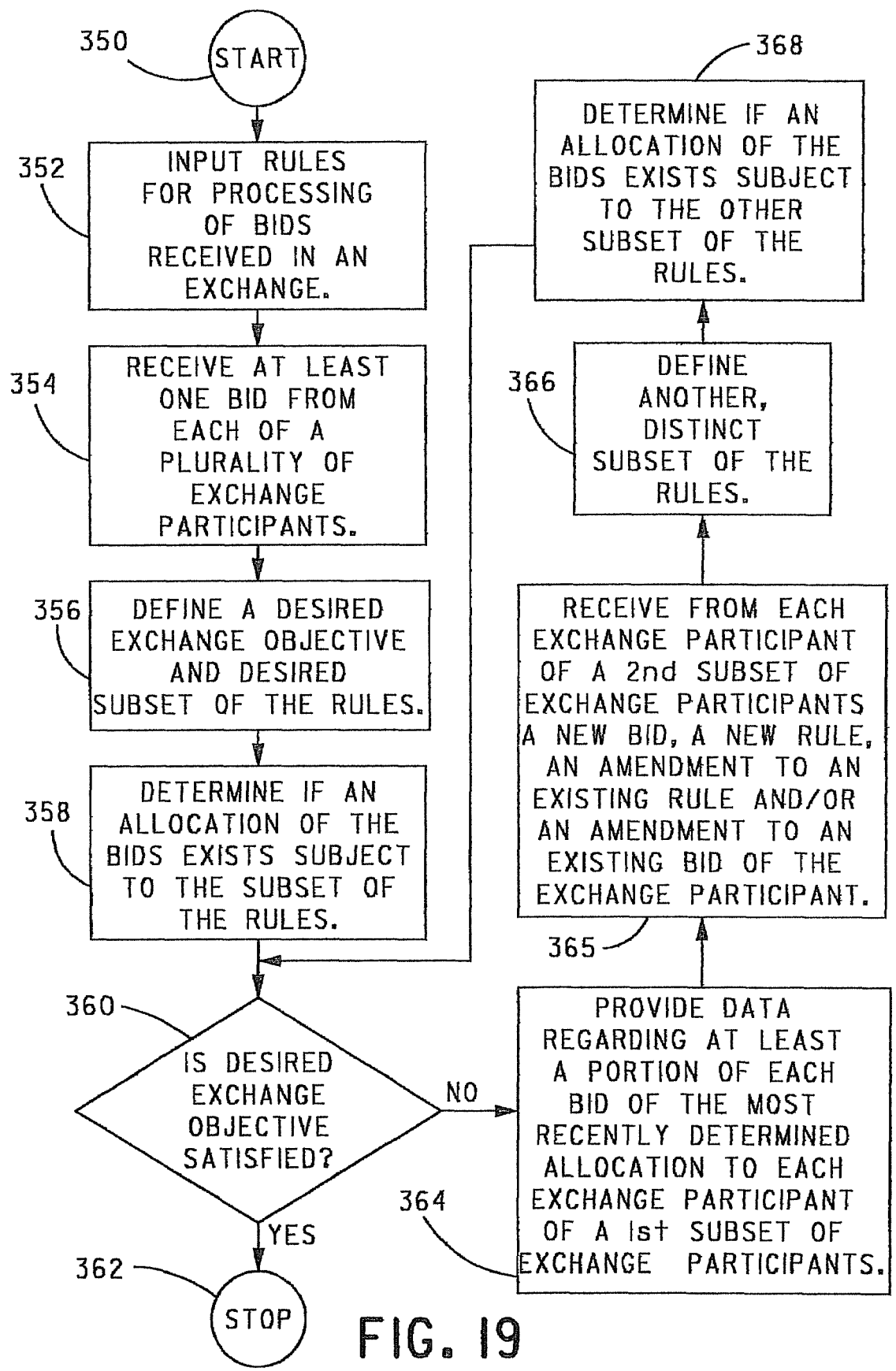
FIG. 19 is a flowchart of yet another method of conducting a live combinatorial exchange.

With reference to FIG. 19 and with ongoing reference to FIG. 18, the method described in connection with FIG. 18 can be amended to that include steps 364 and 365 as shown in FIG. 19. If the desired exchange objective has been determined not to exist in step 360, in step 364 data comprising at least a portion of each bid of the most recently determined allocation is provided to each exchange participant of a first subset of exchange participants. In step 365, the optimizing software receives from each exchange participant of a second subset of the exchange participants a new bid, a new rule, an amendment to an existing rule and/or an amendment to an existing bid of said exchange participant.

While each subset of exchange participants can include all or a portion of the exchange participants, the first and second subsets of exchange participants should typically be different since it is believed that not all of the exchange participants of the first subset of exchange participants will respond to the data provided in step 364. Therefore, it is believed that the second subset of exchange participants will only include a portion of the exchange participants of the first subset of exchange participants. However, this is not to be construed as limiting the invention since it is envisioned that the first and second subsets of exchange participants can be the same.

Collectively, steps 364 and 365 enable exchange participants acting as bidders 22 and/or bid takers 26 to dynamically respond to the most recently determined allocation by enabling each of said exchange participants to submit a new bid, a new rule, an amendment to an existing rule and/or an amendment to an existing bid in an attempt to favorably guide or steer the allocation determination process in a manner favorable to the exchange participant. For example, in response to receiving data in step 364 an exchange participant acting as a bidder may submit a new bid or rule, or amend an existing bid or rule in step 365 in order to be more competitive whereupon one or more of the bidder's bids either remain in or are included in the next allocation. Similarly, in response to receiving data in step 364 an exchange participant acting as bid taker may submit a new rule or amend an existing rule in step 365 in an attempt to maintain or improve the bid taker's allocation the time step 368 is executed.

From step 365, the method advances to step 366 where another, distinct or unique subset of the rules is defined based on the rules presently available, including any new rules or amendments to existing rules received in the immediately preceding iteration of step 365. The method then advances to step 368 where the optimizing software determines if an allocation of the bids exists subject to the other subset of rules defined in the immediately preceding iteration of step 366.

The method then advances to step 360 where a determination is made whether the desired exchange objective is satisfied. Thereafter, providing the desired exchange objective is not satisfied, steps 364, 365, 366, 368 and 360 are repeated, as necessary, during the course of the exchange event until the desired exchange objective is satisfied whereupon the method advances to stop step 362 and the exchange event terminates.

The first subset of exchange participants in step 364 can include all of the exchange participants or a select subset of the exchange participants, e.g., exchange participants not having a bid included in the allocation, exchange participants having at least one bid included in the allocation, and/or any other subset of identifiable and desirable exchange participants. However, this is not to be construed as limiting the invention.

One advantage of the methods shown in FIGS. 18 and 19 is that when an allocation has been found that satisfies the desired exchange objective, the exchange event can terminate without having to conduct additional rounds of the exchange.

To facilitate providing the data in step 364 to each interested exchange participant, the optimizing software can be configured to respond to a suitable request for such data by said exchange participant. In response to receiving such request, the optimizing software can then provide the data to the exchange participant when step 364 is executed. The receipt of a suitable request to be provided with data in step 364 can be a preconditioned for each exchange participant to be included in the first subset of exchange participants. Also or alternatively, if the first subset of exchange participants is determined in another manner, the receipt of a suitable request to be provided with data in step 364 can be a condition for including the requesting exchange participant in the first subset of exchange participants. Each request to be provided with at least a portion of each bid of the allocation can be submitted to the optimizing software in any suitable and desirable manner. Similarly, amendments to existing bids, new bids, amendments to existing rules and/or new rules can be submitted to the optimizing software in any suitable and desirable manner. Accordingly, details regarding how a request to be provided with data in step 364 is submitted to the optimizing software, how an amendment to an existing bid or rule and/or how a new bid or rule is submitted to the optimizing software will not be described herein in detail for purpose of simplicity.

If two or more allocations are determined to exist in two or more iterations of step 368, the subset of rules utilized in the most recent iteration of step 368 either maintain, enlarge, or reduce the feasible allocation space over the feasible allocation space in the immediately preceding iteration of step 368. As used herein, "feasible outcome space" means the set of all possible allocations where each rule of the subset of rules utilized for determining each allocation of said set of allocations is satisfied.

As discussed above, each subset of rules utilized in steps 358 and 368 is desirably distinct or unique from each other subset of rules. The number of rules comprising each subset of rules can either increase or decrease with each iteration of step 318 based on a predetermined condition, such as, without limitation, a predetermined time during the exchange.

Bid Amendment Constraints:

The optimizing software can be configured to permit unconditional amendments to or deletions of existing bids, or conditional amendments to or deletions of existing bids. An unconditional amendment to or deletion of an existing bid is one where the optimizing software places no conditions upon the amendment or deletion whereupon the amendment or deletion is fully implemented when the next allocation is determined. A conditional amendment to or deletion of an existing bid can be one of two types. Namely, one that the optimizing software permits based on a rule that the bid not being included in the immediately preceding allocation or one that is based on a rule that one or more conditions be satisfied when the optimizing software determines an allocation that includes the proposed amendment to or deletion of the bid. Examples of the latter include a proposed amendment or deletion of a bid based on said amendment or deletion not worsening the bid taker's allocation value or the feasibility of the allocation, and a proposed amendment or deletion of a bid based on said amendment or deletion improving the allocation value or volume of items traded. For example, suppose an exchange participant purposes an amendment to or a deletion of a bid subject to a rule or constraint that the amendment or deletion not worsen the value of the bid taker's allocation. If, subject to this rule, the optimizing software determines that the amendment or deletion worsens the value of the bid taker's allocation, the optimizing software disregards the amendment or deletion and determines the next allocation utilizing the current form of the bid. However, if the bid takers allocation value either improves or is maintained, the amendment or deletion is implemented and the thus determined allocation is retained.

Amendments to an existing bid can include amending at least one of: a bid price or value, a quantity of at least one item, at least one item attribute, at least one bid attribute, a discount, and a constraint or rule. However, this is not to be construed as limiting the invention.

In a dynamic combinatorial exchange, each exchange participant is at least one of bidder 22, exchange manager 24 and bid taker 26. The price of a bid received from an exchange participant acting as a bid taker 26 operates as a reserved price for the quantity of all of the items of the bid. For example, if the exchange participant acting as a bid taker is a buyer, the bid price operates as a reserved price that establishes the maximum price the bid taker is willing to pay for the quantity of each item of the bid.

Bid Format:

In a dynamic combinatorial exchange, each bid of a subset of the input bids, i.e., all or a portion of the input bids, can be formed from data entered by the corresponding exchange participant. For each bid of said subset of input bids that consists of at least one item and an expressed or implied quantity of one (1) for said item, said bid can be formed from data entered in one of the following formats: price; price in combination with a non-price attribute (such as an item attribute or a bid attribute discussed above); cost plus (+) a value (such as a predetermined value, a percentage of the cost, etc.); list price minus a discount off of the list price; cost in combination with a non-price attribute of the type described above; and list price minus a discount off said list price in combination with a non-price attribute of the type described above.

For each bid of said subset of bids that consist of at least one item and a quantity of more than one for each item, said bid can be formed from data entered in one of the following formats: price and quantity; and price-quantity in combination with a non-price attribute of the type described above.

Auction Information System:

In a dynamic combinatorial exchange, it is desirable to enable exchange participants to react, or the system to react on behalf of exchange participants, to the changing allocation conditions occurring during the course of an exchange event. To this end, where an allocation is being determined in each round of a multiple round exchange event, it may be desirable at a suitable time to notify one or more of the exchange participants when an allocation moves away from the desired exchange objective. In response to receiving this notification, the one or more exchange participants can take appropriate action, i.e., submit a new bid and/or rule, and/or amend an existing bid and/or rule, in an attempt to affect one or more subsequent allocations in a manner favorable to the exchange participant. For example, in an exchange where the minimum number of winners is set to three (3), if the number of winners having bids included in two or more allocations drops from 4 to 3, the optimizing software can notify one or more exchange participants that the allocation is on the edge of the desired exchange objective. If the minimum number of winners in two or more allocation drops from 3 to 2, the optimizing software can notify one or more exchange participants that the allocation is outside the desired allocation outcome.

In response to receiving such notification, one or more of the exchange participants can respond by submitting a new bid and/or rule, and/or amending an existing bid and/or rule in an attempt to have a subsequently determined allocation include at least one bid of said exchange participant(s) while satisfying the desired exchange objective or by moving the allocation in a direction away from the edge of the desired exchange objective. As used herein, the concept of amending a bid and/or rule is to be construed as amending one or more values or variables thereof in any suitable or desirable manner, including changing said value(s) or variable(s) in a manner that effectively deletes the bid and/or rule.

Figure 20:
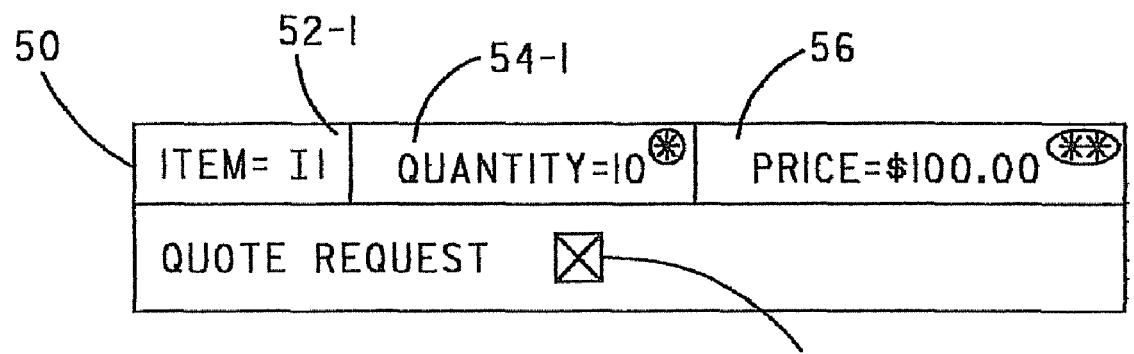
FIG. 20 is a block diagram of an exemplary bid including a bidder selectable "Quote Request" field.

Quoting (Bid-to-Win):

With reference to FIG. 20, a bid 50 submitted by an exchange participant acting as a bidder 22 can have associated therewith a quote request field 330 that can be selected by the exchange participant whereupon the optimizing software will determine subject to a subset, i.e., all or a portion, of the currently available rules a proposed amendment to the bid which, if adopted, will cause the bid to be included in the next allocation determined by the optimizing software. The thus determined proposed amendment to the bid can then be reported back to the bidder. Quote request field 330 can be associated with any bid in any desirable and suitable manner.

The quote request can be a price quote request, a volume quote request or an item attribute quote request. For a volume quote request, the numerical quantity associated with quantity 54-1 is left blank whereupon the optimizing software returns to the exchange participant of bid 50 the number to be associated with quantity 54-1 that will cause bid 50 to be included in the next allocation determined by the optimizing software. Similarly, the number associated with price 56 can be left blank whereupon the optimizing software returns to the exchange participant of bid 50 the number to be associated with price 56 that will cause bid 50 to be included in the next allocation determined by the optimizing software. For an item attribute quote request, bid 50 can have associated therewith an item attribute (not shown) that is left blank whereupon the optimizing software returns to the exchange participant of bid 50 an input to said item attribute that will cause bid 50 to be included in the next allocation determined by the optimizing software.

In response to receiving the proposed amendment to the bid, the bidder can amend the bid accordingly whereupon the optimizing software determines an allocation that includes the amended bid.

The proposed amendment to the bid can include amending at least one of: bid price; quantity of at least one item; reserved price; free disposal; item attribute; item adjustment; bid adjustment; bid attribute; maximum/minimum number of items; cost constraint/requirement; unit constraint/requirement; counting constraint/requirement; homogeneity constraint; mixture constraint; relaxation importance; cost conditional pricing; unit conditional pricing; exchange objective; constraint relaxer; and supplier performance rating.

Managing Infeasibility:

In a combinatorial exchange, it is desirable to know in advance of invoking the optimizing software whether the exchange is overconstrained whereupon no feasible allocations exist for the set of bids and the subset of rules to be utilized by the optimizing software to determine an allocation of the bids. One method of determining whether an exchange is overconstrained will now be described with reference to FIGS. 21a and 21b.

Figure 21A:
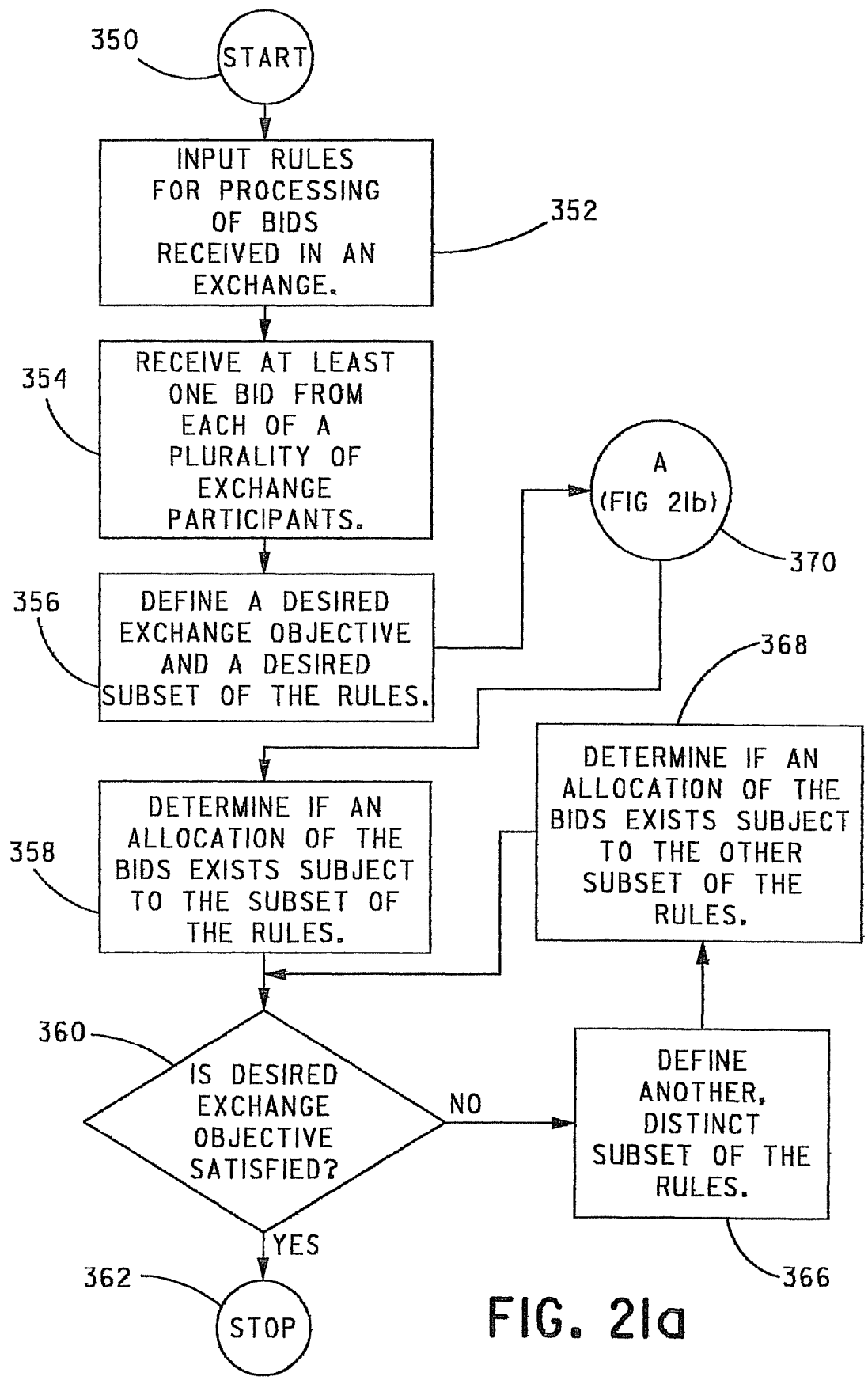
FIG. 21a is the flowchart of FIG. 18 including a connector A to a method of determining whether the exchange is overconstrained.
Figure 21B:
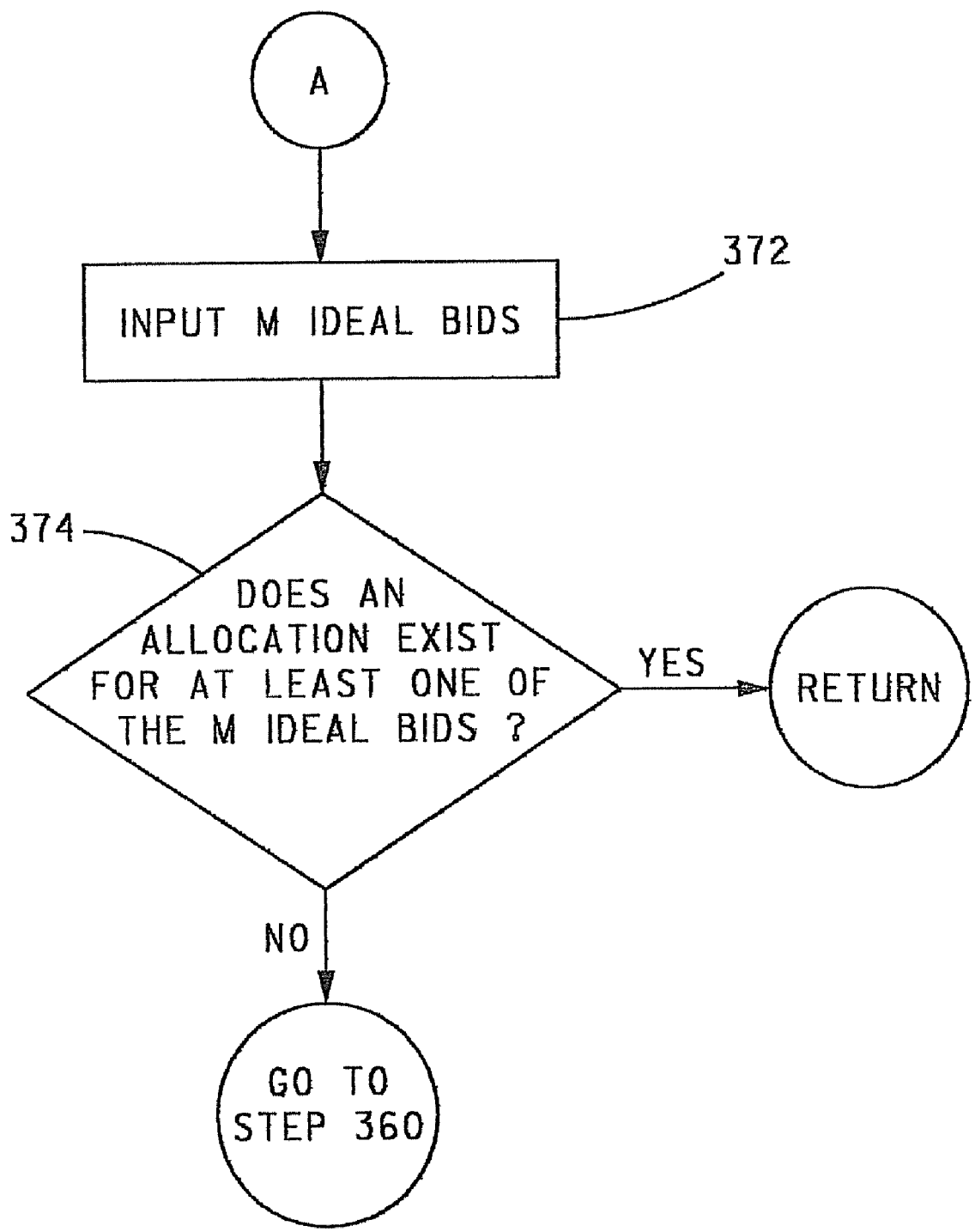

The flowchart of FIG. 21a is similar to the flowchart of FIG. 18 except that the flowchart of FIG. 21a includes a connector 370 between steps 356 and 358. The steps associated with connector 370 are shown in FIG. 21b. For the purpose of determining whether a feasible allocation exists, the rules input in step 352 desirably include one or more minimum winner rules and one or more maximum volume percentage rules. Once step 356 is complete, the method advances to connector 370 and thereby to step 372. In step 372, M ideal bids are input into the optimizing software. Each ideal bid is for the entire quantity of each item desired to be sourced during the exchange. Each item desired to be sourced and its associated quantity can be input at any suitable time prior to step 372.

The value of M is related to (1) the minimum winners rule having the largest value and (2) the maximum volume percentage rule having the smallest value. More specifically:

$$M = \frac{\text{\# items}}{\min\left\{\frac{1}{A}, \frac{B}{2}\right\}} + 1$$

where #items=the sum of the entire quantity of each item desired to be sourced during the exchange; A=the minimum winners rule having the largest value; and B=the maximum volume percentage rule having the smallest value.

Suppose two minimum winners rules having values of 3 and 4 are input in step 352. In this example, A is assigned the value of 4, i.e., the minimum winners rule having the largest value. Similarly, suppose two maximum volume percentage rules having values of 10% and 20% are input in step 352. In this example, B is assigned the value of 10%, i.e., the maximum volume percentage rule having the smallest value.

The method then advances to step 374 where the optimizing software determines if an allocation exists for at least one of the M ideal bids subject to the currently available rules. If not, the exchange is deemed to be overconstrained and, therefore, infeasible whereupon the method advances to step 360 in FIG. 21a. However, if step 374 determines that an allocation exists for at least one of the M ideal bids, the method returns from connector 322 to the flowchart shown in FIG. 21a whereupon steps 358, 360, 366 and 368 are executed, as necessary, in the manner described above in connection with FIG. 18 until stop step 362 is executed.

Desirably, each ideal bid does not have a price associated therewith. However, this is not to be construed as limiting the invention. Moreover, when determining the value of M in the manner described above, if the value of M includes a fraction, the value of M is desirably rounded up to the next whole number. Lastly, the value of the maximum volume percentage rule having the largest value is desirably less than or equal to the # items.

Figure 22:
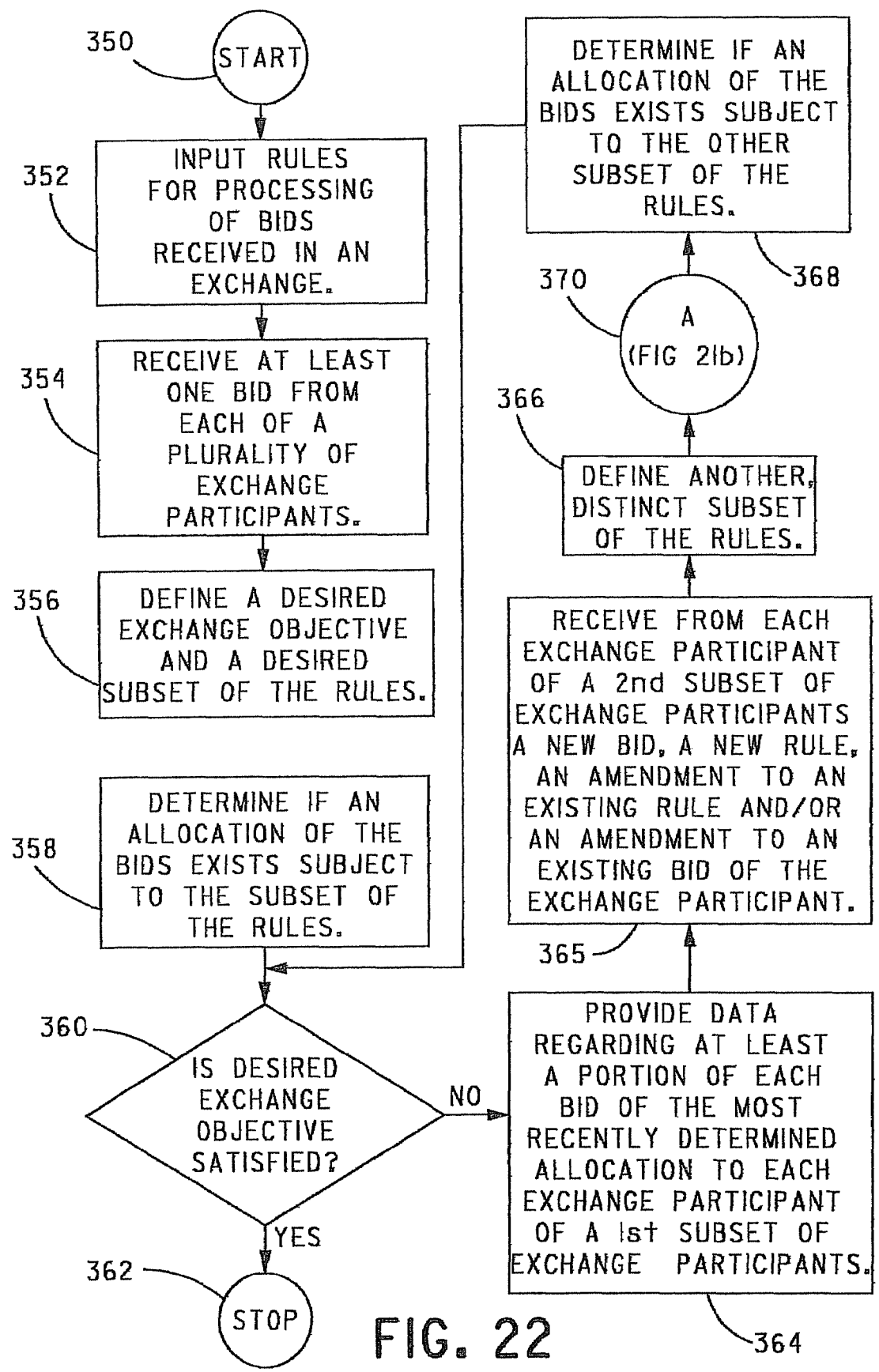
FIG. 22 is the flowchart of FIG. 19 including the connector A to the method shown in FIG. 21b.

With reference to FIG. 22 and with continuing reference to FIG. 21b, the flowchart of FIG. 22 is similar to the flowchart of FIG. 19 except that the flowchart of FIG. 22 includes connector 370 between steps 366 and 368. This position of connector 370 is particularly advantageous for determining if an allocation exists for at least one of the M idea bids subject to a distinct subset of rules that may include a new rule or an amendment to an existing rule received in step 365.

If the steps associated with connector 370 determine that an allocation exists for at least one of the M ideal bids, the method returns to step 368 in FIG. 22. Thereafter, steps 368, 360, 364, 365 and 366 and connector 370 are repeated, as necessary, until the method advances to stop step 362. However, if the steps associated with connector 370 determine that an allocation does not exist for at least one of the M ideal bids, the exchange event is designated as being overconstrained whereupon the method advances directly to step 360 in FIG. 22. If the desired exchange objective is not satisfied in step 360, steps 364, 365, 366, connector 370 and steps 368 and 360 are repeated, as necessary, until the method advances to stop step 362.

The steps associated with connector 370 in FIG. 21b can be utilized with the initial subset of the rules input for processing bids received in the exchange, as shown in FIG. 21a, can be used with each new subset of the currently available rules, as shown in FIG. 22, or in combination.

If desired, when the method associated with connector 370 determines that an allocation does not exist for at least one of the M ideal bids, the optimizing software can output a suitable indication to one or more exchange participants. The output of such indication and/or the exchange participant(s) receipt of such indication, however, is not to be construed as limiting the invention.

Bid Exclusion:

To encourage competition in a dynamic combinatorial exchange, the bids of each bidder that does not have at least one such bid included in a preceding allocation can be excluded from the determination of each subsequent allocation. This exclusion encourages competition since exchange participants acting as bidders know that least competitive bidders will not be awarded business, either in the final round of determining an allocation in the exchange event or by being permitted to proceed through subsequent rounds to the final round.

Figures 23, 24:
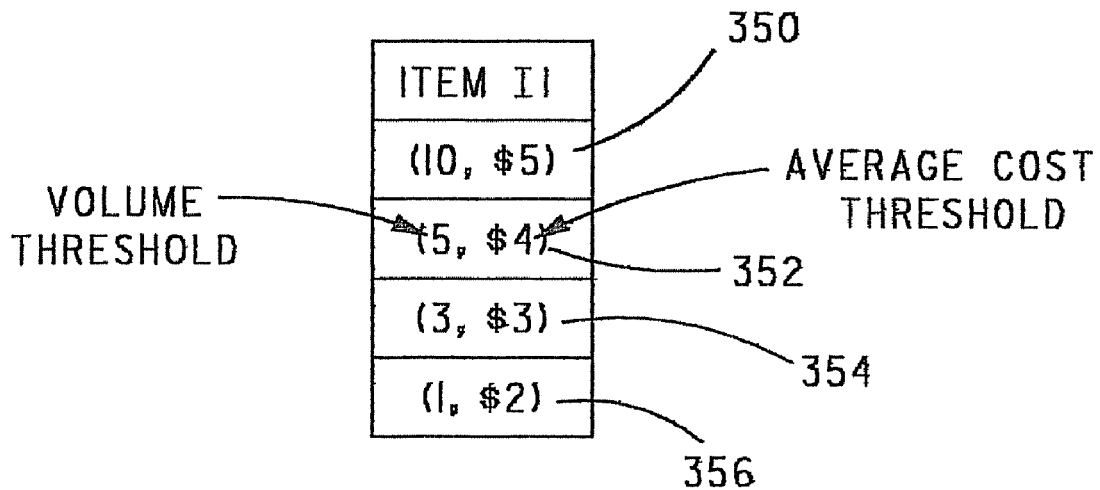
FIG. 23 illustrates a plurality of volume threshold–average cost threshold pairs for an item I1 of an exchange.
FIG. 24 is a block diagram for an exemplary bid including bidder selectable "Reference Ratio" and "Discount" fields.

Automated Demand Reduction:

With reference to FIG. 23, in a combinatorial exchange, each item desired to be sourced in a reverse auction along with a desired quantity thereof or each item desired to be sold in a forward auction along with a desired quantity thereof can be input into the exchange along with a plurality of volume threshold-average cost threshold pairs for said item. Next, an average cost of each allocated item can be determined by dividing a sum of the bid prices attributable to each allocated item by a sum of all of the allocated quantities of said item.

In a reverse auction, if the average cost of an item is greater than the average cost threshold of one of the volume threshold-average cost threshold pairs for said item, the desired quantity of the item to be sourced is decreased to be less than or equal to the volume threshold of said one volume threshold-average cost threshold pair for said item.

For example, suppose that an item I1 input into the exchange has associated therewith the plurality of volume threshold-average cost threshold pairs 350-356 shown in FIG. 23. Suppose further that the average cost attributable to item I1 is greater than the average cost threshold of volume threshold-average cost threshold pair 352 but less than the average cost threshold of volume threshold-average cost threshold pair 350. Hence, the desired quantity of item I1 to be sourced in the reverse auction is decreased to be less than or equal to the volume threshold of volume threshold-average cost threshold pair 352, i.e., $\leq 5$. Decreasing the desired quantity of I1 to be sourced in a reverse auction avoids sellers from maintaining the average cost of each unit of item I1 at an artificially high value.

Similarly, in a forward auction, if the average cost or revenue of an item is less than the average cost threshold of one of the volume threshold-average cost threshold pairs for the item, the desired quantity of each item to be sold is increased to be greater than or equal to the volume threshold of said one volume threshold-average cost threshold pair for said item.

For example, suppose that the average cost of item I1 is less than the average cost threshold of volume threshold-average cost threshold pair 354 and greater than the average cost threshold of volume threshold-average cost threshold pair 356. Hence, the desired quantity of item I1 to be sold in a forward auction is increased to be greater than or equal to the volume threshold of volume threshold-average cost threshold pair 354, i.e., $\geq 3$. Increasing the desired quantity of item I1 to be sold in a forward auction avoids buyers from maintaining the average cost of each unit of item I1 at an artificially low value.

In a reverse auction, one of the desired exchange objectives can be the average cost for each item allocated being equal to or greater than a maximum average cost threshold for said item. For example, in FIG. 23, the maximum average cost threshold for item I1 is $5.00. If, in a reverse auction, the average cost of each allocated unit of item I1 is greater than or equal to $5.00 and the average cost of each other allocated item is greater than or equal to its maximum average cost threshold, the one desired exchange objective is satisfied and the exchange event terminates.

In a forward auction, one of the desired exchange objectives can be the average revenue or cost for each allocated unit of item I1 being less than or equal to a minimum average cost threshold for a said item. For example, in FIG. 23 the minimum average cost threshold for item I1 is $2.00. If, in a forward auction, the average cost of each allocated unit of item I1 is less than or equal to $2.00 and the average cost for each other allocated item is less than or equal to its minimum average cost threshold, the one desired exchange of objective is satisfied and the exchange event terminates.

The plurality of volume threshold-average cost threshold pairs can be stored in any suitable form. Examples of such suitable forms include a curve of volume threshold versus average cost threshold, an algorithm where the volume threshold is expressed as a function of the average cost threshold, or vice versa, or, as shown in FIG. 23, a set of discrete volume threshold-average cost threshold pairs.

Ratio Bidding:

With reference to FIG. 24, in a live combinatorial exchange, it is often desirable for exchange participants acting as bidders to receive a discount off of the bid price when a different number of complimentary items are sourced. For example, it would be desirable for a bidder to receive a percent discount off of the bid price of a bid for each instance of one or more bicycles and two bicycle tires per bicycle. Similarly, it would be desirable to give a percent discount off of the bid price of a bid for each instance one or more automobiles and four tires per automobile.

To facilitate the granting of such discount, the optimizing software can be configured to process the bid 400 shown in FIG. 24. Bid 400 includes columns 402-406 entitled Item, Quantity and Price, respectively. Row 408 of bid 400 includes a Quantity of two for the Item bicycle at a Price of $100.00, i.e., an average price of $50.00 each. Row 410 of bid 400 includes a Quantity of 5 for the Item bicycle tire at a Price of $15.00, i.e., an average price of $3.00 each. Bid 400 also includes a field 414 entitled Reference Ratio that the bidder 22 of bid 400 can enter in a desired reference ratio. In the example shown in FIG. 24, the value of desired reference ratio equals 1/2. Lastly, bid 400 includes a discount field 418 that the bidder 22 of bid 400 can enter in a desired discount value, albeit in the form of a percent discount or an absolute price discount. In an example shown in FIG. 24 the value of the desired discount equals 10%.

In order to process bid 400 in the manner described hereinafter, a rule is associated with bid 400 in any suitable and desirable manner. At an appropriate time when the optimizing software determines an allocation of bids, the optimizing software processing bid 400 in accordance with the rule associated therewith causes the discount value included in field 418 to be applied to the average price of each bicycle and bicycle tire for each instance of the allocated quantity of bicycles over the allocated quantity of bicycle tires that equals the reference ratio. For example, suppose the optimizing software allocates the two (2) bicycles and the five (5) bicycle tires of bid 400. Since the reference ratio value included in field 414 equals 1/2, for each instance where one bicycle and two bicycle tires have been allocated, the percent discount included in field 418 is applied to the average price of the corresponding items. In the foregoing example where two bicycles and five bicycle tires have been allocated, two instances of one bicycle and two bicycle tires exist. For each such instance, a ten percent (10%) discount is applied to the average price of the bicycle and a ten percent discount is applied to the average price of each bicycle tire. Thus, instead of each instance of one bicycle and two bicycle tires having a total value of $56.00 (the sum of the average prices in bid 400), the total price will be $50.40, i.e., 10% less than $56.00.

Since, in the present example, two bicycle and five bicycle tires have been allocated, the total value of the bid will equal $103.80, i.e., $50.40 for the first instance of one bicycle and two bicycle tires+$50.40 for the second instance of one bicycle and two bicycle tires+$3.00 for the extra bicycle tire.

Bid Type Option:

One or more rules can be associated with an item or a bid that includes the item for causing the optimizing software to allocate an integer quantity of the item. This is because it often makes little sense to allocate less than an integer number of an item. For example, suppose a bid for two (2) bicycles is processed by the optimizing software. It would make little sense for the optimizing software to allocate 1.5 bicycles. Accordingly, the one or rules is associated with the bid and/or the item to require the allocation of an integer quantity of the item.

Under certain circumstances, however, the bid taker may wish to relax the rule(s) whereupon the optimizing software can allocate a real number quantity of one or items that otherwise would be allocated in integer number quantities. Thus, in the foregoing example, the optimizing software could allocate 1.5 bicycles to the bid taker. Thereafter, it would be the responsibility of the bid taker to recognize that the allocation of 1.5 bicycles in-fact represents the allocation of two (2) bicycles.

The motivation for permitting items that can only be allocated in integer number quantities to be allocated in terms of a real number quantity is to lower the overall procurement cost and to decrease the time for the optimizing software to determine the allocation.

If desired, one or more rules associated with an item or a bid that requires a real number quantity of at least one item of the bid to be included in the allocation can also be relaxed whereupon an integer number quantity of said at least one item can be included in the allocation.

Figure 25A:
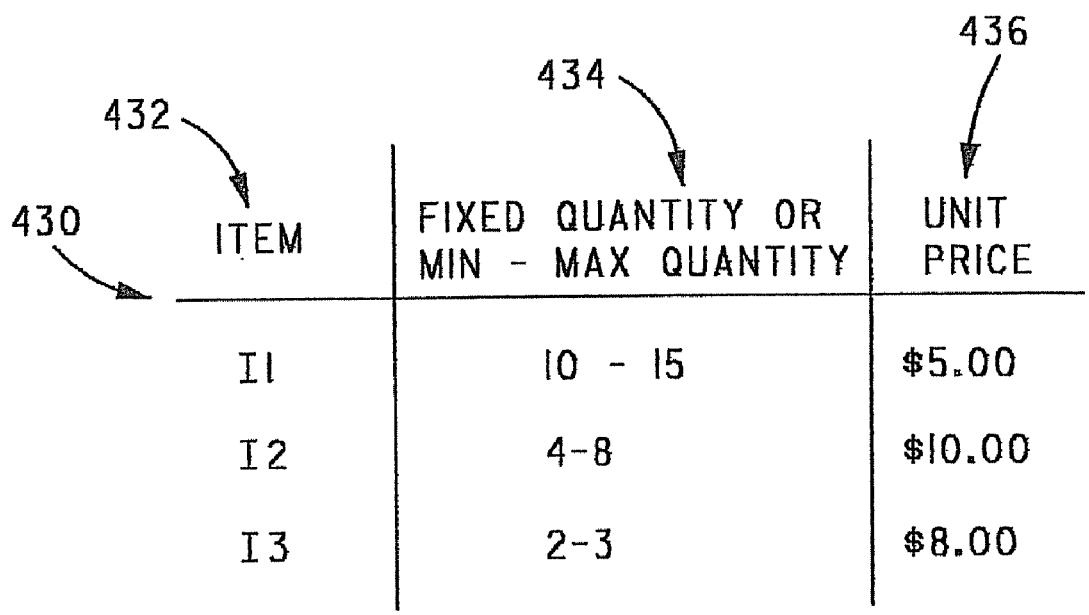
FIGS. 25a and 25b illustrate first and second embodiment package bids.
Figure 25B:
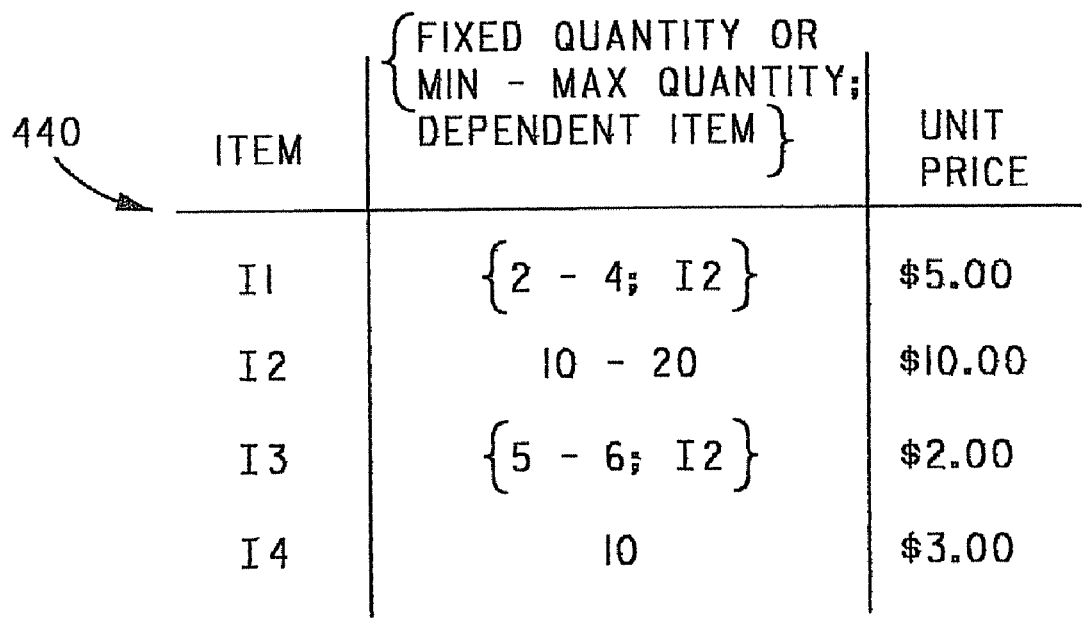

Package Bids:

With reference to FIGS. 25a and 25b, in a combinatorial exchange, such as a live combinatorial exchange, it is often desirable to enable bidders to submit so-called "package bids" 430. Each package bid includes at least one item 432, a quantity or range of quantities 434 for said item 432 and a unit price 436 for each unit of said first item 432.

The rule(s) for processing each package bid 430 can be associated with the package bid in any suitable and/or desirable manner. At an appropriate time when the optimizing software determines an allocation of bids, the optimizing software processes each package bid 430 in accordance with the rule(s) associated therewith in the manner described next.

In order for package bid 430 to be valid, the quantity 434 of each item 432 included in the allocation must fall within the range of quantities available for the item or, in the case where an item 432 has a fixed quantity 434, the fixed quantity must be allocated. For example, in FIG. 25a, package bid 430 includes item I1 having a range of quantities between 10 and 15 inclusive and a unit price of $5.00 per unit; item I2 has a range of quantities between 4 and 8 inclusive and a price of $10.00 per unit; and item I3 has a range of quantities between 2 and 3 inclusive and a price of $8.00 per unit.

Suppose the optimizing software allocates a quantity of 12 of item I1, a quantity of 4 of item I2 and a quantity of 3 of item I3. Because the quantity of each item I1, I2 and I3 is within the range provided for said item in package bid 430, package bid 430 is deemed valid and its total price is $124.00=((12×$5.00)+(4×$10.00)+(3×$8.00)).

However, if the optimizing software allocates a quantity of 10 of item I1; a quantity of 2 of item I2; and quantity of 2 of item I3, package bid 430 is not valid because the quantity of item I2 is not within its valid range, i.e., 4-8 inclusive. When package bid 430 is not valid, the allocation itself is not valid because the rule(s) associated with package bid 430 is/are not satisfied.

FIG. 25b shows another form of package bid 440 wherein an acceptable quantity of one or more items of bid 440 is related to the quantity of another item of bid 440. For example, package bid 440 includes item I1 having a price of $5.00 per unit and a quantity between 2 and 4 inclusive dependent upon, e.g., the product of, the quantity of item I2; item I2 having a range of quantities between 10 and 20 and a price of $10.00 per unit; item I3 having a price of $2.00 per unit and a quantity between 5 and 6 inclusive dependent upon, e.g., the product of, the quantity of item I2; and an item I4 having a fixed quantity of 10 and a price of $3.00 per unit.

If the optimizing software allocates a quantity of 20 of I1; a quantity of 10 of item I2; a quantity of 50 of item I3; and a quantity of 10 of item I4, package bid 440 is valid. This is because the allocated quantity of 10 of item I2 falls within the acceptable range of quantities; the allocated quantity of 20 of item I1 is within the range of acceptable allocations therefor, i.e., 2×10 (the allocated quantity of I2); the allocated quantity of item I3 is within the acceptable range therefor, i.e., 5×10 (the allocated quantity of item I2); and the allocated quantity of item I4 equals the acceptable quantity therefor. The total price of this package bid is $330.00=((20×$5.00)+(10×$10.00)+(50×$2.00)+(10×$3.00)).

However, if the optimizing software allocates a quantity of 10 of item I1; a quantity of 10 of item I2; a quantity of 40 of item I3; and a quantity of 10 of item I4, package bid 440 is not valid because an acceptable quantity of neither item I1 or item I3 has been allocated.

Figure 26:
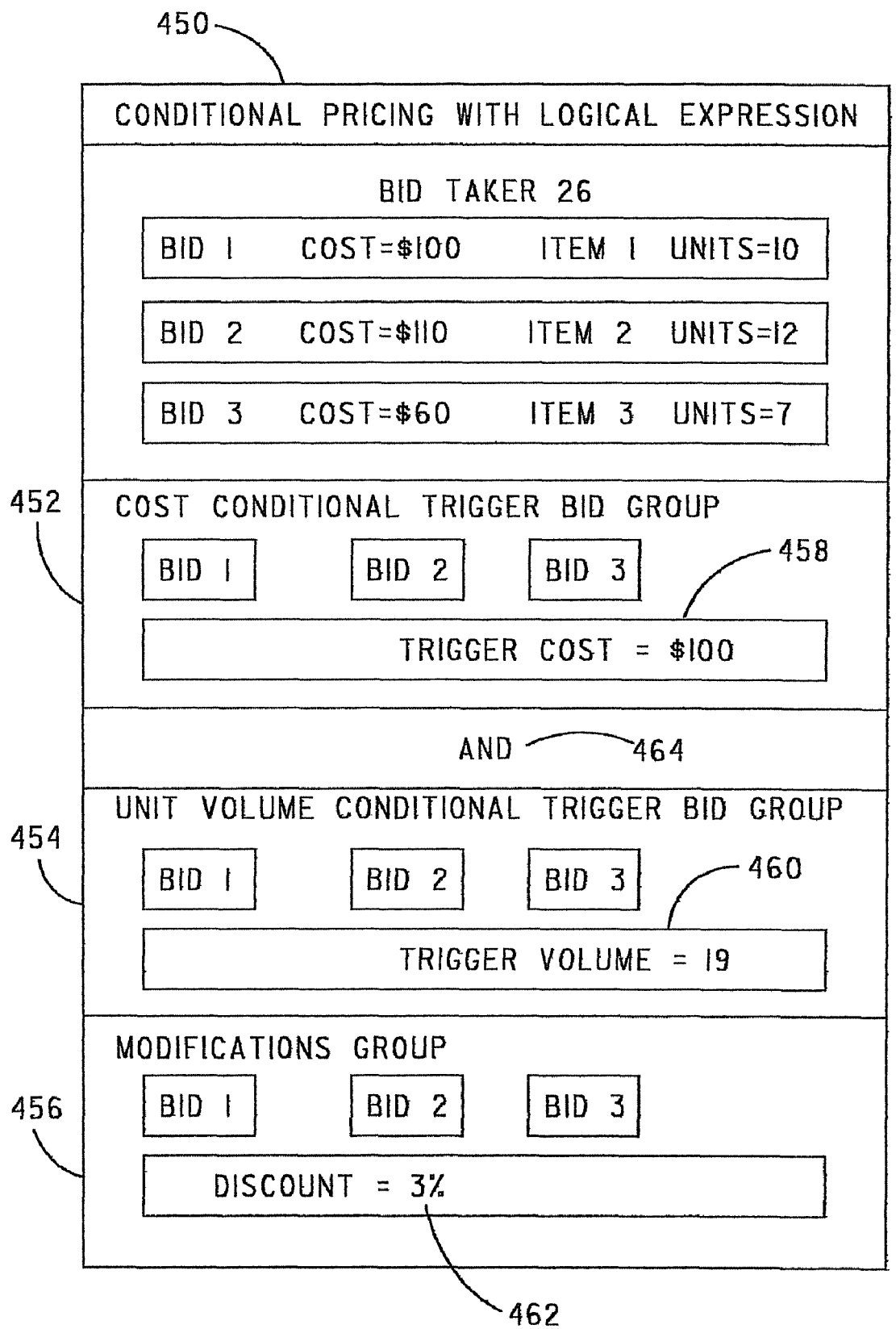
FIG. 26 is a block diagram of a conditional pricing with logical expressions rule.

Conditional Pricing with Logical Expression:

With reference to FIG. 26, also or alternatively, a conditional pricing with logical expression rule 450 can be associated with one or more bids of an exchange in any suitable and/or desirable manner. Conditional pricing with logical expression rule 450 causes the optimizing software to modify the cost outcome of a forward auction, reverse auction or exchange based on a value of a logical expression.

For example, conditional pricing with logical expression rule 450 can have three bid groups 452, 454 and 456 associated therewith. Bid groups 452 and 454 are trigger bid groups. Bid group 456 is a modifications bid group.

In operation, conditional pricing with logical expressions rule 450 causes the optimizing software to operate in a manner similar to cost/unit condition pricing rules 131 and 134 by adjusting the value of the solution when the logical expression on bid groups 452 and 454 is TRUE. For example, suppose that each bid group 452, 454 and 456 includes bids 1, 2 and 3 associated with a specific bid taker 26. If a sum of the costs of all the accepted bids in trigger bid group 452 are greater than a predetermined trigger cost 458 associated with that bid group, AND if the unit volume of all the items in the accepted bids in trigger group 454 is greater than a predetermined trigger volume 460 associated with that bid group, then the modification included in modifications group 456 is applied to bids 1, 2 and 3. In this example, the modification included modifications group 456 is a predetermined discount value 462 of 3% that is applied to the total cost of bids 1, 2 and 3. Other implementations of the conditional pricing with logical expression rule 450 are envisioned. For example, these other implementations may use different costs or unit volume trigger groups, item attributes, bid attributes and logical operators between them.

In the foregoing example, the logical operator AND 464 is utilized to logically connect cost conditional trigger bid group 452 AND unit volume conditional trigger bid group 454. The use of logical operator 464 will now be described.

Assume that the sum of the cost of all the accepted bids in trigger bid group 452 is greater than the predetermined trigger cost 458, AND the unit volume of all the items in all of the accepted bids in trigger bid group 454 is greater than the predetermined trigger volume 460. If so, trigger bid group 452 is considered to be logically TRUE and trigger bid group 454 is considered to be logically TRUE. Because logical operator 464 in this example is AND, and because the logical values of trigger bid groups 452 and 454 are TRUE, the logical AND combination of the logical values of trigger bid groups 452 and 454 is TRUE whereupon the modifications group is applied. However, if the logical value of one or both of trigger bid groups 452 and 454 is FALSE, the logical AND combination of these logical values is FALSE whereupon the modifications group is not applied.

For example, suppose bid 1 and bid 2 are included in an allocation and bid 3 is not included in the allocation. Then, the total cost of bid 1 and bid 2 is $210.00 which exceeds the predetermined cost 458 of $100.00, and the unit volume of bid 1 and bid 2 is 20 which exceeds the predetermined trigger volume 460 of 19. Therefore, the logical operator AND 464 is evaluated as TRUE and bid 1 and bid 2 are subjected to a 3% cost discount. Now, suppose that bid 1 and bid 3 are included in an allocation and bid 2 is not. Then, the total cost of bid 1 and bid 3 exceeds trigger cost 458, but the unit volume of bid 1 and bid 3 is 17, which is below the predetermined trigger volume 460 of 19. Therefore, the logical operator AND 464 is evaluated as FALSE and the modification value, in this case the 3% cost discount, is not applied to bids 1 and 3.

Figure 27A:
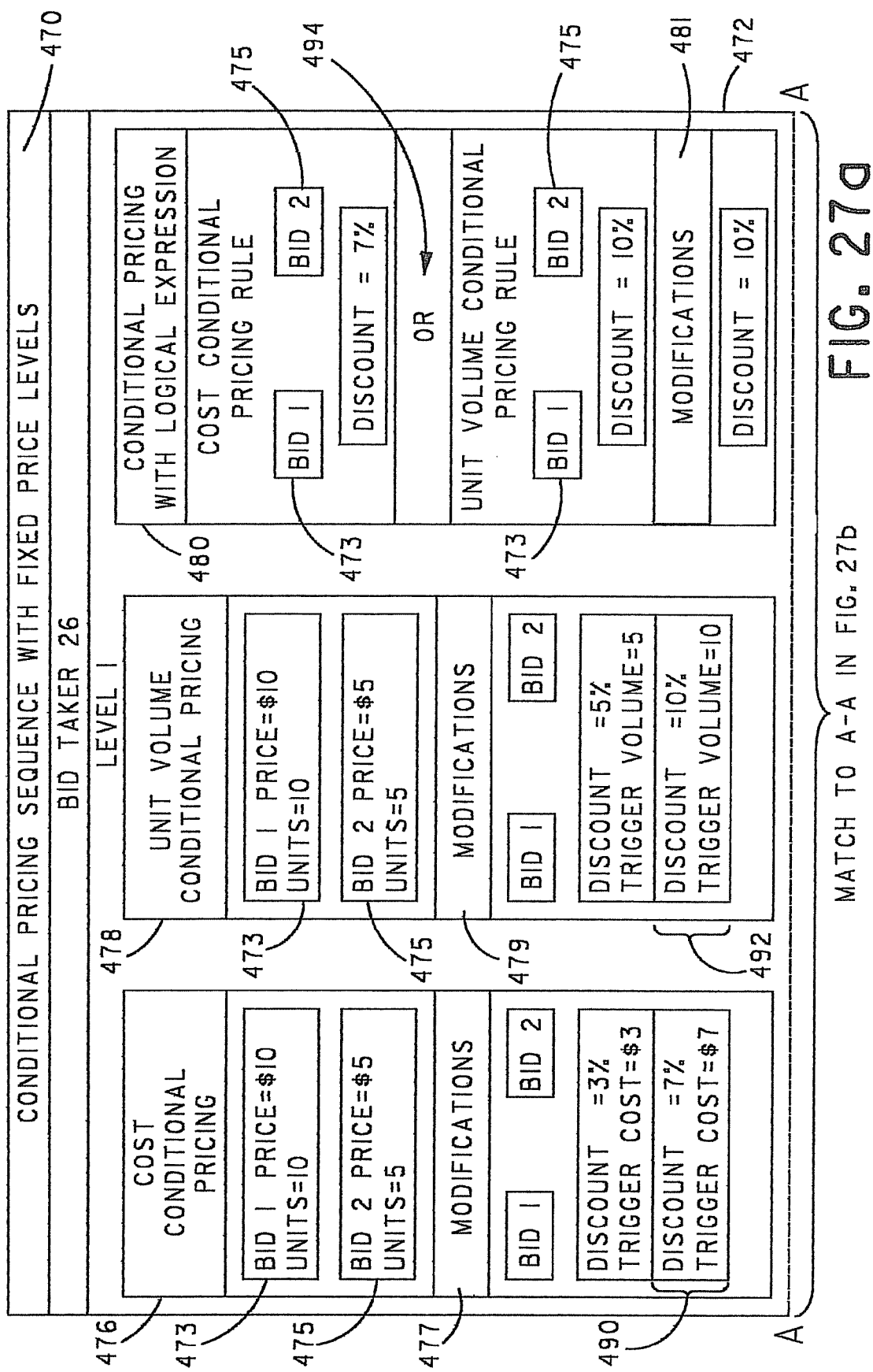
FIG. 27 is a block diagram of a conditional pricing sequence with fixed price levels rule.
Figure 27B:
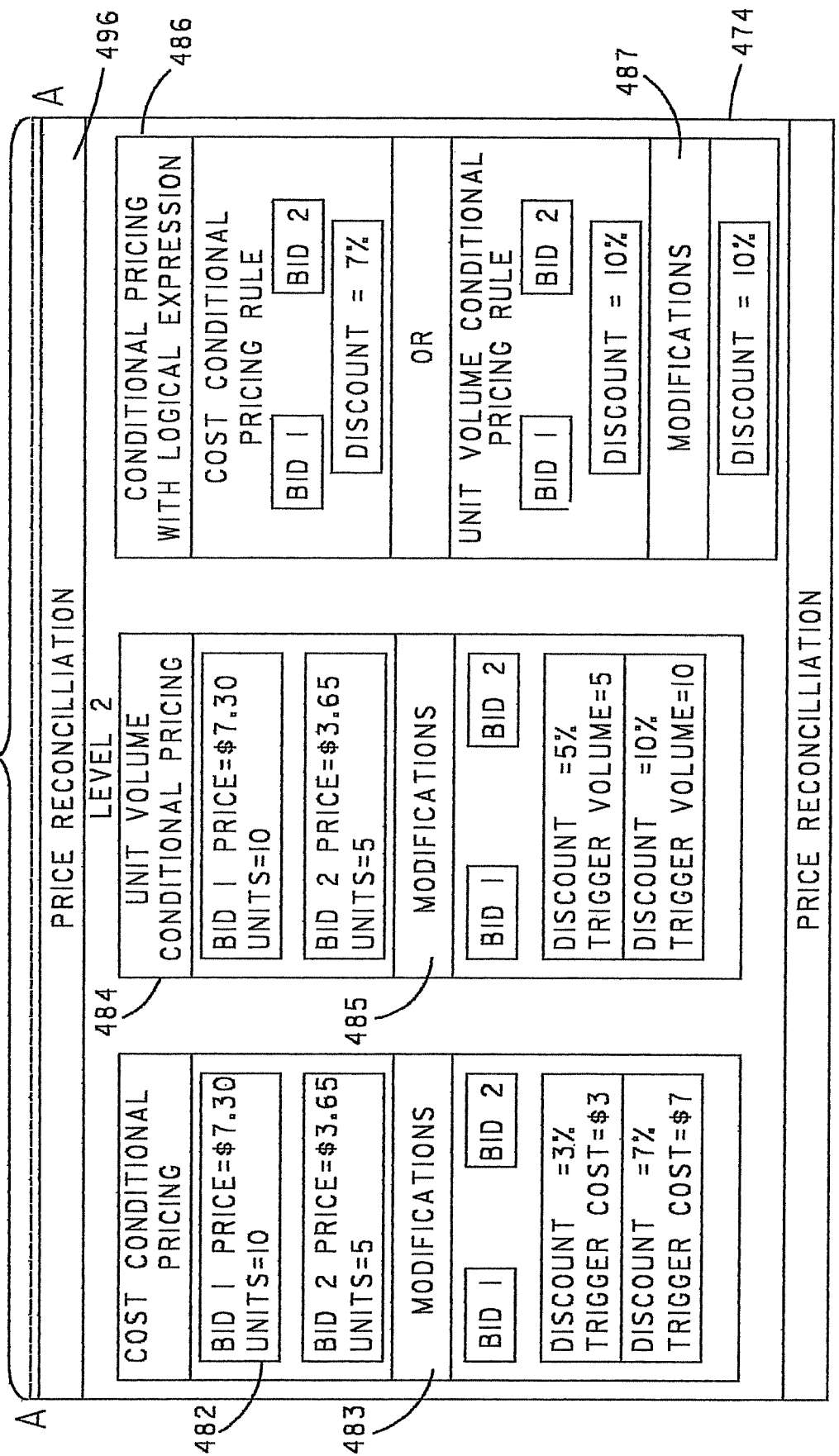

Conditional Pricing Sequence with Fixed Price Levels:

With reference to FIG. 27, also or alternatively, a conditional pricing sequence with fixed price levels rule 470 can be associated with one or more bids of an exchange in any suitable and/or desirable manner. The conditional pricing sequence with fixed price levels rule 470 causes the optimizing software to modify the cost outcome of a forward auction, reverse auction or exchange based on bid price reconciliation(s), value limit(s) and/or evaluation of logical expression(s).

For example, suppose two conditional pricing levels 472 and 474 are associated with the conditional pricing sequence with fixed priced levels rule 470. Conditional pricing level 472 includes a cost conditional pricing rule 476, a unit volume conditional pricing rule 478 and a conditional pricing with logical expression rule 480. Conditional pricing level 474 includes a cost conditional pricing rule 482, a unit volume conditional pricing rule 484 and a conditional pricing with logical expression rule 486. The specific rules associated with each conditional pricing level 472 and 474 in this example, however, are not to be construed as limiting the invention.

Cost conditional pricing rules 476 and 482, unit volume conditional pricing rules 478 and 484 and conditional pricing with logical expression rules 480 and 486 associated with conditional pricing levels 474 and 474, respectively, may share bids whose prices are fixed at the same level in all references to the same bids throughout the level. If, in conditional pricing level 472, any cost volume level in cost conditional pricing rule 476, unit volume level in unit volume conditional pricing rule 478, or logical condition in conditional pricing with logical expression rules 480 is satisfied, the discount in the corresponding modifications bid group 477, 479 or 481, respectively, is applied and utilized to determined the value for conditional pricing level 474 thus forming the conditional pricing sequence with fixed price levels rule 470.

For example, cost conditional pricing rule 476, unit volume conditional pricing rule 478 and conditional pricing with logical expression rule 480 each include the same bid 1 from the same bidder in conditional pricing level 472, a.k.a., level 1.

Once all of rules 476, 478 and 480 from level 1 are evaluated, all applicable discounts are applied to associated bids and their prices are reconciled to be used in evaluating rules on conditional pricing level 474, a.k.a., level 2, of conditional pricing sequence with fixed price levels rule 470. For example, the price of bid 1 is recalculated based on evaluation of rules 476, 478 and 480 and this recalculated value is utilized in all occurrences of bid 1 in rules 482, 484 and 486.

In the example shown in FIG. 27, conditional pricing sequence with fixed price levels rule 470 has two levels 472 and 474, with each level comprised of a cost conditional pricing rule 476 and 482, a unit volume conditional pricing rule 478 and 484 and a conditional pricing with logical expression rule 480 and 486, respectively. If it is assumed that bid 1 473 is included in an allocation and bid 2 475 is not, then evaluation of cost conditional pricing rule 476 satisfies the second trigger cost level 490 of $7.00 thus awarding the corresponding 7% discount to bid 1 and bid 2; evaluation of unit volume conditional pricing rule 478 satisfies the second trigger volume level 492 of ten units thus awarding the corresponding 10% discount to bid 1 and bid 2. If cost conditional pricing rule 476 is satisfied, a logical truth value of TRUE is associated therewith. However, if cost conditional pricing rule 476 is not satisfied, a logical value of FALSE is associated therewith. Similarly, if unit volume conditional pricing rule 478 is satisfied, a logical truth value of TRUE is associated therewith. However, if unit volume conditional pricing rule 478 is not satisfied, a logical value of FALSE is associated therewith.

The conditional pricing with logical expression rule 480 causes the optimizing software to adjust the value of the solution when the logical combination of the logical truth values of conditional pricing rules 476 and 478 subject to a logical operator 494, in this example OR, is TRUE. Thus, if the logical value of the cost conditional pricing rule 476 is TRUE, the logical value of the unit volume conditional pricing rule 478 is TRUE, and the logical value of conditional pricing with logical expressions rule 480 subject to the logical operator 494 is TRUE, the modifications 481 of conditional pricing with logical expression rule 480 is applied to bid 1 and 2. Specifically, evaluation of conditional pricing with logical expression rule 480 satisfies the logical expression 494 (OR) thus awarding a 10% discount to bid 1 and bid 2. The determination of the logical value of rules 476, 478 and 480 are processed with the original prices of bid 1 and bid 2 without applying awarded discounts at conditional pricing level 472.

Evaluation of rules 482, 484 and 486 of conditional pricing level 474 are performed with recalculated prices for all bids referenced in conditional pricing level 472 subject to the discounts therein. Recalculation of the bid prices is performed after determining which of rules 476, 478 and 480 are applicable. This recalculation is shown schematically as a price reconciliation block 496 in FIG. 27. Once the prices of bid 1 and bid 2 have been recalculated, the recalculated bid prices are utilized throughout conditional pricing level 474 for the purpose of evaluating rules 482, 484 and 486. For example, throughout conditional pricing level 474, for the purpose of evaluating rules 482, 484 and 486, the price of bid 1 in conditional pricing level 474 will be fixed at $7.30, which is a 10%+7%+10%=27% discount from the original price of $10.00, and the price for bid 2 in conditional pricing level 474 will be fixed at $3.65 which is a 27% discount from the original price of $5.00. If bid 1 is not included in the allocation and bid 2 is, evaluation of rules 476, 478 and 480 will result in the price of bid 2 in conditional pricing level 474 being fixed at $4.10, which is a 3%+5%+10%=18% discount from the original price of $5.00, and the price of bid 1 in conditional pricing level 474 being fixed at $8.20, which is an 18% discount from the original price of $10.00.

The foregoing procedure is then repeated for conditional pricing rules 482 and 484 and conditional pricing with logical expressions rule 486 in the manner described above to determine if the recalculated price of bid 1 and/or the recalculated price of bid 2 is eligible to be awarded any discounts in conditional pricing level 474.

The conditional pricing sequence with fixed price rule 470 can have two or more levels as desired.

Smoothing Constraints:

With reference to FIG. 28, also or alternatively, one or more smoothing rule(s) or constraint(s) 500 can be associated with one or more bids of an exchange in any suitable and/or desirable manner. The one or more smoothing rule(s) or constraint(s) 500 cause the optimizing software to smooth two or more allocations of an item based on criterion associated with the items included in each allocation. For example, in the trucking industry it is common to allocate trucking lanes between two geographic locations, e.g., Chicago and New York City. Each trucking lane often has plural quantities associated therewith corresponding to the number of trips required between the two geographical locations based on a first criterion. For example, in a combinatorial exchange, there may be a demand for a quantity of 600 trips in a first trucking lane for a particular month of the year, e.g., December. In this example, the first criterion associated with each item, i.e., one trip in the truck lane, is the month of December. The combination of the item, e.g., the trucking lane, the criterion, e.g., the month of December, and the quantity, e.g., 600 trips, comprise an item group. This item group is not to be construed as limiting the invention, however, since it is envisioned that an item group can include two or more combinations of items, criterion and quantity.

FIG. 28 shows a demand for two item groups, item group 1 and item group 2. Item group 1 includes item I1 (a first truck lane), a first criterion, i.e., the month of December, and a quantity of 600 (trips) associated therewith. The quantity of 600 (trips) associated with item group 1 reflects the demand for trips in the first trucking lane in the month of December. Item group 2 includes item I1 (the first truck lane), the first criterion, i.e., the month of January, and a quantity of 120 (trips). The quantity of 120 (trips) associated with item group 2 reflects the demand for trips in the first trucking lane in the month of January following the month of December associated with item group 1. FIG. 28 also shows the allocation of a quantity of each item group subject to the smoothing rule(s) or constraint(s) 500.

In the example shown in FIG. 28, bid groups 1, 2 and 3 are allocated quantities of 300, 200 and 100 (trips), respectively, from item group 1 which has a total quantity of 600 (trips) in the first truck lane (item I1) in the month of December. Similarly, bid groups 1, 2 and 3 are allocated quantities of 60, 40 and 20 (trips), respectively, from item group 2 which has a total quantity of 120 (trips) in the first truck lane (item I1) in the month of January following the month of December associated with item group 1. This change in the total demand quantity of item groups 1 and 2 is not uncommon in the trucking industry since, once the holiday season ends in early January, the demand for trips in a trucking lane often decreases significantly.

In accordance with a one smoothing constraint, it is often desirable that the divisional allocation of the quantity of item group 2 either be the same as or within a predetermined amount or percentage of the divisional allocation of the quantity of item group 1. For example, the quantity of item I1 of item group 1 allocated to bid group 1, i.e., 300 (trips), versus the total available quantity of item I1 of item group 1, i.e., 600 (trips), define a first ratio, i.e., 300/600 or 1/2. The quantity of item I1 of item group 2 allocated to the bid group 1, i.e., 60 (trips), versus the total available quantity of item I1 of item group 2, i.e., 120 (trips), define a second ratio, i.e., 60/120 or 1/2. In this example, the first and second ratios are the same. However, in accordance with the present invention, the first and second ratios can differ from each other by no more than a predetermined amount. Similar comments apply in respect of the quantity of item I1 of item group 1 allocated to bid groups 2 and 3 and the quantities of items of item I1 of item group 2 allocated to bid groups 2 and 3 in FIG. 28.

In order to form each bid group, a subset of the bids received in the exchange are divided into bid groups based on a unique second criterion associated with the bids of each bid group. Examples of suitable second criterion include exchange participant identity, a non-price bid attribute, or an exchange participant attribute. For the purpose of describing the present invention, unless indicated otherwise, it will be assumed that each bid group includes only the bids of one exchange participant. However, this is not to be construed as limiting the invention.

The allocation of the total quantity of item group 1 to bid groups 1, 2 and 3 is not to be construed as limiting the invention since the optimizing software can allocate the total quantity of item I1 of item group 1 to one bid group based on the rule(s) or constraint(s) in effect when the allocation is determined. For each bid group that includes the bids of two or more bidders, the quantity of item group 1 allocated to each bid group can be further divided among the bids of the bid group.

Another smoothing constraint includes the quantity or percent quantity of the items of each item group allocated to each bid group either being equal to or within a range of a the total quantity or total percent quantity of said items available for allocation that have a unique period of time associated therewith. For example, in the example shown in FIG. 28, 100% of the quantity of item group 1 for the December period of time associated therewith is allocated to bid groups 1, 2 and 3 and 100% of the quantity of item group 2 for the January period of time is allocated to bid groups 1, 2 and 3. However, a quantity or percent quantity less than 100%, e.g., 80%, of item I1 of item groups 1 and 2 can be allocated. Also or alternatively, a range of quantities within the predetermined quantity or percent quantity, e.g., 80% ∀ 5%, of item I1 of item groups 1 and 2 can be allocated.

One reason for limiting the quantity or percent quantity of an item group that is allocated subject to a smoothing constraints is to enable the remaining quantity to be allocated subject to other rules and/or constraints of the exchange. For example, it may be desirable to allocate 80% of the total quantity of item group 1 and item group 2 subject to smoothing constraints, while allocating the remaining 20% of item group 1 and item group 2 absent the smoothing constraints. For example, the remaining 20% can be allocated based upon lowest cost.

Another smoothing constraint includes limiting by a first predetermined amount any increases or decreases in the number of items allocated for each of a subset of item groups that has progressive time periods associated with the items thereof. This smoothing constraint avoids allocations whereupon a supplier acting as an exchange participant is required to fulfill an allocation in excess of the supplier's capacity to react. For example, suppose a supplier can readily supply 100 units of an item per month. Further, suppose that the supplier is able to react to variances in this month-to-month supply of ∀10 units per month without affecting the suppliers overall ability to supply the items (+10 units per month) or without accumulating excess inventory (−10 units per month). This smoothing constraint enables the optimizing software to control the month-to-month allocation in a manner that satisfies the suppliers desire to supply the items without adverse impact to the buyer or the supplier.

This latter smoothing constraint can also include a maximum or minimum limit on the number of items to be supplied during any series of time intervals, e.g., month-to-month. In this case, the maximum limit may represent the maximum capacity of the supplier to supply an item while the minimum limit may represent the minimum quantity the supplier can supply the item at a desirable profit.

Still another smoothing constraint can require that, for each subset of item groups that has progressive time periods associated with the items thereof, a maximum quantity of at least one item is allocated in one of the time periods and the quantity of the item allocated in each other time period is within a predetermined quantity of the maximum quantity. This latter smoothing constraint is useful for rewarding one or more preferred suppliers with relatively stable month-to-month requirements for an item.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A computer-implemented method of conducting a combinatorial exchange, wherein combinatorial bids allow exchange participants to bid on multiple items with a single bid, the method comprising:
   (a) storing instructions in a computer storage, wherein said instructions, when executed by a processor, cause the processor to determine an allocation of bids in a combinatorial exchange;
   (b) storing in the computer storage a set of rules for processing of bids received in connection with the exchange, wherein said set of rules is distinct of the instructions of step (a);
   (c) storing in the computer storage from each of a plurality of exchange participants at least one bid of (1) a first bid type comprised of a quantity for each of one or more items and a single price for all the quantities of all of the items, or (2) a second bid type comprised of a first item, a quantity or a range of quantities for said first item and a unit price for said first item;
   (d) storing in the computer storage a desired exchange objective;
   (e) determining via a processor operating under the control of the instructions of step (a) subject to a subset of the set of rules of step (b) and subject to the desired exchange objective if an allocation of the bids exists that is optimal for the type of exchange being conducted, wherein:
   if said allocation exists, it includes a subset of the bids;
   if the subset of the bids includes one or more first bid type, each first bid type includes all of the items of the bid and at least part of the quantity of each item;
   if the subset of the bids includes one or more each second bid type, each second bid type includes the quantity or a quantity within the range of quantities for the first item; and
   (f) terminating the combinatorial exchange when the optimal allocation is determined to exist in step (e), otherwise repeat step (e) utilizing a different subset of the set of rules of step (b) for each iteration of step (e) until the optimal allocation is determined to exist.

2. The method of claim 1, further comprising the steps of:
   storing in the computer storage each item desired to be sourced during the exchange and a quantity thereof;
   storing in the computer storage M ideal bids, wherein:
   M is a function of at least one of (1) a minimum winners rule having the largest value, and (2) a maximum volume percentage rule having the smallest value; and
   each ideal bid is for the entire quantity of each item desired to be sourced during the exchange;
   and
   if no allocation of the M ideal bids exists subject to the currently available set of rules, the processor designating the exchange to be overconstrained for said set or subset of rules.

3. The method of claim 2, wherein:

$$M = \frac{\#\text{ items}}{\min\left(\frac{1}{A}, \frac{B}{2}\right)} + 1$$

where
   #items=the sum of the entire quantity of each item input into the exchange;
   A=the minimum winners rule having the largest value; and
   B=the maximum volume percentage rule having the smallest value.

4. The method of claim 3, wherein the method further includes rounding M up to the next whole number when the value of M includes a fraction.

5. The method of claim 3, wherein the value of the maximum volume percentage rule having the largest value is less than or equal to the #items.

6. The method of claim 3, wherein the currently available set of rules includes the set of rules stored in the computer storage in step (b) and any amendments, additions or deletions to said set of rules.

7. The method of claim 1, further including the step of excluding from the determination of at least one allocation, the bid(s) of at least one bidder not having a bid included in a preceding allocation.

8. The method of claim 1, further including the steps of:
   storing in the computer storage at least one volume threshold—average cost threshold pair for at least one item of step (c);
   the processor allocating a subset of the quantities of said item;
   the processor dividing a sum of the bid price(s) attributable to the allocated quantities of said item by a sum of the allocated quantities of said item to obtain an average cost for said item;
   in a reverse auction, if the average cost of said item is greater than the average cost threshold of one of said volume threshold–average cost threshold pairs for said item, the processor decreasing a desired quantity of said item to be sourced to less than or equal to the volume threshold of said one volume threshold–average cost threshold pair for said item; and
   in a forward auction, if the average cost of said item is less than the average cost threshold of one of said volume threshold–average cost threshold pairs for said item, the processor increasing a desired quantity of said item to be sold to greater than or equal to the volume threshold of said one volume threshold–average cost threshold pair for said item.

9. The method of claim 8, wherein:
in the reverse auction, the desired exchange objective is satisfied when the average cost for each item allocated is equal to or less than a minimum average cost threshold for said item; and
in the forward auction, the desired exchange objective is satisfied when the average cost for each item allocated is equal to or greater than a maximum average cost threshold for said item.

10. The method of claim 8, wherein a set of volume threshold-average cost threshold pairs for at least one item is stored in the computer storage in the form of one of (1) a curve of volume threshold versus average cost threshold, (2) an algorithm wherein the volume threshold is expressed as a function of the average cost threshold, or vice versa, and (3) a set of discrete volume threshold-average cost threshold pairs.

11. A computer readable medium having stored thereon instructions which, when executed by a processor, cause the processor to perform the steps of:
(a) store in a computer storage a set of rules for processing of bids received in connection with a combinatorial exchange where combinatorial bids allow exchange participants to bid on multiple items with a single bid, wherein said set of rules is distinct of the instructions;
(b) store in the computer storage at least one bid received from each of a plurality of exchange participants, wherein each bid is comprised of: (1) at least one item, (2) an initial quantity of each item, and (3) a unit price for each item or a price for all the item(s) and their quantities;
(c) store in the computer storage a desired exchange objective;
(d) determine under the control of the instructions subject to a subset of the set of rules of step (a) and the desired exchange objective if an allocation of the bids exists that is optimal for the type of exchange being conducted, wherein if said allocation exists, it includes a subset of the bids stored in step (b) and each bid of said subset includes all of the items of the bid and at least part of the initial quantity of each item; and
(e) terminate the combinatorial exchange when the optimal allocation is determined to exist in step (d), otherwise repeat step (d) utilizing a different subset of the set of rules of step (a) for each iteration of step (d) until the optimal allocation is determined to exist.

12. The computer readable medium of claim 11, wherein the instructions further cause the processor to:
receive each item desired to be sourced during the exchange and a quantity thereof;
receive M ideal bids, wherein:
M is a function of at least one of (1) a minimum winners rule having the largest value, and (2) a maximum volume percentage rule having the smallest value; and
each ideal bid is for the entire quantity of each item desired to be sourced during the exchange;
and
if no allocation of the M ideal bids exists subject to the currently available set of rules, designate the exchange to be overconstrained for said set of rules.

13. The computer readable medium of claim 12, wherein:

$$M = \frac{\# \text{ items}}{\min\left\{\frac{1}{A}, \frac{B}{2}\right\}} + 1$$

where
items=the sum of the entire quantity of each item input into the exchange;
A=the minimum winners rule having the largest value; and
B=the maximum volume percentage rule having the smallest value.

14. The computer readable medium of claim 12, wherein the instructions further cause the processor to round M up to the next whole number when the value of M includes a fraction.

15. The computer readable medium of claim 12, wherein the value of the maximum volume percentage rule having the largest value is less than or equal to the #items.

16. The computer readable medium of claim 12, wherein the currently available set of rules includes the set of rules input in step (a) and any amendments, additions or deletions to said set of rules.

17. The computer readable medium of claim 11, wherein the instructions further cause the processor to exclude from the determination of at least one allocation, the bid(s) of at least one bidder not having a bid included in a preceding allocation.

18. The computer readable medium of claim 11, wherein, the instructions further cause the processor to:
associate at least one volume threshold-average cost threshold pair with at least one item of step (b);
allocate a subset of the quantities of said item;
divide a sum of the bid price(s) attributable to the allocated quantities of said item by a sum of the allocated quantities of said item to obtain an average cost for said item;
in a reverse auction, if the average cost of said item is greater than the average cost threshold of one of said volume threshold-average cost threshold pairs for said item, decrease a desired quantity of said item to be sourced to less than or equal to the volume threshold of said one volume threshold-average cost threshold pair for said item; and
in a forward auction, if the average cost of said item is less than the average cost threshold of one of said volume threshold-average cost threshold pairs for said item, increase a desired quantity of said item to be sold to greater than or equal to the volume threshold of said one volume threshold-average cost threshold pair for said item.

19. The computer readable medium of claim 18, wherein:
in the reverse auction, the desired exchange objective is satisfied when the average cost for each item allocated is equal to or less than a minimum average cost threshold for said item; and
in the forward auction, the desired exchange objective is satisfied when the average cost for each item allocated is equal to or greater than a maximum average cost threshold for said item.

20. The computer readable medium of claim 18, wherein the plurality of volume threshold-average cost threshold pairs is stored in the form of one of (1) a curve of volume threshold versus average cost threshold, (2) an algorithm wherein the volume threshold is expressed as a function of the average cost threshold, or vice versa, and (3) a set of discrete volume threshold-average cost threshold pairs.

* * * * *

UNITED STATES PATENT AND TRADEMARK OFFICE
CERTIFICATE OF CORRECTION

| | | |
|---|---|---|
| PATENT NO. | : 8,190,490 B2 | Page 1 of 1 |
| APPLICATION NO. | : 12/508129 | |
| DATED | : May 29, 2012 | |
| INVENTOR(S) | : Tuomas Sandholm et al. | |

It is certified that error appears in the above-identified patent and that said Letters Patent is hereby corrected as shown below:

Column 45, Line 59, Claim 1, after "one or more" delete "each"

Signed and Sealed this
Second Day of October, 2012

David J. Kappos
*Director of the United States Patent and Trademark Office*